(12) United States Patent
Masarik et al.

(10) Patent No.: US 11,473,874 B2
(45) Date of Patent: Oct. 18, 2022

(54) WEAPON SYSTEM WITH MULTI-FUNCTION SINGLE-VIEW SCOPE

(71) Applicant: Maztech Industries, LLC, Irvine, CA (US)

(72) Inventors: David Michael Masarik, Newport Beach, CA (US); Michael Raymond Masarik, Missoula, MT (US); Matthew James Masarik, Newport Beach, CA (US); David Alexander Steinweg, Irvine, CA (US); Gregory Philip Petersen, Newport Beach, CA (US)

(73) Assignee: Maztech Industries, LLC, Irvine, CA (US)

( * ) Notice: Subject to any disclaimer, the term of this patent is extended or adjusted under 35 U.S.C. 154(b) by 0 days.

(21) Appl. No.: 17/178,990

(22) Filed: Feb. 18, 2021

(65) Prior Publication Data

US 2021/0372737 A1    Dec. 2, 2021

Related U.S. Application Data

(60) Provisional application No. 62/978,718, filed on Feb. 19, 2020.

(51) Int. Cl.
*F41G 1/38* (2006.01)
*F41G 1/30* (2006.01)
(Continued)

(52) U.S. Cl.
CPC ............... *F41G 1/38* (2013.01); *F41G 1/30* (2013.01); *F41G 1/32* (2013.01); *F41G 1/345* (2013.01);
(Continued)

(58) Field of Classification Search
CPC ........ F41G 1/30–38; F41G 3/06; F41G 3/165; G02B 23/105; G02B 23/12; G02B 23/14;
(Continued)

(56) References Cited

U.S. PATENT DOCUMENTS

| | | | |
|---|---|---|---|
| 5,035,472 A * | 7/1991 | Hansen | F41G 1/345 359/350 |
| 5,129,309 A | 7/1992 | Lecuyer | |

(Continued)

FOREIGN PATENT DOCUMENTS

| | | |
|---|---|---|
| CN | 105547048 | 5/2016 |
| CN | 205749902 | 11/2016 |

(Continued)

OTHER PUBLICATIONS

U.S. Appl. No. 17/243,408, filed Apr. 28, 2021, Masarik et al.
(Continued)

*Primary Examiner* — Joshua E Freeman
*Assistant Examiner* — Benjamin S Gomberg
(74) *Attorney, Agent, or Firm* — Knobbe, Martens, Olson & Bear, LLP

(57) ABSTRACT

Certain aspects of a novel weapon sight system combine a direct view, a visible light video view, and an infrared (IR) video view mode. Each of the view modes may be viewed individually or simultaneously with one or more of the other view modes through a single viewing aperture. Further, the one or more view-modes may be provided while providing a bore-sighted reticle superimposed on the selected view. Further, the reticle may be powered separately from the video view electronics enabling use of the reticle regardless of the power status video view electronics.

28 Claims, 16 Drawing Sheets

(51) Int. Cl.

| | | |
|---|---|---|
| *F41G 1/32* | (2006.01) | |
| *F41G 1/34* | (2006.01) | |
| *F41G 1/473* | (2006.01) | |
| *F41G 3/06* | (2006.01) | |
| *F41G 3/08* | (2006.01) | |
| *F41G 3/16* | (2006.01) | |
| *G02B 23/10* | (2006.01) | |
| *G02B 23/12* | (2006.01) | |
| *G02B 23/14* | (2006.01) | |
| *G02B 27/00* | (2006.01) | |
| *G03B 29/00* | (2021.01) | |
| *H04N 5/225* | (2006.01) | |
| *H04N 5/232* | (2006.01) | |
| *H04N 5/33* | (2006.01) | |
| *F41G 11/00* | (2006.01) | |
| *G02B 23/16* | (2006.01) | |

(52) U.S. Cl.
CPC ............... *F41G 1/473* (2013.01); *F41G 3/06* (2013.01); *F41G 3/08* (2013.01); *F41G 3/165* (2013.01); *G02B 23/105* (2013.01); *G02B 23/12* (2013.01); *G02B 23/14* (2013.01); *G02B 27/0093* (2013.01); *G03B 29/00* (2013.01); *H04N 5/2257* (2013.01); *H04N 5/23293* (2013.01); *H04N 5/33* (2013.01); *F41G 11/003* (2013.01); *G02B 23/16* (2013.01)

(58) Field of Classification Search
CPC .... G02B 23/16; G02B 27/0093; G03B 29/00; H04N 5/2257; H04N 5/23293; H04N 5/33
USPC .......................................................... 42/119
See application file for complete search history.

(56) References Cited

U.S. PATENT DOCUMENTS

| | | | |
|---|---|---|---|
| 5,140,151 A | | 8/1992 | Weiner et al. |
| 5,497,266 A | * | 3/1996 | Owen ................. G02B 17/0808 348/164 |
| 5,946,132 A | * | 8/1999 | Phillips ................... F41G 1/345 359/351 |
| 6,000,163 A | | 12/1999 | Gordon |
| 6,020,994 A | * | 2/2000 | Cook ................... H04N 5/2254 359/350 |
| 6,204,961 B1 | * | 3/2001 | Anderson ................ F41G 3/065 359/353 |
| 6,772,550 B1 | | 8/2004 | Leatherwood |
| 6,911,652 B2 | * | 6/2005 | Walkenstein ............. F41G 1/32 250/330 |
| 7,051,469 B1 | | 5/2006 | Pochapsky et al. |
| 7,100,321 B2 | | 9/2006 | Holmberg |
| 7,121,036 B1 | | 10/2006 | Florence et al. |
| 7,145,703 B2 | | 12/2006 | Sieczka et al. |
| 7,292,262 B2 | | 11/2007 | Towery et al. |
| 7,319,557 B2 | | 1/2008 | Tai |
| 7,409,792 B2 | | 8/2008 | Narcy et al. |
| 7,483,213 B2 | | 1/2009 | Pochapsky |
| 7,687,751 B2 | | 3/2010 | Page |
| 7,787,012 B2 | | 8/2010 | Scales et al. |
| 7,911,687 B2 | | 5/2011 | Scholz |
| 7,999,925 B2 | | 8/2011 | Liang |
| 8,065,807 B2 | | 11/2011 | Rucinkski |
| 8,117,780 B2 | | 2/2012 | Matthews et al. |
| 8,297,173 B1 | | 10/2012 | Teetzel et al. |
| 8,400,712 B2 | | 3/2013 | Dennis |
| 8,432,610 B2 | | 4/2013 | Szapiel et al. |
| 8,448,373 B2 | | 5/2013 | Matthews et al. |
| 8,461,529 B2 | | 6/2013 | Hunter |
| 8,564,668 B2 | | 10/2013 | Plotsker |
| 8,587,659 B1 | | 11/2013 | Socolinky et al. |
| 8,607,495 B2 | | 12/2013 | Moore et al. |
| 8,638,387 B2 | * | 1/2014 | Aizpuru ................. H01J 31/50 348/343 |
| 8,648,914 B1 | | 2/2014 | Winker et al. |
| 8,656,628 B2 | | 2/2014 | Jock et al. |
| 8,656,631 B2 | | 2/2014 | Koesler et al. |
| 8,915,008 B2 | | 12/2014 | Mauricio et al. |
| 8,925,238 B2 | | 1/2015 | Anderson |
| 8,943,732 B2 | | 2/2015 | Schmidt et al. |
| 8,997,393 B2 | | 4/2015 | Bar Yona |
| 9,010,012 B2 | | 4/2015 | Matthews et al. |
| 9,036,035 B2 | | 5/2015 | Lupher et al. |
| 9,057,583 B2 | | 6/2015 | Matthews et al. |
| 9,069,172 B1 | * | 6/2015 | Morley ................... H01J 31/49 |
| 9,113,061 B1 | | 8/2015 | Morley |
| 9,140,521 B2 | | 9/2015 | Millett |
| 9,229,216 B2 | * | 1/2016 | Staley, III ............. G02B 25/00 |
| 9,239,213 B2 | | 1/2016 | Chen et al. |
| 9,298,062 B2 | | 3/2016 | Jikihara et al. |
| 9,323,061 B2 | | 4/2016 | Edwards et al. |
| 9,395,156 B2 | | 7/2016 | Newzella et al. |
| 9,417,037 B2 | | 8/2016 | Jahromi |
| 9,593,945 B2 | * | 3/2017 | Sisney ..................... G01C 3/04 |
| 9,632,304 B2 | | 4/2017 | Waterman et al. |
| 9,791,242 B2 | | 10/2017 | Christiansen et al. |
| 9,791,244 B2 | | 10/2017 | Maryfield et al. |
| 9,857,144 B2 | | 1/2018 | Richards |
| 9,897,415 B2 | | 2/2018 | Zhang et al. |
| 9,906,736 B2 | | 2/2018 | Patton et al. |
| 9,939,229 B2 | | 4/2018 | Davidson et al. |
| 10,003,756 B2 | * | 6/2018 | Masarik ................. H04N 5/332 |
| 10,054,852 B2 | | 8/2018 | Lupher et al. |
| 10,113,837 B2 | | 10/2018 | Masarik et al. |
| 10,126,099 B1 | | 11/2018 | Hammond et al. |
| 10,330,439 B2 | | 6/2019 | Jeung et al. |
| 10,345,077 B1 | | 7/2019 | Loebig et al. |
| 10,379,135 B2 | * | 8/2019 | Maryfield ............. H01L 31/105 |
| 10,443,981 B2 | | 10/2019 | Tinichigiu et al. |
| 10,458,750 B2 | | 10/2019 | Lee |
| 10,466,484 B1 | * | 11/2019 | Yoon ..................... H04N 13/332 |
| 10,480,903 B2 | | 11/2019 | Lupher et al. |
| 10,520,716 B2 | | 12/2019 | Havens et al. |
| 10,534,166 B2 | | 1/2020 | Summerfield et al. |
| 10,612,890 B2 | | 4/2020 | McHale et al. |
| 10,634,453 B1 | | 4/2020 | Spuhr |
| 10,697,734 B1 | | 6/2020 | Jahromi |
| 10,704,862 B2 | | 7/2020 | Chung |
| 10,747,314 B1 | | 8/2020 | Chang et al. |
| 10,754,240 B2 | | 8/2020 | Peel et al. |
| 10,823,532 B2 | | 11/2020 | Gallery et al. |
| 10,837,738 B1 | | 11/2020 | Hung |
| 10,866,070 B2 | | 12/2020 | Nerheim |
| 10,871,350 B1 | | 12/2020 | Thomas et al. |
| 10,876,816 B2 | | 12/2020 | Campbell |
| 10,890,414 B2 | | 1/2021 | Cabrera et al. |
| 11,209,243 B1 | * | 12/2021 | Masarik ................. G02B 27/34 |
| 2008/0252882 A1 | | 10/2008 | Kesterson |
| 2011/0261204 A1 | | 10/2011 | Smith |
| 2012/0007987 A1 | | 1/2012 | Gaber |
| 2012/0019700 A1 | | 1/2012 | Gaber |
| 2012/0033195 A1 | | 2/2012 | Tai |
| 2012/0090216 A1 | | 4/2012 | Li |
| 2012/0262615 A1 | | 10/2012 | Geber |
| 2013/0279013 A1 | | 10/2013 | Edwards et al. |
| 2014/0184476 A1 | | 7/2014 | McHale et al. |
| 2014/0211020 A1 | | 7/2014 | John, Jr. |
| 2015/0016777 A1 | | 1/2015 | Abovitz et al. |
| 2015/0369565 A1 | | 12/2015 | Kepler |
| 2016/0028970 A1 | | 1/2016 | Masarik et al. |
| 2016/0061567 A1 | | 3/2016 | Regan et al. |
| 2016/0381297 A1 | | 12/2016 | Aliaksandr |
| 2018/0131879 A1 | | 5/2018 | Nagata et al. |
| 2018/0204364 A1 | | 7/2018 | Hoffman |
| 2018/0292168 A1 | | 10/2018 | Borrico |
| 2019/0129162 A1 | | 5/2019 | Hodelin |
| 2019/0219812 A1 | | 6/2019 | Havens et al. |
| 2019/0249958 A1 | | 8/2019 | Teetzel et al. |
| 2019/0316881 A1 | | 10/2019 | Biran |

(56) References Cited

U.S. PATENT DOCUMENTS

| | | | |
|---|---|---|---|
| 2019/0324260 A1 | 10/2019 | Hamilton et al. | |
| 2019/0353455 A1* | 11/2019 | McHale | H04N 5/335 |
| 2019/0376755 A1 | 12/2019 | Teetzel et al. | |
| 2019/0376764 A1* | 12/2019 | Hammond | F41G 1/345 |
| 2020/0011640 A1 | 1/2020 | Moseman et al. | |
| 2020/0041890 A1 | 2/2020 | Peel | |
| 2020/0049455 A1 | 2/2020 | Hamilton et al. | |
| 2020/0103201 A1 | 4/2020 | Cabrera et al. | |
| 2020/0103203 A1 | 4/2020 | Seznec-Serpaggi | |
| 2020/0232762 A1 | 7/2020 | Hamilton et al. | |
| 2020/0272044 A1 | 8/2020 | Walker | |
| 2020/0292838 A1 | 9/2020 | Watanabe et al. | |
| 2020/0309485 A1 | 10/2020 | Shi | |
| 2020/0333534 A1 | 10/2020 | Cotton | |
| 2021/0010784 A1 | 1/2021 | Sheets, Jr. | |
| 2021/0262758 A1* | 8/2021 | Parker | F41G 1/38 |

FOREIGN PATENT DOCUMENTS

| | | |
|---|---|---|
| CN | 112179209 | 1/2021 |
| DE | 10 2004 047576 | 4/2006 |
| EP | 1 032 859 | 12/2003 |
| WO | WO 2014/024188 | 2/2014 |
| WO | WO 2017/219275 | 12/2017 |
| WO | WO 2019/007973 | 1/2019 |
| WO | WO 2019/025557 | 2/2019 |
| WO | WO 2019/038476 | 2/2019 |
| WO | WO 2019/236114 | 12/2019 |
| WO | WO 2020/071864 | 4/2020 |
| WO | WO 2020/106340 | 5/2020 |
| WO | WO 2021/168132 | 8/2021 |

OTHER PUBLICATIONS

International Search Report and Written Opinion received in PCT Application No. PCT/US2021/018603 dated May 18, 2021 in 11 pages.

"ATN ThOR Series: Thermal Optical Riflescopes", American Technologies Network Corp., Thor Series Operator's Manual, Rev. 3, https://www.atncorp.com/pdf/manuals/ThOR_2-3_Color_2-3_B&W_manual.pdf, Dec. 2010, pp. 44.

"Dracorex EO+IR Thermal Fusion rifle Scope Sight", SPi Infrared, https://www.x20.org/vanguard-eoir-thermal-fusion-rifle-scope/, Sep. 1, 2016, pp. 10.

"Form 8-K", Kopin Corp, Filed Jan. 14, 2014 for the Period Ending Jan. 13, 2014, http://d1lge852tjjqow/cloudfront.net/NasdaqGlobal-KOPN/5f894bb5-230b-4547-9561-0a5d0e720f7d.pdf, pp. 22.

Gilstrap et al., "Integrated Sight Boresighting", https://apps.dtic.mil/dtic/tr/fulltext/u2/a400238.pdf, Mar. 1998, pp. 11.

Grayson, Chris, "Holographic Waveguides: What You Need to Know to Understand The Smartglasses Market", http3://web.archive.org/web/20170516184200/https://uploadvr.com/author/cgrayson/, May 4, 2017, pp. 17.

"Luna Optics & The Latest Night Vision Technologies", https://web.archive.org/web/20200402074219/https://www.lunaoptics.com/nvtechnology.html, Apr. 2. 2020. pp. 2.

"Select an Accurate Dedicated or Clip on Long Range Thermal Weapon Sight or Thermal Rifle Flir Scope", SPi Infrared, https://www.x20.org/product/114x-low-cost-thermal-rifle-scope/, Sep. 2014, pp. 20.

* cited by examiner

WEAPON SYSTEM WITH MULTI-FUNCTION SINGLE-VIEW SCOPE

CROSS-REFERENCE TO RELATED APPLICATIONS

This application claims the benefit of priority to U.S. Provisional Patent Application No. 62/978,718, filed Feb. 19, 2020, entitled "WEAPON SYSTEM WITH MULTI-FUNCTION SINGLE-VIEW SCOPE," the content of which is hereby incorporated by reference herein in its entirety. Any and all applications, if any, for which a foreign or domestic priority claim is identified in the Application Data Sheet of the present application are hereby incorporated by reference in their entireties under 37 CFR 1.57.

TECHNICAL FIELD

This disclosure relates to a weapon scope. More specifically, this disclosure relates to a weapon scope that is capable of simultaneously providing a direct-view of a target scene and one or more video views through a single window or aperture.

BACKGROUND

Scopes can be used with weapons to enable a user to more clearly see a target compared to not using a scope. Typically, scopes are designed with optics that includes one or more lenses to focus the light entering the scope on the user's eye and enabling the user to see at a greater distance. The optics often make the scope heavy, particularly when a high-degree of magnification is supported by the scope. Further, the viewing aperture of the scopes are often relatively small to prevent excess light from entering the scope.

SUMMARY

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain aspects of the present disclosure relate to a weapon system that includes a firearm and a firearm scope. The firearm may comprise a mount configured to support attachment of an accessory to the firearm. The firearm scope may be mountable to the firearm via the mount of the firearm. The firearm scope may comprise a sight system configured to admit light via a first window of the firearm scope and present a target scene or an image of the target scene, to a user via a second window of the firearm scope, wherein the image of the target scene is formed based at least in part on light admitted by the first window of the firearm scope. The sight system may comprise: a first image source configured to generate a first image for presentation to the user, wherein the first image source generates the first image based at least in part on the admitted light; a second image source configured to generate a second image comprising a reticle for presentation to the user; a waveguide display configured to display the second image superimposed on the first image to the user; and an image projector configured to project at least the first image onto the waveguide display.

Additional aspects of the present disclosure relate to a firearm scope capable of providing both a video-view mode and a direct-view mode through a single viewing window. The firearm scope may comprise: a housing comprising a first window configured to admit light and a second window that enables a user to view a target scene; and a sight system at least partially housed within the housing, the sight system configured to process the admitted light and to present the target scene to the user via the second window. The sight system may comprise: a direct view display viewable through the second window, the direct view display having a luminous transmittance greater than or equal to about 30% using CIE Illuminant D65 when viewed within at least 10 degrees of perpendicular to the direct view display, thereby permitting a direct view of the target scene through a transparent display substrate of the direct view display; a redirection element configured to redirect at least some of the admitted light received through the first window towards an image sensor when in a first state; the image sensor configured to generate an image based on the light received from the redirection element; and a projector configured to project the image onto the transparent display substrate of the direct view display.

Yet additional aspects of the present disclosure relate to a firearm scope capable of displaying superimposed source imagery on a waveguide display. The firearm scope may comprise: a housing comprising a first window configured to admit light and a second window that enables a user to view a target scene; and a sight system at least partially housed within the housing, the sight system configured to process the admitted light and to present the target scene to the user via the second window. The sight system may comprise: a first image source configured to generate a first image for presentation to the user, wherein the first image source generates the first image based at least in part on the admitted light; a second image source configured to generate a second image for presentation to the user, wherein the second image comprises symbology; a waveguide display configured to display the second image superimposed on the first image to the user; and an image projector configured to project at least the first image onto the waveguide display.

Further aspects of the present disclosure relate to a firearm scope capable of providing both a thermal-view mode and a direct-view mode through a single viewing window. The firearm scope may comprise: a housing comprising a first window configured to admit light and a second window that enables a user to view a target scene; and a sight system at least partially housed within the housing, the sight system configured to process the admitted light and to present the target scene to the user via the second window. The sight system may comprise: a direct view display viewable through the second window, the direct view display transparent when viewed at a range of angles, thereby permitting a direct view through a transparent display substrate of the direct view display; a beamsplitter configured to permit the transmittance of light within a visible wavelength range while reflecting light within an infrared wavelength range towards an image sensor; the image sensor configured to generate a thermal image based on the light within the infrared wavelength range received from the beamsplitter, thereby permitting a thermal view; and a projector configured to project the thermal image onto the transparent display substrate of the direct view display.

Certain aspects of the present disclosure relate to a firearm scope configured to provide a view of a target scene to a user. The firearm scope may comprise: a housing comprising a first aperture configured to admit light and a second aperture configured to present the target scene to the user; and a sight system at least partially housed within the housing, the sight system configured to process the admitted light and to present the target scene to the user via the second aperture. The sight system may comprise: a dichroic mirror configured to reflect at least some light of the admitted light that is within infrared spectrum and transmit at least some light of the admitted light that is within visible spectrum; a moveable mirror configured to reflect at least some light within the visible spectrum towards an optical subsystem when the moveable mirror is within a first position associated with a first state; an image processor configured to generate an image based on light received from the optical subsystem; a projector configured to project the image into a first point of ingress of a holographic waveguide; and the holographic waveguide configured to present the image to the user when in the first state.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure. In addition, various features of different disclosed embodiments can be combined to form additional embodiments, which are part of this disclosure. Any feature or structure can be removed or omitted.

DETAILED DESCRIPTION

Introduction

Figure 1:
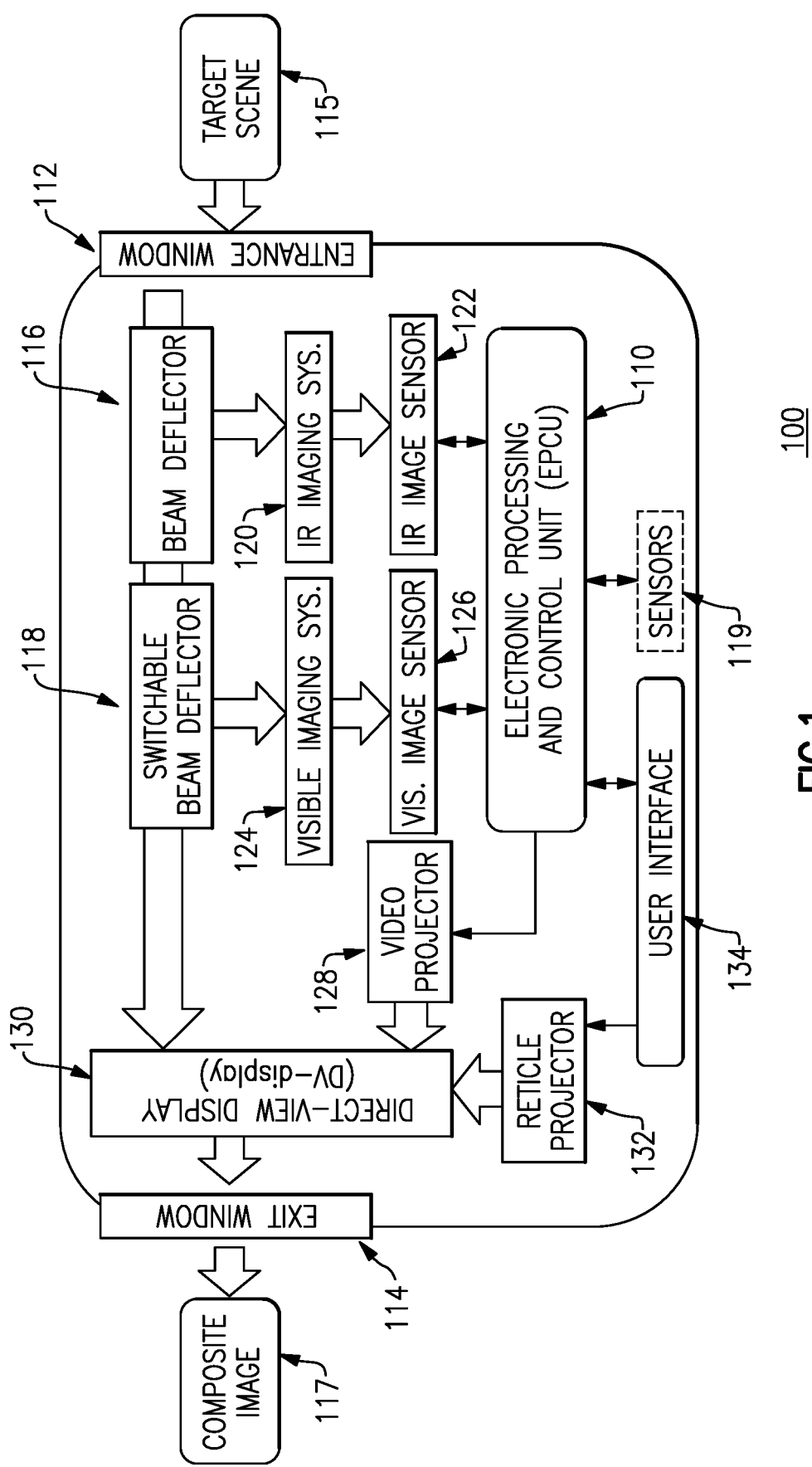
FIG. 1 is a block diagram of an example scope or sight system in accordance with certain aspects of the present disclosure.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

In this description, references to "an embodiment," "one embodiment," or the like, mean that the particular feature, function, structure or characteristic being described is included in at least one embodiment of the technique introduced herein. Occurrences of such phrases in this specification do not necessarily all refer to the same embodiment. On the other hand, the embodiments referred to are also not necessarily mutually exclusive.

Several terms are used interchangeably within this description. Each of the terms are intended to have their customary ordinarily understood plain meaning in addition to the meanings described throughout this application.

For example, the terms "scope", "weapon sight system," "firearm scope," and "sight system" can be used interchangeably. In addition to their plain meanings, the foregoing terms may refer to a device that provides an image of a target scene under one or more lighting conditions. Although the sight system or scope may be referred to as a weapon sight system or a firearm scope, it should be understood that aspects of the system described herein can be used without a weapon. For example, certain aspects of the present disclosure may be implemented with other sighting systems, such as binoculars.

The terms "far infrared (FIR)", "long wavelength infrared (LWIR)" and "thermal radiation" can be used interchangeably to refer to the same infrared wavelength range. This foregoing infrared wavelength range may vary, but generally includes wavelengths that can be used to create a thermal image. For example, the LWIR may be between 8 to 12 micrometers or 8 to 15 micrometers. In some cases, FIR may include wavelengths between 15-1000 micrometers and may be used to detect explosives. Accordingly an image generated using LWIR may sometimes be referred to as "thermal view" or "thermal video view".

In some cases, "infrared (IR) wavelength ranges" may be divided into three ranges termed near-IR, mid-IR, and far-IR wavelength ranges. In some cases, an IR image or video view may correspond to an image or video signal generated by an IR sensor that is sensitive to one or more wavelength ranges. Further, it should be understood that IR wavelength ranges may include additional ranges, such as short-wavelength infrared and long-wavelength infrared. Generally, although not necessarily, the infrared range of between 8-15 micrometers may be used to generate a thermal image.

Certain aspects of a novel weapon sight system or firearm scope described herein may allow the user to select between a direct view, a daylight, or an infrared (IR) video view mode. The firearm scope may be mountable to the firearm via the mount of the firearm. In various embodiments, the firearm may comprise a rifle, a shotgun, a machine gun or the like. In some cases, a weapon system may be a non-firearm weapon, such as a bow, dart gun, or other projectile-based weapon. In some cases, at least some of the view modes may be simultaneously active. For example, the direct view and the IR video view may be simultaneously active. Further, the one or more view-modes may be provided while providing a bore-sighted reticle image superimposed on the selected view. In other words, the firearm barrel's bore axis can be aligned with the reticle image and the target image or scene observed by the user (shooter) via direct-view or one of the video view modes. In direct view mode, a user directly sees the light rays emitted or reflected by objects within a target scene without the assistance of any optical or optoelectronic elements. In other words, in direct view mode, the user is presented with a target scene that is equivalent to what a user may see without the scope, but, in some cases, with the addition of a reticle image.

In video viewing modes, the light rays, which may include both visible and infrared rays, emitted or reflected by the objects within a target scene are captured by an optical system, which may form a first image of the target scene on an image sensor (e.g., an optoelectronic sensor). Subsequently, the output of the image sensor may be provided to one or more displays that generate a second image that is observable by the user. In daylight video view mode, the first image may be formed on an image sensor using light within the visible spectrum. For example, the image sensor used in video view mode may be sensitive to light between 0.4 to 0.7 micrometers. In some cases, the image sensor may have a wider sensitivity range. For example, the image sensor may be capable of generating an image from light with wavelengths between 0.3 to 1.5 micrometers, 0.4 to 2.5 micrometers wavelength range, or a range there between. This image sensor capable of processing light within the visible spectrum may be referred to as a visible image sensor. Although referred to as daylight view mode, it should be understood that the daylight view mode may be used during the day or at night, and may generate an image of a target scene based on the amount of visible light available. Accordingly, the daylight view mode may be used during the day and/or at night with or without the use of additional or auxiliary illumination. Auxiliary illumination may be used to supplement the visible or IR light and may provide illumination in any of the foregoing visible light and IR wavelength ranges previously described. Without auxiliary illumination, the daylight view may be used with reduced visibility.

In IR video view mode, the first image is formed on an image sensor with a sensitivity to light wavelengths within the infrared range. For example, the image sensor may generate an image based on light with wavelengths between 2.5 to 5 micrometers, 5 to 8 micrometers, 8 to 12 micrometers, 8 to 15 micrometers, or any other range within the infrared wavelength range. This image sensor capable of generating an image from infrared light may be referred to as IR image sensor. The IR video view mode may be used during night or when little to no illumination in the visible range (e.g., between 0.4 to 0.7 micrometers) is available. However, the IR video mode is not limited to night, and a thermal image may be generated and presented during the day or when visible light is available. The IR video view can be used with or without auxiliary illumination. Auxiliary illumination may provide illumination in the wavelength range 0.7 to 2.5 micrometers, among others. Without auxiliary illuminations, the IR view may form thermal images of a target by focusing thermal radiation emitted by the target on a thermal image sensor that is sensitive to optical radiation with wavelengths within the infrared light range (e.g., between 8 and 15 micrometers). In some such cases, the IR video view mode may be referred to as a thermal video view mode.

Advantageously, in certain aspects, the availability of the direct-view mode in addition to the one or more video view modes enables the firearm scope to be used when a video view mode may not be available (for example due to technical issues or when batteries are depleted). The capability of combining a direct-view mode and a video-view mode into a single scope is enabled by a direct view display hereafter referred to as DV-display. The use of the DV-display enables multiple view modes, including direct-view, to be combined into the firearm scope using a single view-path. In other words, in each mode, light may be admitted to the scope via a single window or aperture, and a user may view a target scene through a single window or aperture. Further, the DV-display not only allows switching between direct, daylight video, and IR video view modes using a single entrance aperture, but it also enables the presentation of a bore-sighted reticle image superimposed on all views. Additionally, using the DV-display, symbolic and/or numeric information (e.g., obtained from sensors and/or peripheral devices) can be provided along with the target and reticle images. Moreover, by combining each of the view modes into a single view-path, the size of the firearm scope may be minimized, and may be equal in size and/or weight, to certain existing firearm scopes that only support a single view mode.

A DV-display (or a see-through display) can be a display device that displays one or more images to a user without significantly distorting or dimming the direct view image of the scene behind the display compared to the image that could be observed in the absence of the display. In other words, the DV-display may be capable of superimposing one or more images generated by other devices (e.g., projector, LCD, etc.) on the direct view image such that the observer's eye can simultaneously focus on the scene directly behind the display and the plurality of the images provided through the DV-display. As such, the DV-display may be capable of generating composite or combined images within the exit window of a scope by superimposing the direct view and one or more video images received from one or more image sensors. The DV-display may form color or monochrome composite images from one or more images generated by other devices (e.g., projector, LCD, etc.) and/or the direct view image. The DV-display may be a retinal or near-eye display that is transparent in the visible light range (e.g., has a luminous transmittance of greater than 80% using CIE illuminant D65). In some cases, the DV-display may have aluminous transmittance of greater than or equal to about 30% using CIE Illuminant D65 when viewed within at least 10 degrees of perpendicular to the direct view display. An example of a DV-display may include a transparent display substrate comprising a slab waveguide with at least one input image port (also referred to as input port) or point of ingress of the waveguide and at least one output image port. An input image port can be an optical input location of the DV-display where the image can be received from an image projector. An output image port can be an optical output location where the image can be viewed by an observer.

In some cases, an optical coupler may be used to couple the image output by the image projector to the input image port. Different types of DV-display (e.g., reflective, surface relief and holographic) may exploit different physical mechanisms for receiving and/or projecting images, and consequently, may employ different configurations for the input and output image ports. In some cases the DV-display, can be an augmented reality display.

FIG. 1 presents a block diagram of an example firearm scope 100 or sight system in accordance with certain aspects of the present disclosure. As previously described, embodiments described herein are not necessarily mutually exclusive. Thus, embodiments of the scope 100 may include other embodiments described herein and vice versa. Further, each embodiments or iterations of the scopes described herein may share one or more features of the other scopes described herein. Moreover, the firearm scope 100 may be used with any type of firearm and may be capable of presenting any type data that may be received from a firearm. For example, the firearm scope 100 may present weapon status information and or magazine cartridge counts using one or more of the embodiments described in U.S. Pat. No. 10,557,676, dated Feb. 11, 2020 and titled "FIREARM AMMUNITION AVAILABILITY DETECTION SYSTEM," which is hereby incorporated by reference in its entirety for all purposes.

The thin black arrows and thick gray arrows of FIG. 1 depict electric connection and optical propagation respectively. In certain aspects, the sight system or scope 100 may include an entrance window 112. The entrance window 112 may permit light rays from the target scene 115 to enter the sight system or firearm scope 100. Further, the scope 100 may include an exit window 114 that permits a user to view a direct view of the target scene 115 and/or an electronically transferred image of the target/target scene. The scope 100 may further include one or more optical subsystems 120, 124 that facilitate the forming or generating of infrared and visible images, respectively by, for example, focusing the light onto one or more sensors. Further, the scope 100 may include infrared image sensor 122, and visible image sensors 126 that are capable of converting the infrared and visible images generated by the optical imaging subsystems 120, 124 into video or other types of electronic signals. The infrared image sensor 122 may include an IR focal-plane array or any other type of sensor capable of generating an infrared or thermal image from infrared light. Further, the visible image sensor may include a Complementary metal-oxide-semiconductor (CMOS) sensor or any other type of sensor capable of generating a user-visible image from visible light. Advantageously, because the target scene may be presented using a video-view, it is possible to use a larger entrance window 112 and/or exit window 114 compared to optical scopes that use lenses in the viewing path. Further, because lenses may be omitted from the viewing path, the shape of the entrance and/or exit window is not restricted and may include a square, rectangle, or other convenient viewing shape.

In addition, the scope 100 may include an electronic processing and control unit (EPCU) 110 that can receive and process the electronic signals generated by the image sensors 122, 126. The EPCU 110 may also control one or more of the electronic, optoelectronic, and electromechanical devices included in the scope. In some cases, the EPCU may facilitate data and/or control communication between one or more of the subsystems of the scope 100.

Further, the scope 100 may include a moveable or pivotable mirror 118 (a first redirection element) that enables a user to transition the view between a direct view and a video view. The pivotable mirror 118 may permit visible light to travel between the entrance window 112 and the exit window 114 when in a first position that does not interrupt the traversal of light within the scope 100. Conversely, the pivotable mirror 118 may redirect visible light received from the entrance window 112 towards the visible optical imaging subsystem 124 when in a second position. In some implementations, the pivotable mirror can be replaced by any redirection element, moveable or otherwise, that is configured to redirect the light within the visible wavelength range (380 to 740 nanometer) towards the visible optical imaging subsystem 124.

In some cases, the pivotable mirror 118 may be replaced by a dichroic mirror or beam splitter that permits light associated with some wavelengths to be transmitted while reflecting or redirecting light of other wavelengths. In some such cases, the beam splitter may have a luminance transmittance of 50% in the visible range. Other degrees of luminance transmittance are possible. For example, the beam splitter may have a luminance transmittance of between 40% and 60% or between 35% and 65%. In yet some other cases, the pivotable mirror 118 may be replaced by a switchable mirror, which can change from transparent to translucent, or vice versa, when an electric signal is applied. Thus, the switchable mirror can permit the transmission of light associated with certain wavelengths when in a first state associated with a first electric signal and reflect the light associated with the certain wavelengths when in a second state associated with a second electric signal. In some cases, the one of the states may be associated with the non-application of an electrical signal to the switchable.

Moreover, the scope may include a beam deflector 116 (or a second redirection element), or dichroic mirror/beam splitter, that may allow the transmission of light within a selected wavelength range (e.g., a visible light range, such as between 0.4 and 2 micrometers), while re-directing light within a different wavelength range (e.g., an infrared light range, such as between 5 to 15 micrometers) toward the infrared imaging subsystem 120, which is capable of focusing the infrared light into the IR image sensor 122.

Further, the pivotable mirror 118 may redirect the visible light, transmitted through the dichroic beam splitter 116, to a visible imaging subsystem 124 capable of generating an image on the visible image sensor 126. The scope may further include a first image projector 128 capable of generating and projecting a first image on an input image port. For example, the image projector 128 can be a video projector 128 that projects video images generated by the infrared 122 or visible 126 image sensors onto an input image port of a Direct-View display (DV-display) 130.

In some cases, the scope 100 may further include a second image projector (second projector) 132, configured to project a second image onto an input image port of the DV-display 130. The second image projector 132 can be a reticle image generator or a reticle projector that projects a bore sighted reticle image onto an input image port of the DV-display 130. In some cases, the second projector 132 projects the reticle image onto the same image port as the video projector 128. In other cases, the second projector 132 projects the reticle image onto a different image port than the video projector 128 projects its image. In some embodiments, the second projector may also project images that comprise symbology in addition to or instead of the reticle image.

In some cases, the user may view a combined or composite image 117 through the exit window 114. The composite image may be a superposition of the reticle image projected by the reticle projector 132 (second projector) and a target scene or image generated by one or more of the image sensors 122, 126 and projected by the first projector (video projector) 128.

In some cases, the composite image 117 may be a combination of a direct-view image formed from light that enters the entrance window 112 and traverses to the exit window 114 without intermediary processing, and the reticle image. Additionally, in some cases, the composite image 117 may include symbolic information. This symbolic information may, in some cases, include the reticle image. Further, the symbolic information may include additional or auxiliary information or symbols indicative of additional data. The EPCU 110 may obtain the auxiliary information from one or more sensors 119. As illustrated in FIG. 1, the sensors 119 may be included as part of the scope 100. Alternatively, or in addition, one or more of the sensors 119 may be external to the scope 100. For example, one or more of the sensors 119 may be sensors integrated with a firearm or magazine useable with a firearm. Examples of the symbolic information may include, a number of cartridges within a magazine inserted into a firearm that includes the scope 100, a number of cartridges within a set of magazines registered with the firearm, battery life for one or more batteries in the scope 100, battery life for one or more batteries in the scope 100 or a magazine, wind speed, a distance from a target, an operating mode of the sight system, etc. The scope 100 may obtain data from the sensors 119 and/or other peripheral devices, through a wired or wireless communication channel. The wireless communication channel may be implemented using a Wideband Networking Waveform (WNW) or any other type of military communications protocol. Alternatively, or in addition, the wireless communication channel may use one or more personal or near-field communication protocols, including, but not limited to Bluetooth®, Zigbee®, and the like. In some cases, the communication between sensors 119 and/or peripheral devices, and the scope 100 may include direct contact electrical links, contact or non-contact optical links, and the like. The scope 100 may further include one or more user interfaces 134, which may enable the user to control and adjust various functions and parameters of the sight system (directly or via EPCU 110). For example, the user interface 134 may be used to activate/deactivate particular modes of the scope 100, to adjust or modify a configuration of the reticle image, to select particular symbology to display, and the like. The user interfaces 134 may be integrated with the sight system 100 or be individual modules (e.g., mounted on the weapon) that may communicate with EPCU 110 through wired, wireless or optical links. The user may use the user interface to control the one or more images presented by the DV-display 130 via the second (exit) window 114 by enabling or disabling the first or the second projector.

In some cases, the scope 100 may further include a third projector, which may be a low power projector that generates an image and projects it onto an input image port of the DV-display 130. In some cases, the third projector projects the image onto the same image port as the video projector 128. In other cases, the third projector projects the image onto a different image port than the video projector 128 projects its image.

Example Scope

Figure 2A:
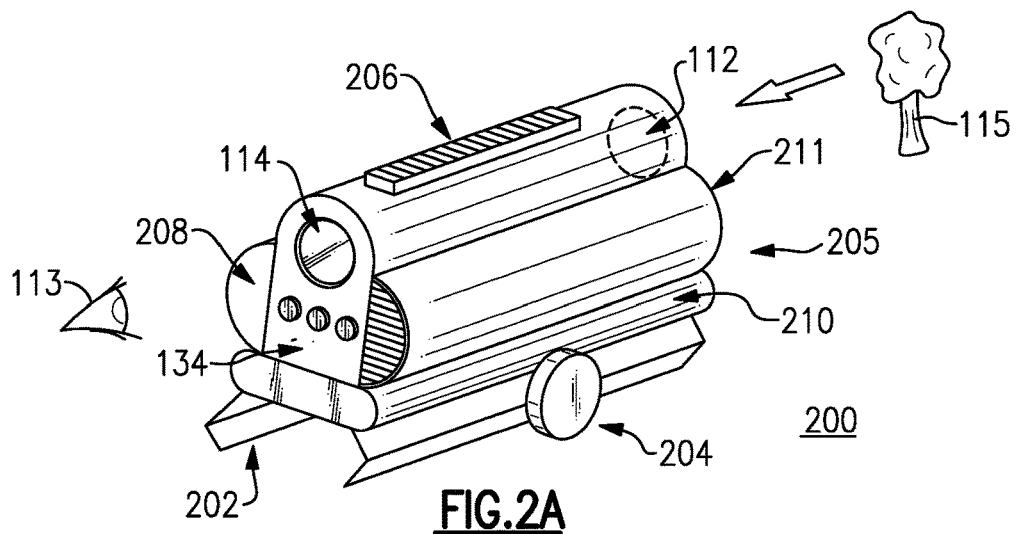
FIG. 2A illustrates a perspective view of an example scope or sight system in accordance with certain aspects of the present disclosure.

FIG. 2A illustrates a perspective view of an example firearm scope or sight system 200 in accordance with certain aspects of the present disclosure. The firearm scope 200 can include one or more of the aspects described with respect to the firearm scope 100.

Figures 2B, 2C:
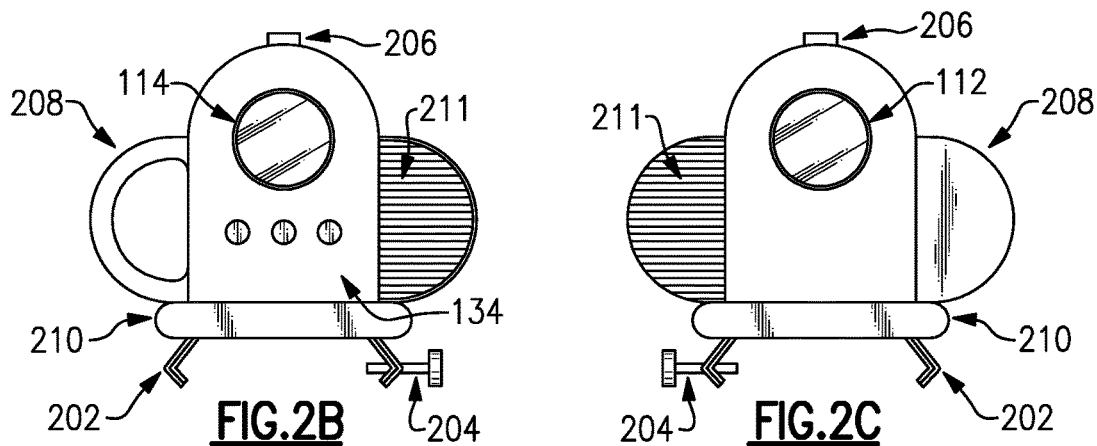
FIG. 2B illustrates a view of the rear face of the sight system in accordance with certain aspects of the present disclosure.
FIG. 2C illustrates a view of the front face of the sight system in accordance with certain aspects of the present disclosure.

The firearm scope 200 includes a housing 205 that may include two faces positioned at the two ends of the housing. One aperture may be provided on each face such that the scene 115 behind a first aperture on the first face can be directly seen by a user 113 looking through a second aperture provided on the second face. A first window 112 may be located in the first aperture provided on a first face of the scope 200 (also illustrated in FIG. 2C) and a second window 114 may be located in the second aperture provided on a second face of the scope 200 that is opposite to the first face (also illustrated in FIG. 2B). The first window 112 can be an entrance window that permits the entry of light. The light that enters the entrance window 112, may directly propagate toward the exit window 114 and/or be used to generate one or more video images that may be displayed using the DV-display 130. The second window 114 can be an exit window that permits a user to directly view the scene 115 behind the first window 112 and/or one or more images provided through the DV-display 130.

Figure 2D:
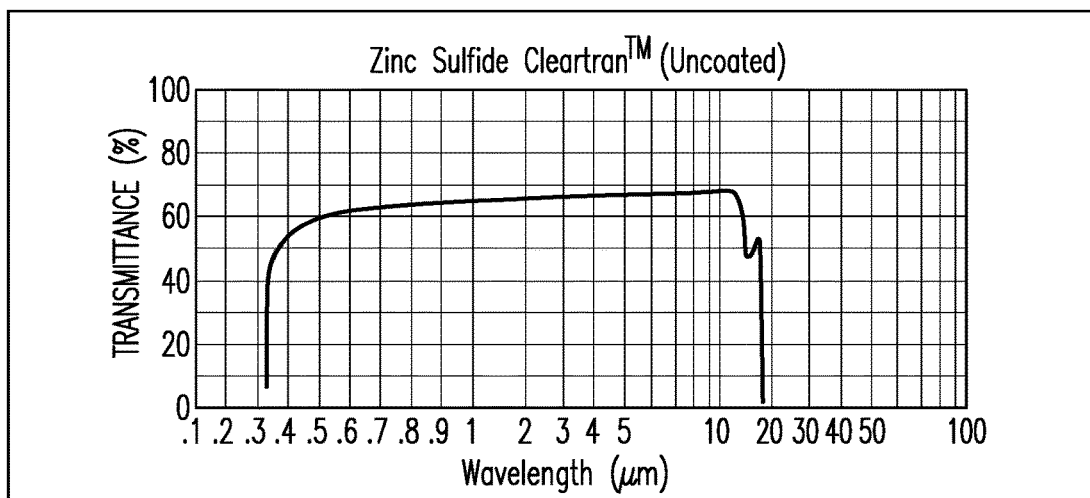
FIG. 2D shows the optical transmission (e.g., a measure of a ratio between transmitted and incident optical intensity) through an example zinc sulfide window plotted against the wavelength of the incident light.

The entrance window 112 may be formed from a material that is transparent (e.g., transmits at least 60% of the incident light) within a wavelength range spanning the visible light spectral range (e.g., 0.4-0.8 micrometers), near infrared light spectral range (e.g., 0.8-2.5 micrometers), mid infrared light spectral range (e.g., 2.5-8 micrometers), and long infrared light spectral range (e.g., 8-15 micrometers). In some cases, the material may also be transparent to the far infrared light spectral range (e.g., 15-100 micrometers). As a non-limiting example, the entrance window 112 can be formed from zinc sulfide. However, the entrance window 112 may be formed from other at least partially transparent materials. FIG. 2D shows the measured transmittance (a ratio between incident and transmitted optical intensities) through an example entrance window using zinc sulfide, plotted against the wavelength of the incident light. Additionally, in some implementations, the exit and/or entrance windows 114, 112, respectively, can include antireflection (AR) coatings (on one or both sides) to reduce reflection of visible and/or infrared wavelengths.

The exit window 114 may be formed from a material that is transparent at least for visible light. For example, the exit window 114 may be formed from a material having a luminous transmittance of greater than 80% using CIE illuminant D65. Some examples of materials that may be used for the exit window 114 include fused silica and other types of optical glasses, Plexiglass®, acrylic, plastic, or other materials that are transparent in the visible wavelength range. In some examples, the exit window 114 may be formed from a material that is transparent (e.g., transmits at least 60% of the incident light) within a wavelength range spanning the visible light spectral range (e.g., 0.4-0.8 micrometers), near infrared light spectral range (e.g., 0.8-2.5 micrometers), mid infrared light spectral range (e.g., 2.5-8 micrometers), and long infrared light spectral range (e.g., 8-15 micrometers). In some implementations, the exit window 114 can be tilted with respect to the entrance window 112 to prevent multiple collinear reflections between the two windows (112 and 114), between the exit window 114 and the DV-display 130, and/or between the entrance window 112 and the DV-display 130. The entrance window 112 and exit window 114 can both have different shapes (for example, circular or rectangular) and/or different thicknesses (for example between 2-5 mm). The entrance window 112 and exit window 114 can have the same or different shapes from each other. In some implementations, the entrance and exit windows 112, 114 may be configured differently or the same. Further, in some cases, the entrance window 112 may include one or more of the aspects described with respect to the exist window 114, and vice versa.

The housing structure 205 may be formed using metal, plastic, composites, a combination of the aforementioned materials, or other materials that may be both durable and light-weight for military applications and/or sport applications.

One or more interfaces may be provided on the housing 205, permit the user to electronically or mechanically adjust one or more features of the firearm scope 200. For example, the user interface controls 134 may enable the user to adjust a visible intensity of a reticle image and/or the reticle's position with respect to the exit window 114, switch between supported sight modes (for example, direct view, daylight video view, IR or thermal video view, and the like), adjust an amount of digital or electronic zoom, and the like. A user interface 134 may include buttons, or knobs attached to the housing and/or the electronic compartment. Alternatively, or in addition, a user interface 134 may include a touchscreen and/or haptic interface. In some implementations, the user interface 134 may be provided as a separate system that is remote from the firearm scope 200. For example, the firearm scope 200 may be controllable from a user interface that is part of a weapon capable of supporting the firearm scope 200. This remote user interface may communicate with the EPCU 110 through electric wires, a wireless link (e.g., Bluetooth), an optical link, or any other type of communication interface capable of providing commands from a remote user interface to the scope 200. In other implementations, the user interface 134 may be provided as a separate system mounted on a weapon rail of a weapon. In some such cases, in addition to wired, wireless and optical links, the user interface may communicate with the EPCU using a micro rail communication module, which may enable digital communication over power lines that may be integrated with the rail.

The housing 205 can include a rail mount 202 that allows the firearm scope 200 to be permanently or removably mounted to a mount of a weapon, for example, a receiving or mounting rail of a firearm, weapon system, or other device that may exploit the functionalities provided by the firearm scope 200. In some examples, the mount may comprise a Picatinny rail or a Weaver rail. The firearm scope 200 may be attached to a firearm or weapon using any type of attachment mechanism that enables the firearm scope 200 to be securely affixed to the weapon. For example, the firearm scope 200 may have a thumbscrew 204 that can be used to manually tighten and loosen the rail mount 202 to or from a receiving rail on a weapon. As another example, the firearm scope 200 can be attached using a snap-in mechanism, hooks, screws, bolts, and the like.

In some implementations, the housing 205 can include one or more mounting rails 206, which may be integrated with or otherwise attached to the housing 205 for mounting, powering, and/or connecting add-on modules to the firearm scope 200. In some cases, the add-on modules may also be bore-sighted. These add-on modules may include, for example, an ultraviolet imager, an infrared illuminator, a laser pointer, or the like. The mounting rails 206 and/or the rail mount 202 can be configured to be compatible with Picatinny rails, Weaver rails, or the like.

In some cases, the rail mount 202 and/or the integrated rail mounts 206 can be configured to provide and/or receive power to/from the firearm and/or the add-on modules. The power can be provided or received through inductive coupling or a direct electrical connection. The mounting rail 106 and/or the rail mount 102 may be also configured to exchange data between the firearm scope 200, the add-on modules, and/or the firearm (or other device) to which the firearm scope 200 is attached. Further, the data can be exchanged through non-contact optical, contact optical, direct contact electrical links, capacitive data transfer, or inductive data transfer.

The firearm scope 200 can include one or more power sources situated within or outside of the housing 205. For example, the housing 205 can include one or more separate batteries to provide power to the reticle projector and/or the electronic processing and control module (EPCU) 110. In some cases, the one or more batteries that power elements of the firearm scope 200 may be within the same compartment as the EPCU 110 and/or other electronics within the firearm scope 200 (e.g., the image sensors 122, 126). In other cases, one or more batteries may be housed in separate detachable compartments attached to the firearm scope 200. In yet some other cases, a power source can be positioned in a separate location from the firearm scope 200 and can be connected to the electronics of the firearm scope through electrically conductive lines. For example, one power source may be located within a handle of a firearm or weapon system and may be electrically connected or coupled to the firearm scope 200 (for example, via a mounting rail).

In certain aspects, the firearm scope 200 may be divided into multiple compartments. For example, the housing 205 may have three compartments: an optical compartment 208, an electronics compartment 210, and a battery compartment 211. It should be understood that more or fewer compartments may exist. For example, the components included in the electronic compartment 210 and the optical compartment 208 may be combined into a single compartment. As another example, the battery compartment 211 may be separated into two compartments, each having a separate battery. For instance, one battery compartment may have a battery (or set of batteries) to power the EPCU 110, and another compartment may have a battery (or set of batteries) to power the reticle projector 132.

The electronic compartment 210 can house the EPCU 110. The EPCU 110 may include electronic circuits that control and monitor an image sensor, a pivotable mirror, one or more the power sources, or other sensors 119 (e.g., inertial sensor, altimeter, wind sensor, light sensor etc.) and add-on devices (e.g., laser range finder, infrared illuminator) that may be included with or attached to the scope 200. Additionally the electronic compartment can include image acquisition and processing circuitry, and data acquisition (e.g., from sensors) and processing circuitry that may provide information pertaining the weapon or the environmental condition that may be used by the shooter during target acquisition and effective employment of the weapon.

Figure 3A:
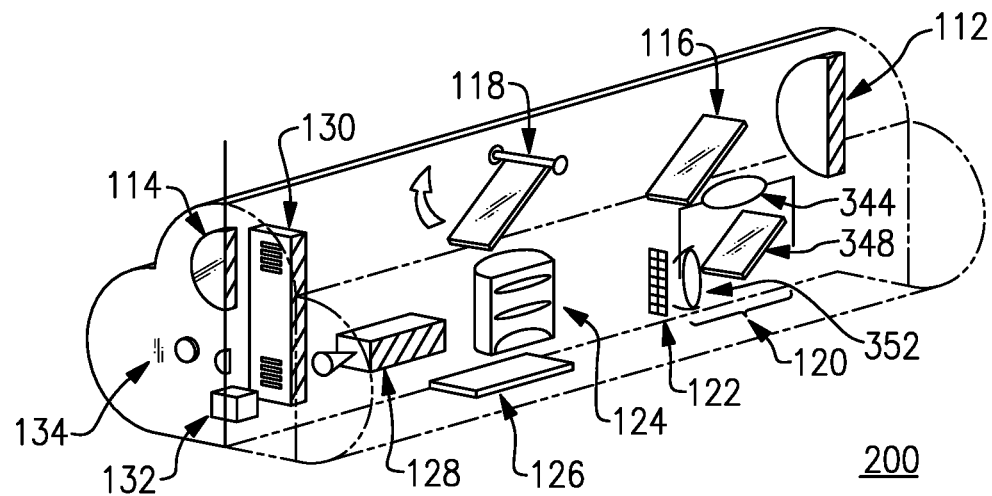
FIG. 3A illustrates a cross-sectional perspective view of the optical compartment of an example sight system in accordance with certain aspects of the present disclosure.
Figure 3B:
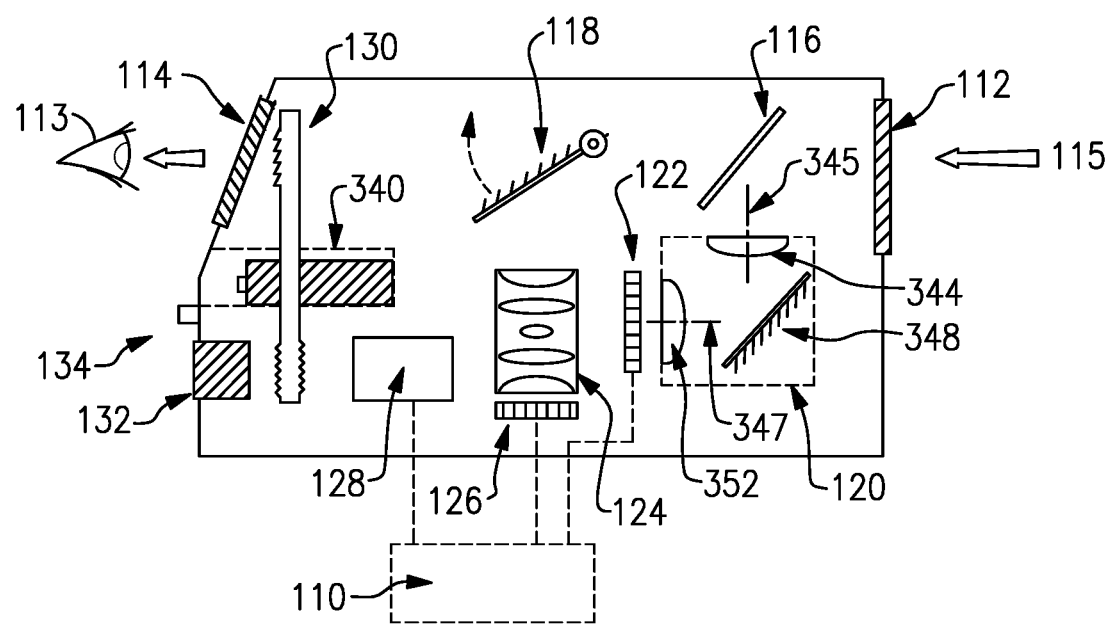
FIG. 3B illustrates a side-view cross-section of the optical compartment of an example sight system in accordance with certain aspects of the present disclosure.

FIGS. 3A and 3B illustrate a perspective cross sectional view and a side view of the optical compartment 208 of the example firearm scope 200. The components within the optical compartment 208 may be arranged and/or configured to enable direct view and/or video view, while providing a bore-sighted reticle image and/or symbolic information as a single composite image. The optical compartment 208 may include an entrance window 112 and an exit window 114 placed in the apertures provided on the first and second faces of the optical compartment respectively. Light may enter the scope through the entrance window 112 and the direct view or the video images may be viewed by the user through the exit window 114. The optical compartment 208 may further include a beam splitter 116, a pivotable mirror 118, an IR imaging subsystem 120, a visible imaging subsystem 124, an IR image sensor 122, and a visible wavelength image sensor 126. The beam splitter 116 may redirect a portion of incident IR light toward an IR imaging sub-system 120 while allowing transmission of a portion of incident visible light toward the pivotable mirror 118. The pivotable mirror 118 may redirect the incident visible light toward the visible imaging subsystem 124. The IR imaging subsystem 120 forms an IR image on the IR image sensor 122 that converts it to an electronic signal. The visible imaging subsystem 124 forms a visible image on the visible image sensor 126 that converts it to an electronic signal. Further, the optical compartment 208 may include a video projector 128 (that generates visible video images using the electronic signals received from the IR image sensor 122 or the visible image sensor 124), a reticle projector 132 that may generate an image of a reticle and a DV-display 130 that may generate a combined (composite) image by superimposing the images received from various projectors on board (e.g., reticle projector 132 and video projector 128) and the image seen directly through the optical path extended from the entrance window 112 to the exit window 114. The DV-display 130 may project the image of the reticle into the same plane as the video image, which may be associated with an electronic signal received from the IR image sensor 122 or the visible image sensor 124. Advantageously, by projecting the reticle image into the same plane as the video image (e.g., the visible light video image and/or the IR image), the positioning of the reticle may remain unchanged when the user views the images at different angles with respect to the video images. Further, as the video image and the reticle image are projected in the same plane, the perceived relative position of the images to each other remains constant regardless of the position of the user's eye; as a result a larger entrance and/or exit window may be used compared to traditional scopes and/or scopes that use optics within the viewing axis.

The beam splitter 116 may be a dichroic beam splitter or a wavelength selective reflector (or mirror) that allows a portion of optical intensity within a first wavelength range (e.g., in the visible region) to be transmitted while reflecting a portion of optical intensity within a second wavelength range (e.g., in the IR region). For example, the dichroic beam splitter may transmit more than 90% of the optical intensity having a wavelength between 0.4 micrometers and 0.9 micrometers and reflect more than 90% of the optical intensity having a wavelength between 8 micrometers and 15 micrometers. The beam splitter 116 may be positioned between the first window 112 and the pivotable mirror 118. Further, the beam splitter 116 may be positioned above the IR imaging sub-system 120. It should be understood that the described relative positioning of the elements described herein is exemplary, and that other positions are possible. For example, the beam splitter 116 may be positioned below the IR imaging sub-system 120 and the beam splitter 116 may reflect infrared light up towards the IR imaging sub-system 120.

The dichroic beam splitter 116 may be tilted with respect to the front window 112 in order to reflect the incoming light beam toward the IR imaging sub-system 120. For example, the angle between the first window 112 and the beam splitter 116 can be 45 degrees or 60 degrees. The beam splitter 116 may be formed from a piece of material that may transmit, for example, 90% of the optical intensity within a selected wavelength range (e.g., between 0.4 micrometers and 0.9 micrometers) with one or more dielectric layers coated on the side of the beam splitter 116 facing the entrance window 112. The coated layer may reflect more than 90% of the optical intensity within the long wavelength IR (LWIR) range (e.g., 8-15 micrometers).

The pivotable mirror 118 may be positioned between the beam splitter 116 and the DV-display 130. The state of the pivotable mirror can be switched between "ON" and "OFF" states, or between a video-view state and a direct-view state. In the OFF or direct-view state, the pivotable mirror 118 may be positioned to not block the optical path between the beam splitter 116 and the DV-Display 130. In cases when the pivotable mirror 118 is in the OFF state, the user can directly see a scene behind the entrance window 112 (e.g., the target). In the ON state, the pivotable mirror 118 may be positioned to reflect the light rays emerging from the beam splitter 116 toward the entrance aperture of the visible imaging subsystem 124 enabling a visible light video view. In other words, the reflection of the light towards the visible imaging subsystem 124 enables a video digital image of the target scene 115 to be generated for presentation to a user on the DV-display 130. The state of the pivotable mirror 118 can be electronically or mechanically controlled by the user. The pivotable mirror 118 can be a metallic or dielectric mirror that reflects, for example, more than 95% or the optical intensity in the visible range (e.g., between 0.4 and 0.9 micrometers). As another example, the pivotable mirror can be a silver coated mirror which reflects more than 89% of optical intensity between 0.4 micrometers and 10 micrometers. The pivotable mirror 118 can be a pivotable mirror that in the OFF state can be pivoted up, or out of an incident path of the visible light, or in the ON state can be pivoted down, or into the incident path of the visible light, by mechanical rotation or movement, which may be controlled mechanically or electrically. Alternatively, the state of the pivotable mirror 118 can be switched using a step motor (or other electromechanical actuators) controlled by the user via the user interface 134 and/or EPCU 110. In some cases, the pivotable mirror 118 can be an electrochromic mirror mounted at a particular position and/or a particular angle (e.g., 45 degrees or 60 degrees) with respect to the optical axis of the visible imaging subsystem 124. The state of the electrochromic mirror can be switched by the user by means of electronic signals sent from the EPCU 110 to the electrochromic mirror. In the ON state, the electrochromic mirror 118 may reflect more than 90% of the optical intensity having a wavelength within the visible range (e.g., 0.4-0.9 micrometers). In the OFF state, the electrochromic mirror 118 may transmit more than 90% of optical intensity having a wavelength within the visible range (e.g., 0.4-0.9 micrometers).

The infrared imaging subsystem 120 may be positioned below the dichroic beam splitter 116 and in front of the infrared image sensor 122. As previously described, the relative position of elements as described herein is exemplary, and other positions are possible. Thus, for example, in some other cases the infrared imaging subsystem 120 may be positioned above the dichroic beam splitter 116. The infrared imaging subsystem 120 may function as an infrared telescope. Further, the exit aperture of the imaging subsystem 120 may be rotated with respect to the entrance aperture. For example, the exit aperture may be 90 degrees rotated with respect to the entrance aperture. The infrared imaging subsystem 120 may generate a thermal image of objects placed at distances much larger than the focal length of the system. A thermal image may include an image that illustrates and/or is formed based on an amount of heat that one or more objects generate or emit. For example, the heat of a human or animal may be distinguished from the heat emitted by a brick or wooden wall.

The infrared imaging subsystem 120 may comprise a first lens (objective lens) 344, an IR mirror 348 and a second lens (eyepiece) 352. In some non-limiting implementations, the optical axis 345 of the first lens 344 is rotated with respect to the optical axis 347 of the second lens 352 (e.g., the rotation angle can be 30, 45, 60 or 90 degrees). The focal length of the first lens 344 may differ (for example, be larger) than the focal length of the second lens 352. Further, the infrared mirror 348 can be placed at an angle (e.g., 45 degrees or 60 degrees) with respect to the optical axis 345 of the first lens 344 in order to deflect the light rays emerging from first lens 344 by 90 degrees.

In some implementations, the first and second lenses can be formed from a piece of material coated with one or more dielectric layers that transmit more than 80% of the incident optical intensity having a wavelength between 8 and 15 micrometers. For example, the first and second lenses may be formed from a piece of germanium coated with one or more dielectric layers such that the lens transmits more than 84% of the incident optical intensity having a wavelength in the LWIR range (e.g., between 8 and 15 micrometers). The coated dielectric layers may form a broadband antireflection (BBAR) layer. The IR mirror 348 can be made of semiconductor, dielectric or metallic materials. In some cases where the IR mirror 348 is made from a semiconductor or dielectric material, the reflecting surface of the IR mirror 348 that faces the first lens 344 and second lens 352 may be coated with a layer that reflects, for example, more than 95% of the incident optical intensity having a wavelength in the LWIR range (e.g., between 8 and 12 micrometers). As another example, the IR mirror 348 may be a metallic mirror comprising a gold layer disposed on an aluminum substrate (e.g., aluminum 6061-T6), which reflects more than 98% of the incident optical intensity having a wavelength between 2 and 12 micrometers.

The IR image sensor 122 may be positioned at the exit aperture of the infrared imaging system 120. The IR image sensor 122 may convert the optical intensity variations in the IR wavelength range (e.g., wavelength in the 1-15 micrometers range) to a video signal or other type of electronic signal (e.g., digital). Further, the IR image sensor 122 can generate an image, or electronic data that can be converted into an image and may be projected by the video projector 128. In some cases, the EPCU 110 may process data received from the IR image sensor 122 to generate or refine an image. The image generated by the image sensor 122 or the EPCU 110 may appear equal in size to a user as a target scene 115 directly viewed by a user (e.g., using a direct-view mode or without using a scope). Alternatively, the image generated by the image sensor 122 may be zoomed in or out compared to directly viewing the target scene 115.

In some implementations, the IR image sensor 122 may be, or may include, a focal-plane array (FPA). For example, the IR image sensor 122 can be a focal-plane array (FPA) of 640 by 480 pixels where the size of each pixel may vary between 10 and 20 micrometers. The FPA can be sensitive to infrared radiation with wavelengths between 2 micrometers and 6 micrometers, between 6 and 8 micrometers, or between 2 and 15 micrometers. The FPA may also be a thermal image sensor that is sensitive to LWIR or thermal radiation having a wavelength between 8 micrometers and 15 micrometers. The IR image sensor 122 can be configured to generate the same bore sighted image as the direct view channel. The IR image sensor 122 can be a cooled or uncooled image sensor. Cooling the image sensor may reduce the electronic noise in the sensor. If cooled, the IR image sensor 122 may be placed on a cooling device (e.g., thermo-electric cooler, TEC) that may be provided to maintain its temperature below a selected value (e.g., −10, −20, or −40 or −80 degrees centigrade).

In some aspects, the IR image 122 sensor can be a zoom-capable imager. In some cases, the user can adjust the magnification settings of the IR image sensor 122 using one or more user interfaces. In some cases, the combination of the infrared image sensor 122 with the infrared imaging, subsystem 120 can provide an effective field of view of between 2 degrees and 18 degrees depending on the selected magnitude of the digital zoom. For example, in a case without magnification when the video image is the same size as the direct view image, the field of view can be 18 degrees. In contrast, when the magnification is set to 8×, the field of view may be reduced to 2 degrees. For any given magnification, the effective field of view may exceed 18 degrees (e.g., the effective field of view nay be 30, 60, 90 degrees)

The IR image sensor 122 can be made of a semiconductor material. For example, the IR image sensor 122 can be made of mercury cadmium tellurite (HgCdTe) or an antimonide based material (e.g., InAs, GaSb, AlSb). The semiconductor material can be a superlattice made of one or more of the aforementioned materials. Alternatively, the IR image sensor 122 can also be formed from an array of microbolometers.

The visible imaging subsystem 124 may include one or more of the aspects described with respect to the infrared imaging subsystem 120. Further, the visible image sensor 126 may include one or more of the aspects described with respect to the infrared image sensor 122.

The visible imaging subsystem 124 may be positioned below the pivotable mirror 118 and above the visible image sensor 126. As previously described, the relative position of elements as described herein is exemplary, and other positions are possible. Thus, for example, in some other cases, the visible imaging subsystem 124 may be positioned above the pivotable mirror 118 and below the visible image sensor 126. The visible imaging subsystem 124 may generate a real or visible light image of one or more objects viewed via entrance window 112. These objects may be placed at distances much larger than the focal length of the imaging subsystem 124. The visible light subsystem 124 may operate within the visible wavelength range (e.g., 380-740 nanometers) or an extended wavelength range that includes the near IR region (e.g., 0.4-2.5 micrometers).

The visible image sensor 126 may be positioned at the image plane of the visible imaging subsystem 124. The visible image sensor 124 may convert the spatial variations of optical intensity in the visible wavelength range or visible and near IR wavelength ranges, to a video signal or digital data. The image sensor may be placed below the visible imaging subsystem 124 at its focal length (image plane). For example the visible image sensor 126 can be a focal-plane array (FPA) with 3848 by 2168 pixels where the size of each pixel size may vary between 2 and 4 micrometers. The peak sensitivity of the visible image sensor 126 may be located in the visible wavelength range, for example, between 0.4 micrometers to 0.7 micrometers. The visible image sensor 126 can be configured to generate the same image that is viewable via the direct view channel. Alternatively, or in addition, the visible image sensor 126 may formed a zoomed in or out image of what may be viewable via the direct view channel. The displayed image may be a bore-sighted image.

The visible image sensor 126 can be any type of sensor that can generate an image based on visible light. For example, the visible image sensor 126 may be a charge coupled display (CCD) sensor or a CMOS sensor. Further, the visible image sensor 126 can be a zoom-capable imager capable of generating a zoomed image that can be smaller or larger compared to the direct-view image. The amount of magnification can be adjusted by the user through one or more user interfaces. Further, the visible image sensor 126 can be combined with the imaging subsystem 124. The combined visible image sensor 126 and imaging subsystem 124 can have an effective field of view of between 2 degrees and 18 degrees. The generated image of the visible image sensor 126 can be converted to an electronic signal that is based in part on the magnitude of the selected digital zoom. For example, when no magnification is selected, the video image may be the same size as the direct view image, or the view of the target scene 115 through the direct-view channel, or without the scope 200. In some such cases, the field of view can be 18 degrees. In contrast, when a magnification of 8× is selected, the field of view may be reduced to 2 degrees. For any given magnification, the effective field of view may exceed 18 degrees (e.g., the effective field of view may be 30, 60, 90 degrees)

The electronic signals generated by the visible image sensor 126 or the IR image sensor 122 may be received, amplified, and processed by the EPCU 110 to generate a video signal. This video signal may be provided to a projector 128 that generates or projects an image on the DV display 130. The projected image may be based on the image projected on the visible image sensor 126 by the visible imaging subsystem 124 and/or on the image projected on the IR image sensor 122 by the IR imaging subsystem 120. The image generated by the projector 128 may be output by an exit aperture of the projector 128. The video projector 128 can be an LCD or LED based monochrome or color microdisplay. The video projector 128 can be configured to project imagery, symbology, and/or other types of visual data received from EPCU 110. The video projector 128 may be positioned such that it can provide an image corresponding to the image received by one of the image sensors 122, 126 to the DV-display 130.

Figure 4A:
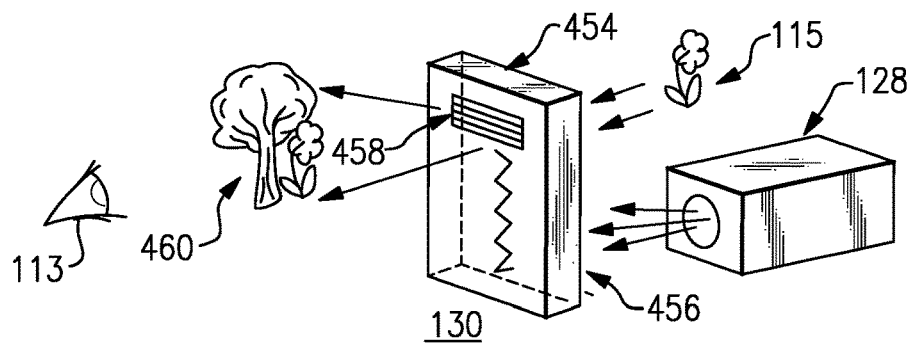
FIG. 4A illustrates a perspective view of an example direct view display (DV-display) with one input image port and one output image port.

FIG. 4A illustrates a perspective view of an example DV-display 130 (also referred to as holographic display or waveguide display). The DV-display 130 may be used to simultaneously observe a scene 115 (e.g., a target scene) behind the DV-display 130 (or external to the scope 200) and a video image received from the projector 128 as a composite image 460. For example, the DV-display 130 may be configured to project an image received from the projector 128 on the same image plane where the scene is imaged such that an observer 113 (a user of the firearm scope 200) can simultaneously focus on both parts of the composite image 460 (the scene image and the projected image). In some cases, by simultaneously viewing the scene 115 and a video image, an augmented reality image may be formed. In the example shown the composite image 460 may be an augmented reality image.

Alternatively, or in addition, the DV-display 130 may be used to observe the video image projected from the projector 128 without directly viewing the scene 115. In yet other cases, an observer may view the scene 115 through the DV-display 130 without viewing a video image, or while viewing a reticle image, but not a video-image of a scene.

The DV-display 130 may be positioned inside the scope housing 205 (or inside the optical compartment 208 of the housing 205) such that its output image port 458 faces the exit window 114 and its input port 456 faces the exit aperture of the projector 128. The DV-display 130 may receive an image from the video projector 128 through its input image port 456 and may output a corresponding image through its output image port 458 that may be seen by the observer 113 through the exit window 114. Simultaneously, if light rays entering the scope 200 via the entrance window 112 are incident to the DV-display 130, the observer 113 may also see an image of the outside world (scene 115) or a direct view image. As such, the DV-display 130 can superimpose the video image received from the projector 128 with the direct view image received through the entrance window 112 to form an augmented reality display.

The DV-display 130 can be a waveguide display. The waveguide display can be a transparent display substrate comprising a waveguide 454 such as a slab waveguide 454 formed from a piece of material that is transparent in at least the visible wavelength range (e.g., having a luminous transmittance of greater than 80% using CIE illuminant D65) and is capable of transporting the image received from one or more input image ports 456 to the output image port 458. In some examples, the waveguide 454 can be a holographic waveguide or any other type of waveguide that can be used to facilitate displaying a video image to an observer while permitting the observer to see through the waveguide when the scope operates in a direct-view mode or a combined direct-view and video and/or thermal view mode.

The image may be transmitted from the input image port(s) 456 to one or more output image ports 458 by means of total internal reflection (TIR). The input image port 456 may be disposed at or near one edge (e.g., a bottom edge) of the waveguide 454 and the output image port 458 may be disposed at or near a different edge (e.g., a top edge) of the waveguide 454. The input image port 456 may be configured to receive an image (e.g., from a display or projecting device) and transform it into guided waves (or a bundle of optical rays propagating inside the waveguide) that can travel inside the slab waveguide 454. The output image port 458 may be configured to transform the guided waves (or a bundle of optical rays) into an output image 460 that can be observed while looking at the scene behind the slab.

Figure 4B:
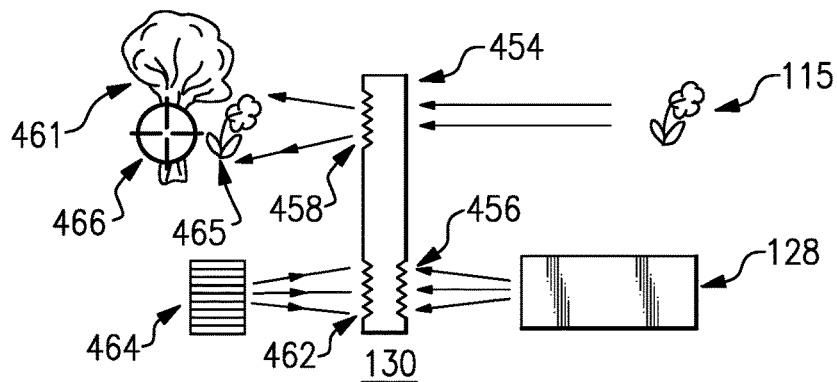
FIG. 4B illustrates a side-view of an example DV-display with two input image ports and one image output port.

In some implementations, the DV-display 130 can have a first input image port 456 and a second input image port 462 disposed on the same or opposite faces of the waveguide 454 near a particular edge (FIG. 4B). Although not limited as such, the input and output ports of the waveguide 454 may be positioned near an edge so that the various electronics and non-transparent components of the scope 200 are not positioned within the direct-view channel preventing the components of the scope 200 from blocking a user's direct-view of a target scene 115. Further, the first input image port 456 and the second input image port 462 can be a first optical input location and a second optical input location of the waveguide display (DV-display) configured to receive two separate images from two distinct projecting devices. The two separate images received from the first input image port 456 and the second input image port 462 may be guided by the waveguide 454 and generate a composite image through the output image port 458 of the waveguide 454. The composite image may be superimposed on the direct-view image seen through the transparent waveguide 454. The waveguide 454 may be configured to project the image received at the first image input port 456 and the image received at the second input port 462 into the same image plane so that an eye of the observer 113 (e.g., a user of the firearm scope) can simultaneously focus on different parts of the composite image. Advantageously, by projecting both images into the same plane the positioning of the two images remain unchanged when the user views the images at different angles with respect to the video images.

In the example shown in FIG. 4B, the first input image port 456 and a second input image port 462 may be disposed on the opposite faces of the waveguide 454. The first image 461 is received from the first projector 128 and the second image 466 is received from the second projector 132. These images 461, 466 may be superimposed on the direct view image 465 of the scene behind the DV-display 430 resulting in a composite image. In the example scope 200 shown in FIGS. 3A and 3B, this composite image can be viewed through the exit window 114. As a non-limiting example, the second projector 132 can be a reticle projector 132 and the second image 466 can be the image of a reticle generated by the reticle projector 132. The reticle image 466 generated through the output image port 458 of the DV-display 130 can be parallax free within the field of view of the sight system. In some implementations, the reticle projector 132 can be configured to project alternative or additional symbology corresponding to data generated or received by the scope 200. For example, the reticle projector 132 can project a magazine cartridge count associated with a number of cartridges within a magazine inserted into a weapon. In yet other cases, a separate projector may be used to project symbology that is separate from the reticle projector 132. As described above, the reticle image 466 and the first image 461 (e.g., a video image generated using an electronic signal received from the IR image sensor 120 or the visible image sensors 126), may be projected on the same image plane. Advantageously, when the first image 461 and the reticle image 466 are projected in the same plane, the perceived relative position of the reticle image 466 and the first image 461 to each other remains constant regardless of the position of the user's eye; as a result a larger entrance and/or exit window may be used compared to traditional scopes and/or scopes that use optics within the viewing axis.

In some cases, coupling optics (e.g., an optical beam combiner) may be used to combine multiple images received from different image sources or projectors to form a composite image. The composite image may then be supplied to one of the input ports 456 or 462 of the DV-display 130.

For example, the coupling optics may combine a first image output by the first image projector 128 and a second image output by the second image projector 132, to obtain a third image comprising the second image superimposed on the first image. Subsequently, the coupling optics may project the third image onto the first image port 456 or the second image port 462 so that the user can observe the third image via the output image port 458.

Figure 4C:
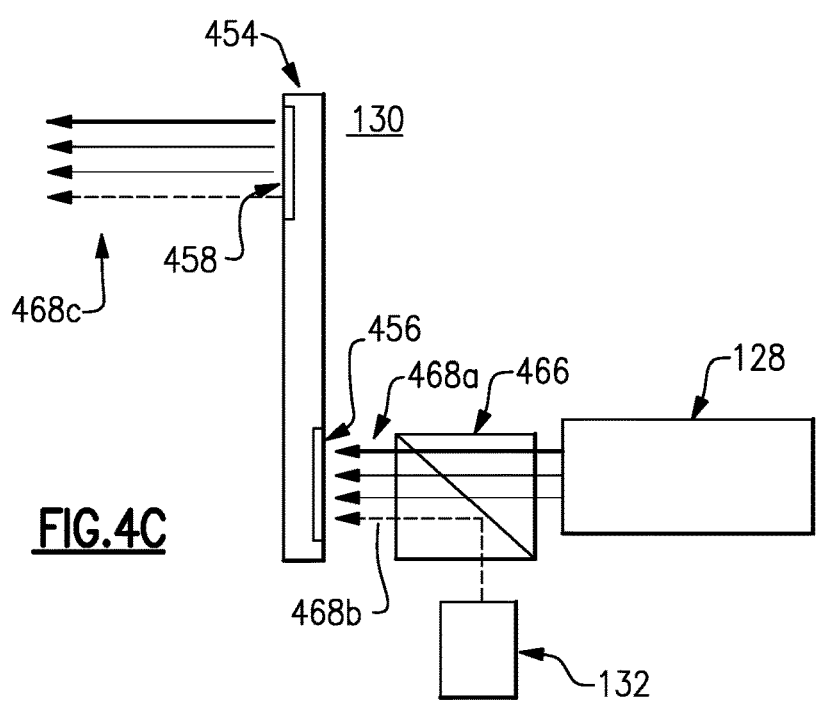
FIG. 4C illustrates a side-view of an example DV-display with one input image port and one image output port that receives a composite image generated by two projectors and a beam combiner.

In some examples, a beam combiner may be used to combine images received from multiple sources. The multiple sources may include multiple projectors or a projector and light receiving from an input window. FIG. 4C illustrates a DV-display 130 with a single image input port 456 configured to receive a composite image from a beam combiner 466. The beam combiner may include any type of lens, dichroic mirror, or other device that can combine beams or rays of light. The beam combiner 466 can receive a first image from a first projector 128 (e.g., a video projector) and a second image from a second projector 132 (e.g., a reticle projector, a thermal image projector, or a second video projector) and outputs a composite image comprising a superposition of the first and the second images. In the example shown, a bundle of rays 468a, illustrated by the solid line arrows, represent the first image received from the first projector 128 (e.g., an image generated using a video signal received from the visible image sensor 126 or the IR image sensor 122), and the ray 468b, illustrated by the dotted line arrow, represents the second image received from the second projector 132. The beam combiner 466 (a beam splitting cube in this case), may be configured to allow the bundle of rays 468a to pass without refraction and reflect (or redirect) the ray 468b, received from a direction perpendicular to the direction of propagation of the bundle of rays 468a, such that all rays are normally incident on the input image port 456. It should be understood that the rays may be received at different angles than illustrated with the beam combiner 466 being positioned at an angle that enables the beams from the two sources to be combined. Once coupled to the waveguide 454, the rays 468a and 468b propagate towards the image output port and are coupled out as a single bundle of rays 468c (representing the composite image formed by combining the first and the second image). The beam combiner 466 can be a beam splitter cube (the example shown) comprising two right-angle prisms glued together along their major surfaces. When used in reverse the beam splitter cube may function as a beam combiner. In some examples, the beam combiner 466 can be a holographic beam combiner or other type of optical beam combiner. Further, it should be understood that more than two sources can be combined by the beam combiner. For example, a visible light video image, a thermal image, and a reticle image can be combined with the beam combiner 466. In some cases, multiple beam combiners may be used. For example, the visible light video image may be combined with a thermal or LWIR image using a first beam combiner. The resultant image may be combined with a reticle image using a second beam combiner. The resultant image from the second beam combiner may be provided to the waveguide 454 via the input port 456 and presented to the user via the output port 458.

Advantageously, using a single DV-display with a beam combiner may reduce the overall size of the display system while supporting displaying composite images. For example, using a single port DV-display and a beam combiner in firearm scope 200 or 1300, may allow positioning both projectors (e.g., the video projector 128 and the reticle projector 132), on the same side (e.g., the right side (FIG. 12A) or on the left side (FIG. 15A)) of the DV-display 130. In some cases, positioning both projectors on the same side enables the DV-display 130 to be positioned closer to the rear side of the housing (near the exit window 114) compared to embodiments that position a projector on each side of the DV-display 130. In some embodiments, the space freed up by positioning both projectors on one side of the display may be used to place some of the electronic components or systems. In some other embodiments, moving both projectors on one side of the DV-display 130 may allow positioning the DV-display closer to rear end of the firearm scope 200 or 1300 and closer the exit window 114; such configuration may facilitate viewing images projected via the DV-display 130 while reducing the overall size of the housing and therefore the firearm scope 200 or 1300.

In some embodiment, a third video projector may generate a third image and couple the third image to the waveguide 454 through the first or second input image port (e.g., image input port 456 or 462). In some other embodiments, the slab waveguide 454 may have a third input image port to receive the third image projected by the third camera. In yet other embodiments, the image generated by the third video projector may be combined with the image generated by the first or the second projector using a beam combiner and may be coupled to the waveguide 454 via the first or the second input image port. In various embodiments, multiple beam combiners may be used to generate composite images based on images received from multiple projectors and couple the composite images via one or more ports of the DV-display.

In some examples, the third projector may be a low power projector that also receives video signals from the IR image sensor 122 and/or the visible image sensor 126. Advantageously, in certain embodiments, the power consumption of the scope can be reduced by using the third projector in video-view mode. In some cases, the low power projector can be a projector with lower resolution, lower brightness, or support a narrower range of colors.

The images emerging from the DV-display 130 (e.g., images received from the visible image sensor, the IR image sensor, and/or the reticle projector) can be collimated so that the user's eye can simultaneously focus on the superimposed images or the composite image. Moreover, each of the images constituting the composite image can be boresighted.

The input image port(s) 456, 462 and the output image port 458 of the waveguide 454 may comprise one or more diffraction gratings (e.g., surface grating or holographic gratings) disposed on an optical input location or on an optical output location of the waveguide 454. The diffraction gratings may include periodic structures that are disposed along one of the faces of the slab waveguide 454 and are capable of converting an image to a guided wave and vice versa. In some other implementations, the input image ports 456, 462 and the output image ports 458 may include transreflective micro-mirrors or transparent mirrors embedded inside the waveguide 454. The diffraction gratings can be etched or optically generated on or below the surface of the waveguide 454. The entrance or exit gratings may comprise multiple diffraction gratings. The diffraction gratings may be disposed using direct writing (e.g., using a focused ion beam device) or lithography that uses patterned photoresist and etching. In the lithographic approach, the photoresist may be pattered using a photomask, e-beam, or holography. In some such cases, where the gratings are generated using holographic methods) the resulting DV-display 130 may be referred to as holographic waveguide display.

The diffraction gratings in the input image port may be configured to diffract light projected by a projector into a point of ingress of the waveguide (e.g., a holographic waveguide), such that the resulting diffracted light propagates inside the waveguide 454 and is guided by the waveguide 454. The diffraction gratings in the output image port may be configured to diffract guide light inside the waveguide, such that the resulting diffracted light is coupled out of the waveguide and propagate, in free space, toward the exit window 114.

In some embodiments, the DV-display may include a stack of waveguides (or waveguide layers) that may receive one or more images from one or more input image ports. Each waveguide may have an input image port comprising one or more diffraction gratings (e.g., one or more surface relief gratings or holographic gratings), configured to couple a portion of an image received from an image projector (e.g., first projector 128 or the second projector 132) to the waveguide layer. In some cases, the portion of image can be a portion generated by light having a wavelength within a specific wavelength range associated with the waveguide layer. For example, each waveguide layer in the stack of waveguides may be configured to receive and transport light within a specific wavelength range associated with a color (e.g., blue layer for blue light having wavelength between 0.400 and 0.520 micrometers, green layer for green light having wavelength between 0.520 and 0.520 micrometers, and red layer for red light having wavelength between 0.625 and 740 micrometers). In some examples, different portions of an RGB output of a projector may be received via the input image ports of different waveguide layers and generate a color image at an output image port of the stack of waveguides. The output image port of the stack of waveguides can be an output image port that receives images from the output ports of the waveguide layers. In some embodiments, where the DV-display 130 includes a stack of waveguides, the DV-display 130 can generate a composite image (e.g., by the superposition of two or more images transported by two or more of the waveguide layers) through an output image port.

In some embodiments, an image projector (e.g., the first image projector 128 or the second image projector 132) may be configured to project the light within the red wavelengths to an input port of the red layer, project the light within the green wavelengths to an input port of the green layer, and project the light within the blue wavelengths to an input port of the blue layer.

In some embodiments, the input image port(s) 456, 462 and the output image port 458 of the waveguide 454 may comprise an array of micromirrors embedded within an input optical coupling region or output optical region of the waveguide 454. The array of micromirrors of an input image port (or optical input region) of the waveguide may be oriented to redirect light projected by a projector onto the input image port so that light propagates inside the waveguide. The array of micromirrors of an out image port (or optical output region) of the waveguide may be oriented to redirect light propagating in the waveguide so that light exits the waveguide and propagates in free space (e.g., toward the exit window 114).

Figure 5A:
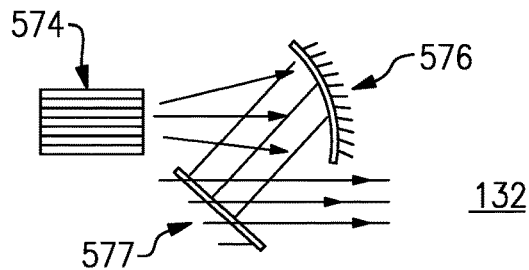
FIG. 5A illustrates an example of a reticle projector comprising a point-like light source, a concave mirror, and a flat mirror.

FIG. 5A illustrates examples of certain aspects of the reticle projector 132. In some such examples, the reticle projector 132 may comprise a point-like light source 574 (e.g., an LED, a laser diode, etc.), a concave mirror 576, and/or a flat mirror 577. The light emitted by the light source 574 can be collimated by the concave mirror 576 and reflected toward the entrance grating 462 of the DV-Display 130 by the flat mirror 577.

Figure 5B:
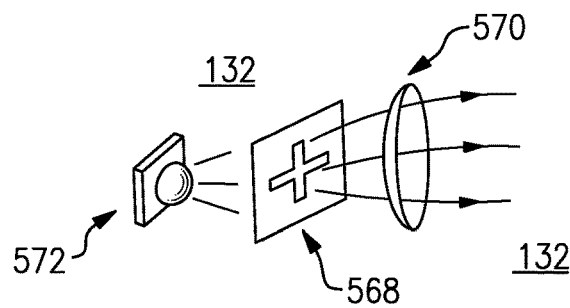
FIG. 5B illustrates an example of a reticle projector comprising a light source, a reticle mask, and a lens.

FIG. 5B illustrates additional examples of certain aspects of the reticle projector 132. The reticle projector 132 can comprise an illuminator 572 (e.g., a laser diode), a reticle mask 568, and an imaging lens 570. The illuminator 572 can be a point-like light source (e.g., LED, laser, etc.) that illuminates the reticle mask 568. The reticle mask 568 can be an opaque film with a transparent region which has the shape of a reticle. One or more imaging lenses 570 may be positioned between the reticle mask 568 and one of the input image ports 462 of the DV-display 130. When the reticle mask 568 is illuminated, the imaging lens 570 may form an image of the reticle on the input image port 462 of the DV-display 130. The image projected on the input image port 462 can be a collimated image.

Figure 5C:
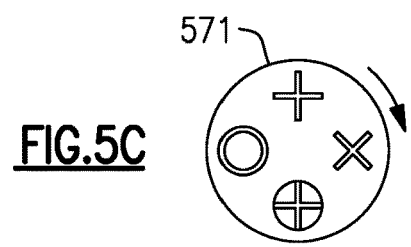
FIG. 5C illustrates an example of a rotatable multi-pattern reticle mask that allows selecting from two or more reticle patterns.

The reticle mask 568 can include more than one reticle pattern. For example, FIG. 5C shows a reticle mask 571 with multiple reticle patterns. This mask 571 can be a rotatable mask that allows user to select one of the reticle patterns as projected pattern, by rotating the mask.

Figure 5D:
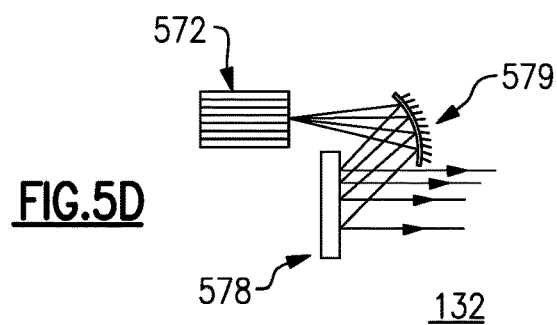
FIG. 5D illustrates an example of a reticle projector comprising a light source, a concave mirror and a reticle grating.
Figure 5E:
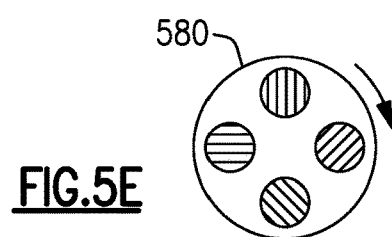
FIG. 5E illustrates an example of a rotatable multi-pattern reticle grating that allows selecting from two or more reticle patterns.

FIG. 5D illustrates yet additional examples of aspects of the reticle projector 132. The reticle projector 132 may comprise an illuminator 572 (e.g., a laser diode), one or more mirrors 579, and a reticle grating 578. The illuminator 572 can be a point-like light source (e.g., LED, laser, etc.). The light emitted by the illuminator 572 may be collimated by the mirror 579 and redirected toward the reticle grating 578. The reticle grating 578 may be configured to diffract light such that the diffraction pattern corresponds to the desired reticle image. The reticle grating 578 can generate a collimated reticle image that can be projected on the input image port 462 of the DV-display 130. Further, the reticle grating 578 can include more than one grating for generating more than one reticle image. For example, FIG. 5E shows a reticle mask 580 with multiple reticle gratings. This reticle mask 580 can be a rotatable grating that allows a user to select one of the reticle patterns as a projected pattern by rotating the reticle mask 580.

The multi-pattern reticle mask 571 or the multi-pattern reticle grating 580 may be rotated directly or using an eletromechanical actuator controlled by the user via the user interface 134. The position and orientation of the reticle image generated by the reticle projector 132 can be manually controlled by the control buttons or knobs, for example, through direct mechanical manipulation of the reticle mask 568, flat mirror 577, or the reticle grating 578. Manually operable rotary knobs can be provided on the rear face of the housing, for example, below the exit window 114 (as shown in FIGS. 2A and 3A) or other locations on the housing 205 that enable operation or configuration of the reticle projector 132 by the user. In other examples, the user interface 134 may be used to adjust the position/orientation of the reticle image by changing the position and direction of the illuminator 572 itself. In yet other examples, the reticle image can be adjusted by adjusting a configuration of the reticle projector 132. The ability to adjust the position of the reticle in the field of view of the scope enables a user to manually bore-sight the reticle image.

The housing 205 may include one or more battery compartments 211 that can provide power to electronic, optical and electro-mechanical components and systems employed in the scope 200. In some embodiments, the one or more batteries that provide power to the reticle projector 132 may be positioned inside a compartment within the housing 205 and the one or more batteries that power other electronic, optical, and/or electro-mechanical components within the scope 200 may be located within one or more detachable modules. Advantageously, in certain aspects, by providing a separate power source for the reticle projector (the second projector) 132, the reticle may be displayed to a user regardless of a charge-state of the one or more batteries that power the components that create the video-views or provide other features of the scope 200. Moreover, as the reticle projector 132 may use significantly less power than the EPCU 110 and/or other systems of the firearm scope 200 (e.g., image sensors, video projectors, etc.), the reticle projector 132 may operate for substantially longer than the video projector 128 in some cases. In some embodiments, a power source that powers the reticle projector may also provide power to a video projector 128 and selected modules inside the EPCU 110 enabling the display of additional symbology with the reticle image regardless of whether the image sensors and other modules are active, turned off, or in a power-saving mode.

Figure 6A:
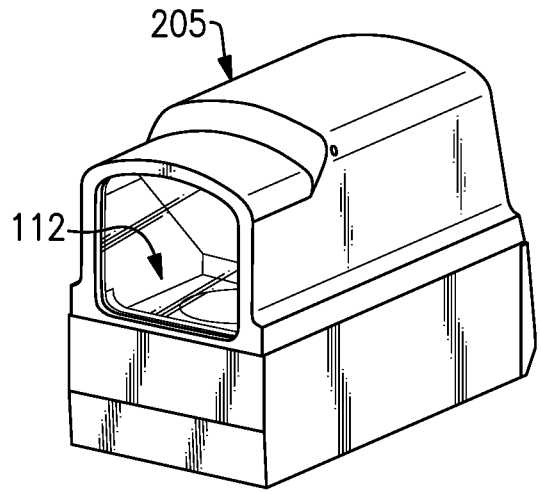
FIG. 6A illustrates a front perspective view of an example scope or sight system in accordance with certain aspects of the present disclosure.
Figure 6B:
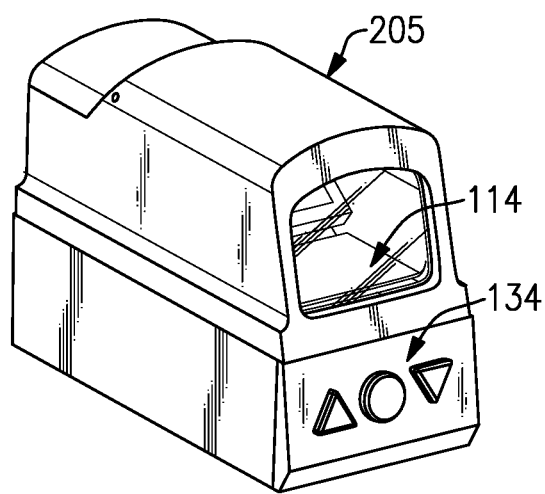
FIG. 6B illustrates a rear perspective view of an example scope or sight system in accordance with certain aspects of the present disclosure.

FIGS. 6A and 6B illustrate the front and rear perspective view of additional examples of the sight system or firearm scope 200 in accordance with certain aspects. Embodiments illustrated in FIGS. 6A and 6B can include one or more of the previously described embodiments with respect to the firearm scope 200. As illustrated in FIGS. 6A and 6B, the firearm scope 200 may have an entrance window 112 and/or an exit window 114 with a substantially rectangular shape. In the examples illustrated in FIGS. 6A and 6B, the EPCU 110, one or more batteries, and some or all of the optical components may be positioned in a housing 205 with one or more compartments.

Figure 6C:
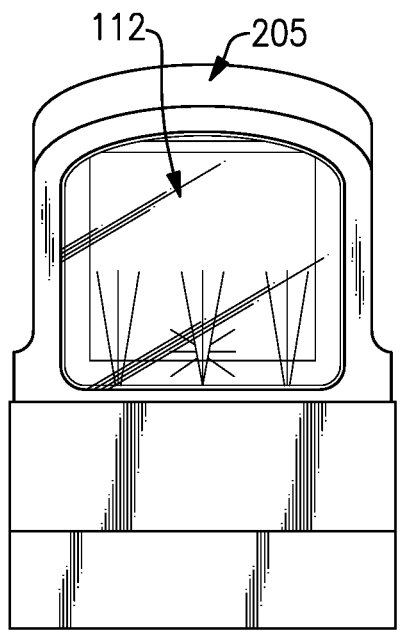
FIG. 6C illustrates a front view of an example scope or sight system in accordance with certain aspects of the present disclosure.
Figure 6D:
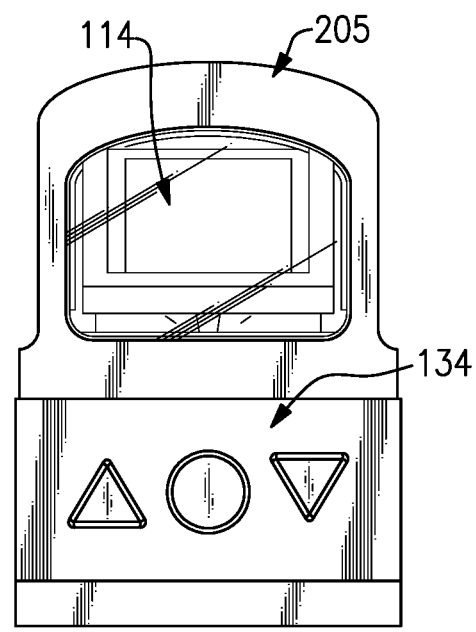
FIG. 6D illustrates a rear-view of an example scope or sight system in accordance with certain aspects of the present disclosure.
Figure 6E:
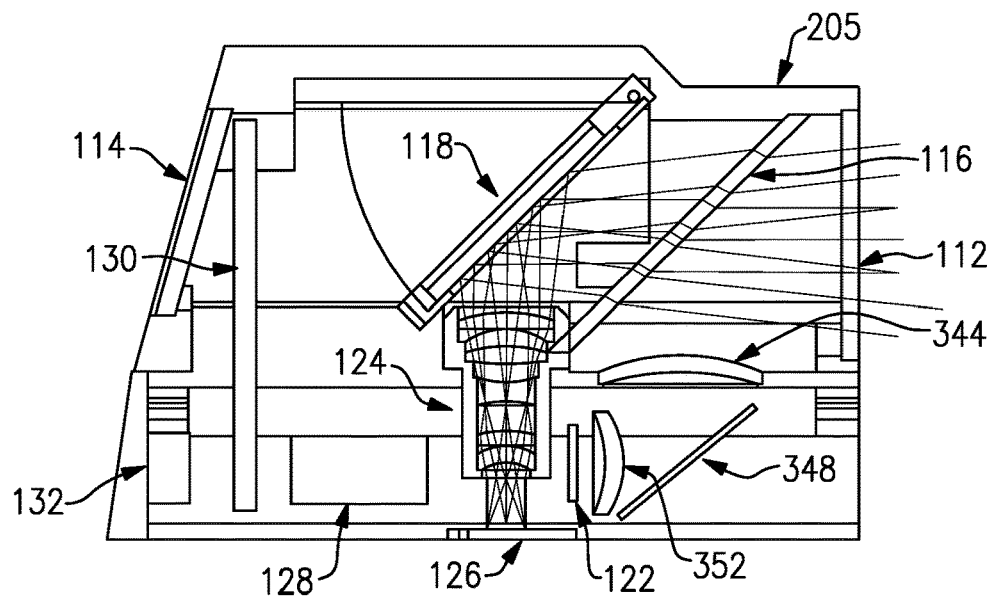
FIG. 6E illustrates a side view cross-section of an example scope or sight system shown in FIG. 6A to 6D.

FIGS. 6C and 6D illustrate the front and rear view, respectively, of the firearm scope shown in FIGS. 6A and 6B. FIG. 6E illustrates a side view cross-section of the sight shown in FIGS. 6A to 6D showing the arrangement of the components involved in the image formation inside the housing 205 when the pivotable mirror is in an ON state (e.g., when the mirror 118 is positioned within the visible light path). As a non-limiting example of the flow of light within the scope 200 in a video-view mode, FIG. 6E illustrates several visible light rays. The light rays enter a sight system of the firearm scope 200 through the entrance window 112 and are focused on the visible image sensor 126 by the moveable or pivotable mirror 118 and the visible optical imaging system 124. The visible light rays may pass through the beam splitter 116 with less than 5% attenuation and a displacement proportional to the thickness of the beam splitter 116.

Some aspects of the firearm scope may provide the direct-view image combined with a video image and a reticle image. In some such implementations, the video image may include an IR image (or thermal image), a visible-light image, or a combination of the two. In certain implementations, one of the IR image or the visible-light image is omitted from the scope. In some such implementations, the beam splitter may be omitted.

Figure 7:
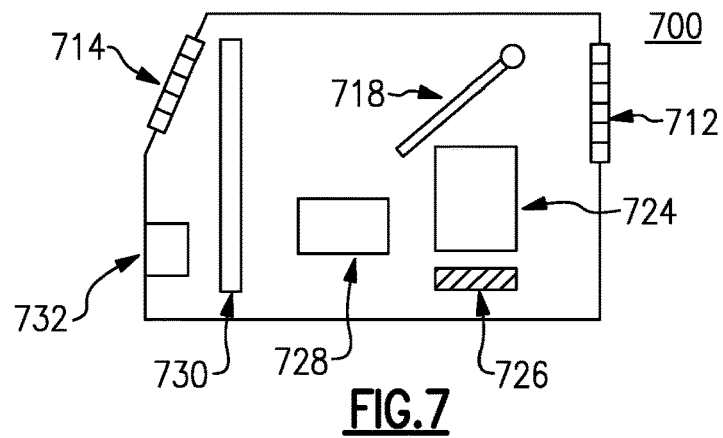
FIG. 7 illustrates a side view cross-section of an example sight system that supports direct view and a video view.

In some examples, the weapon scope may support a single video-view mode. FIG. 7 shows an example of such an embodiment. This embodiment comprises an entrance window 712, an exit window 714 that is transparent in the visible wavelength range, a pivotable mirror 718, an imaging subsystem 724, an image senor 726, a video projector 728, a reticle projector 732, a DV-display 730 and a user interface 734. In some implementations of the scope 700, the user may select between a video-view or a direct-view by switching the state of the pivotable mirror 718 between an ON or lowered state and an OFF or raised state. When the pivotable mirror 718 is in the ON state, the incident light (passing through the entrance window 712) may be redirected toward the imaging subsystem and a video view may be provided through the exit window 714. When the pivotable mirror 718 is in an OFF state, the optical path from the entrance window 712 to the exit window 714 is cleared by raising the pivotable mirror and direct view becomes available.

In some implementations of the scope 700, the visible video view and direct view may be provided. In some such cases, the entrance window 712 may be at least transparent in the visible wavelength range and the pivotable mirror 718 may reflect the light at least within the visible wavelength range. In cases where the entrance window is at least transparent in the visible range, the imaging subsystem 724 may form an image on the image sensor 726 that can be sensitive at least within the visible wavelength range. In some examples, the video image may be provided in certain lighting conditions (e.g., day light), while in other examples the video image may be provided in any lighting conditions. In implementations where the video-image is supported under most or all lighting conditions, the image sensor may have enhanced sensitivity and/or the scope may include an image intensifier (e.g., a vacuum tube device that increases the light intensity), and/or an IR illuminator to emit light in the sensitivity range of the selected image sensor. In other examples, only the IR video view and direct view may be provided. In some such examples, the entrance window 712 may be at least transparent in the LWIR wavelength range, the pivotable mirror 718 may reflect the light at least within the LWIR wavelength range, the imaging subsystem 724 may form an image on the image sensor at least in LWIR wavelength range, and the image sensor may be sensitive at least within the LWIR wavelength range. In some cases, multiple view modes may be provided simultaneously. For example, in some cases, direct-view and video-view may be provided simultaneously. In some such cases, the pivotable mirror may be at least partially transparent enabling direct-view while redirecting at least some light to the image sensor 726 to provide the video-view and/or thermal view.

Figure 8:
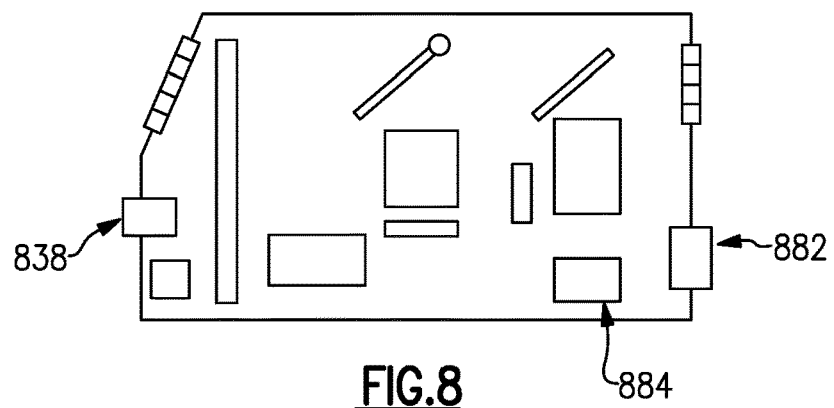
FIG. 8 illustrates a 2D cross-sectional view of the of the sight system with an integrated laser range finder, an integrated eye tracker, an integrated inertial measurement unit.

In some implementations, the firearm scope 200 may further include one or more supplemental systems, or display data from one or more supplemental systems. These supplemental systems may include: a laser range finder (LRF) module, an inertial measurement unit (IMU), an eye tracker, an electronic compass, a digital clock, an altimeter, a wind sensor, a thermometer, or any other supplemental system that can be combined with a firearm scope or which may display data on an augmented display of a firearm scope. The EPCU can combine the information provided by one or more of the aforementioned supplemental systems or devices with the video image received from one of the image sensors so that the composite image can be provided to the projector 128 and transferred to the exit window 114 through DV-display 130 for display to a user along with the target image through the exit window 114. FIG. 8 illustrates a side view cross section of an example embodiment of the sight system that includes an LRF 882, an inertial measurement unit (IMU) 884 and an eye tracker 838.

The LRF 882 module may comprise a pulsed laser, a photodetector, and electronic circuitry for driving the laser and processing the signal detected by the photodetector. The LRF 882 may be capable of measuring the distance between a target and the sight system by sending a laser pulse toward the target and detecting the pulse reflected back by the target. The time delay between emission of a single pulse and detection of the corresponding reflected signal can be provided to the ECPU 110, which can convert the time delay to a measure of distance. The EPCU may send the measured distance as a video signal to the projector 128 so that it can be displayed through the DV-display along with other symbolic information and video images, and/or as an overlay depicted with the direct-view image. The LRF module 882 can be provided on the front side of housing below the entrance window.

The eye tracker module 838 is capable of generating a signal that can be used by the EPCU to determine whether the user is looking through the exit window 114. The determination of whether a user is looking through the scope 200 can be used to determine whether to enter a power-saving mode. If it is determined that a user is not using the scope 200, one or more systems within the firearm scope 200 may be turned off or may enter a sleep mode where power consumption is reduced. For example, in a seep mode, components that enable a video-view may be deactivated. The eye tracker 838 may be positioned on the rear side of housing below the exit window 114. The eye tracker 838 can be a time of flight (ToF) eye tracker that detects the direction of a user's gaze using the emission and detection of a laser pulse. In some cases, the eye tracker 838 can be an eye detector configured to detect whether an eye of the user is within a threshold distance of the exit (second) window. In some such cases a controller (e.g., a controller in EPCU 110) may deactivate the image sensors and the projectors, or enter a low-power mode, when the eye of the user is not detected within the threshold distance of the second window indicating that the user is not using the scope to observe the target scene. Advantageously, deactivating the image sensor when the scope is not used may extend the battery life or charging period of the scope.

The IMU 884 is a module for measuring the orientation and movement. The IMU 884 can be included inside the housing to measure the movement and orientation of the sight system and send the corresponding information as an electronic signal to the EPCU for processing.

Figure 9:
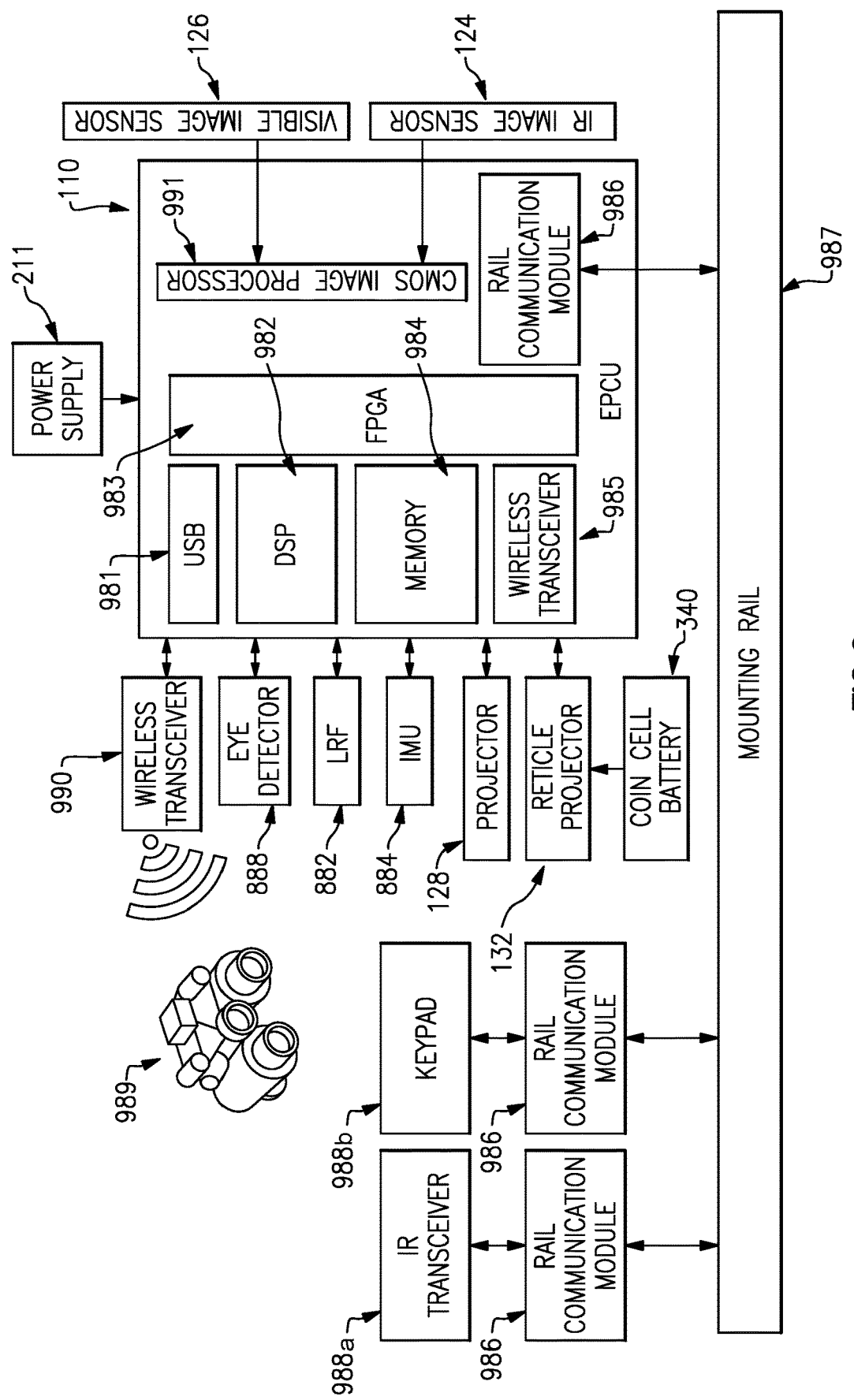
FIG. 9 is a block diagram of an Electronic Processing and Control Unit of an example scope.

FIG. 9 is a schematic block diagram showing examples aspects of the EPCU 110 of a scope (e.g., the scope 200). Further, FIG. 9 illustrates the connection between EPCU 110, and devices and components that are controlled by and/or communicate with the EPCU 110. The EPCU 110 may include a field programmable gate array (FPGA) 983, a memory unit 984, a digital signal processing unit 982, a CMOS image processor 991, a USB adapter 981, and/or an internal wireless transceiver 985. In addition to the aforementioned image sensors and projectors, some non-limiting examples of the devices that may be controlled and/or accessed by the EPCU include: an inertial measurement unit 884, an eye tracker 838, a laser range finder (LRF) 882, an external wireless transceiver 990, an altimeter (not shown), a wind sensor (not shown), an electronic-compass (not shown), and/or a magazine sensor (not shown). The EPCU 110, the image sensors, the projector and one or more sensors and peripheral devices may be powered by a first power supply 211, while the reticle projector 132 may be powered by a second power supply 340 (e.g., a coin cell battery). In some embodiments, the projector 128 and the electronic subsystems used to project symbols and/or numbers associated with one or more sensor outputs or system parameters may be temporarily powered by the second power supply 340. For example, the EPCU may automatically switch the power source for subsystems needed for projection of auxiliary information from the first power source 211 to the second power source 340 when the first power source 211 runs out of charge. In certain circumstances, when the first power supply 211 runs out of charge and the scope is used in direct view mode, this capability may allow the user to see the information associated with one or more sensors (or system parameters) along with the reticle image. In other implementations, the second power supply 340 is reserved to power the reticle projector 132. Thus, the reticle may remain available even when power for the other systems described herein is lost.

In some examples, the FPGA 983 module may control some of the subsystems of the EPCU and the devices connected to it. In other examples, the subsystems and devices may be controller may be controlled by a non-programmable circuit. The internal memory 984 can be used to store images, video recordings, system parameters, and/or selected data obtained from the sensors. The USB adapter 981 may be used to store selected information from the internal memory 984 to an external information storage device. The CMOS image processor 991 may receive video signals from one or more of the image sensors 126, 124 and transfer the processed signal to the video projector 128. The DSP unit 982 may be used to process the signals received from the sensors (e.g., LRF 882, eye detector 838, IMU 884) and generate outputs that can be transferred to the video projector 128. The optional internal wireless transceiver 985 may be used to connect the scope to available wireless networks in the vicinity of the scope Some of the sensors may be electrically connected to the EPCU 110. For example, the eye tracker 838, LRF 882, and IMU 884 that may be attached to or enclosed inside the housing 205 of the scope (as shown in FIG. 8) can be connected to the EPCU 110 through wires or conductive strips. Alternatively, electric connectivity may be provided through mounting rail 987 used to attach the scope to the weapon (or other devices used in conjunction with the scope). Using rail communication modules 986, the EPCU 110 can control peripheral devices and exchange data with them. For example, EPCU 110 may be connected to a keypad 988b and an IR transceiver 988a through the mounting rail 987. In some examples, the mounting rail 987 may also serve as a power line to exchange power between the scope and the devices mounted on the rail. The keypad 988b may be an extension of the scope's user interface 134 or an individual module that enables the controlling of one or more features of the firearm scope 200 (e.g., the reticle's position with respect to the exit window 114, switching between supported viewing modes, and the like), certain of the scope. The IR transceiver 988a may be used to link the scope to other devices via IR radiation. Non-limiting examples of such devices may include, devices that enable the display of environmental conditions within a particular distance of the scope (e.g., wind, light, humidity, temperature, etc.), devices that can assist with target acquisition and engagement (ballistic calculator, range finder, etc.), positioning devices (e.g., global positioning systems or GPS), communication devices (e.g., broadband wireless, satellite communication, etc.) and the like. The aforementioned devices may exchange information with the scope via wireless and/or optical links. For example a magazine sensor may be integrated with the weapon and send information to EPCU through a non-contact optical link. In some aspects, the firearm scope 200 may receive data from a weapon that supports a magazine with an ammunition counter. In some such aspects, the firearm scope 200 may display the ammunition count as symbology on the DV-display 130. Certain examples of an ammunition counter that can be used with the features described herein are described in U.S. application Ser. No. 16/297,288 (now U.S. Pat. No. 10,557,676), which was filed on Mar. 8, 2019 and is titled "FIREARM AMMUNITION AVAILABILITY DETECTION SYSTEM," the disclosure of which is hereby incorporated by reference in its entirety herein.

In certain additional aspects, using a transceiver 990, the scope (e.g., the scope 200) may communicate with other equipment or devices 989 of a user, such as a pair of night vision goggles, a head mounted display, a display system attached to a helmet, and/or any other type of equipment that may be included as part of a user's or soldier's kit. In some cases, the scope 200 may communicate with a different user than the user holding or operating the scope 200 or weapon system that includes the scope 200. For example, a soldier may be using a weapon system that includes the scope 200 and the transceiver 990 of the scope 200 may transmit a video-view of the scope 200 to a helmet or computing device of another user (e.g., a commanding officer, squad leader, or other observer). Further, the transceiver 990 may transmit the video-view, or other data, to both equipment of the user using the scope 200 (e.g., helmet or other heads-up-display) and to equipment of another user (e.g., helmet or computing device of a commanding officer).

The transceiver 990 may be a wired or wireless transceiver. The scope 200, using the transceiver 990, may establish a bidirectional wireless connection with a pair of goggles 989 to transmit/receive video, commands, and/or other data to/from the goggles 989 or other equipment of the user. In some cases, the connection may be unidirectional. For example, in some cases, the scope 200 may transmit data to the goggles or other equipment 989 (e.g., the goggles of the user), but may not receive data. In other cases, the scope 200 may receive data, but not transmit data to equipment 989. Further, in some implementations, whether or not the scope 200 is capable of transmitting, receiving, both transmitting and receiving data, or neither transmitting or receiving data to/from the equipment 989, the scope 200 may still be capable of communicating with a weapon system to which the scope 200 is mounted. It should be understood that any discussion of communicating data, commands, or video between the scope 200 and the goggles or other equipment 989 may include communicating data, commands, and video.

In some embodiments, the scope 200 may establish a wireless connection with an electronic device 989 to exchange data, commands, and/or video with the electronic device. The scope 200 may communicate the video-view using any type of video format (e.g., MP4, MPEG, AVI, MOV, and the like). Further, the scope 200 may communicate any type of data (e.g., environmental data or firearm data) or commands, using the transceiver 990, to/from the electronic device 989. In some examples, the data may include environmental data received from an environmental sensor, such as: altitude, temperature, level of light, humidity, wind speed/direction and the like. In some examples, the data may include firearm or weapon system data received from a firearm (e.g., the firearm on which the firearm scope is mounted) and may include: a cartridge count of cartridges within one or more magazines registered with and/or inserted into the firearm, a jam state of the firearm, a battery status of a battery within the firearm, a status of electronics included in the firearm, a magazine insertion status of the firearm, a firearm safety status, status of the scope (e.g., battery status, mode of operation, reticle status, etc.), and the like. Further, the data may include one or more views generated or viewable when a user looks through the scope, regardless of whether the user is actively looking through the scope. For example, the data may include a video view and/or thermal or infrared view captured and/or generated by the scope 200. Further, the data may include a reticle or reticle position with respect to one or more views transmitted to the device 989. Additional data may include rangefinder data, target acquisition data, target identification data, or any other data that may be detected, determined, or provided to equipment of a soldier, a hunter, a peace officer, or other user of a scope 200. Further, in some cases, the data may include commands to facilitate operation of the scope 200, the weapon upon which the scope is mounted or registered, or any other equipment of the user. For example, the commands may include commands to activate/deactivate one or more features of the scope (e.g., reticle, video-view, thermal view), to transmit or cease transmitting data (e.g., cartridge count or other magazine data, weapon state data, scope state data, video or thermal views, etc.), or any other type of command for controlling the scope 200 or other devices carried by the user.

The wireless connection can be a Bluetooth® wireless link, a military wideband connection, or other near-field communication system. Advantageously, using such wireless connection the user can acquire and engage a target without bringing the weapon close to the eye and removing the goggles 989 (e.g., a night vision goggle) or other devices that may interfere with positioning the scope 200 in front of the user's eye. Although the communication between the scope 200 and the device 989 has been primarily described as wireless, it should be understood that wired communication is also possible. For example, an optical cable may be used to connect the scope 200 to a helmet of goggles 989 of the user. Further, although communication has been described as the scope 200 directly communicating with the device 989, it should be understood that an intermediary device may facilitate communication. For example, the scope 200 may communicate with a weapon system or firearm, which may then communicate with the device 989. As another example, the user may carry a personal network device that may facilitate communications between one or more pieces of equipment of the user (e.g., between a scope, firearm, helmet, and other accessories carried by a user or soldier).

The EPCU 110 may receive the signals generated by the image sensors and after processing and/or storing the corresponding information, provide a first video signal that carries the information needed to generate an image of the target scene. Simultaneously, the EPCU may also receive electronic data from the sensors and other peripheral devices that may be connected to the scope (e.g., eye tracker, IMU, LRF, etc.) by various means, and may generate a second video signal that carry the information received from the sensors or other peripheral devices in symbolic form. Further, the EPCU 110 may combine the two video signals to generate an image of the target scene with symbolic information superimposed on it. For example, the information received from the magazine sensor, the LRF, and the wind sensor may be superimposed on the target scene such that during target acquisition the user can see the distance from the target, the wind speed and the number of rounds or cartridges remaining in the magazine as symbolic information, without moving the user's eye away from the exit window the scope.

Figure 10:
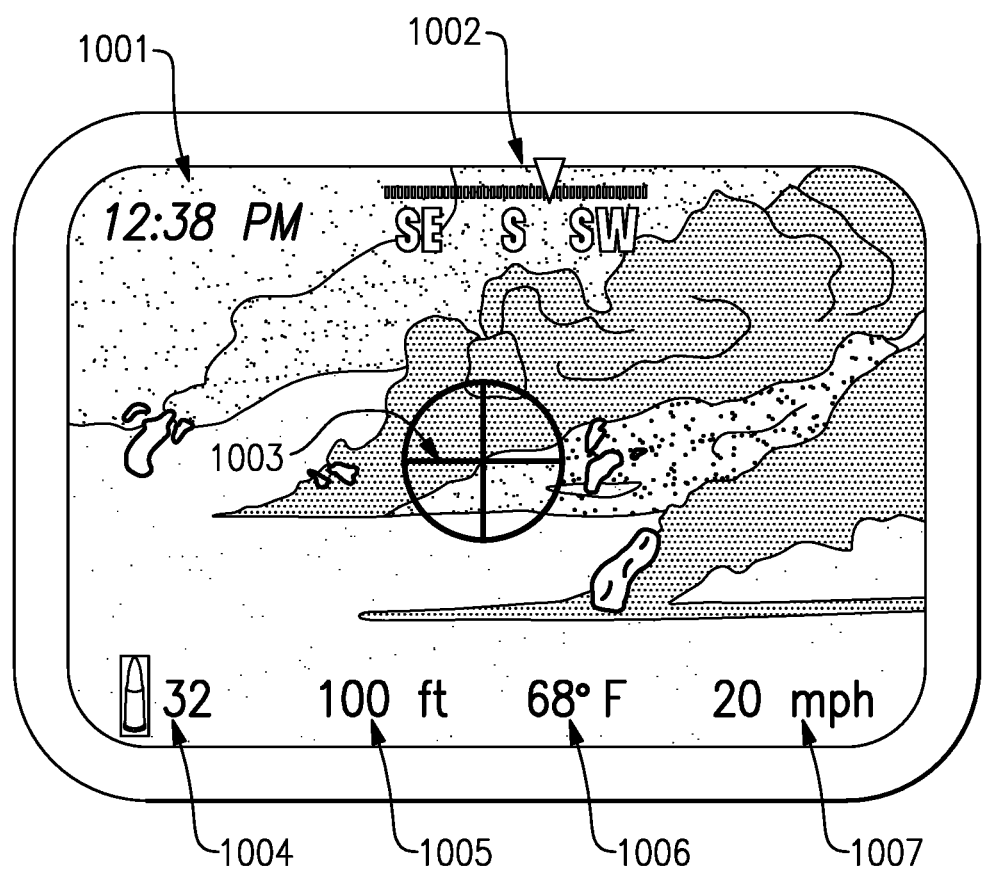
FIG. 10 shows an example of a composite image viewable through the sight system (e.g., image of a war zone, the bore-sighted image of the reticle and examples of auxiliary information).

FIG. 10 shows an example of the image seen by the user through the firearm scope 200 (e.g., a war zone) with the bore-sighted image of the reticle and auxiliary information superimposed on the image (e.g., ammunition count, time, target range, temperature, wind speed, electronic compass), In the depicted example, the user can observe a bore sighted reticle image 1003, the number of rounds left in the magazine 1004 (e.g., acquired by a magazine sensor), the distance from the target 1005 (e.g., acquired by the LRF 882), the temperature 1006 (e.g., acquired by a temperature sensor included in the side), the wind speed 1007 (e.g., acquired by a wind sensor mounted on the rail), the orientation of the weapon 1002 (e.g., acquired by the IMU and/or an electronic compass), and the time 1001 (e.g., provided by a digital clock).

Example Use Cases

Certain aspects of the operation of an example firearm scope or sight system 100. 200 of the present disclosure are described below. The sight system may operate in different modes. For example, the configurations shown in FIGS. 3A, 3B, and 6E may support multiple modes of operation. These modes of operation may include, for example, 1) Simultaneous thermal video-view and direct-view; 2) direct-view; or 3) video-view only (IR/thermal or visible). It should be understood that other modes of operation are possible as described herein. For example, it is possible to have simultaneous video and direct view modes. Moreover, it is possible to have simultaneous, video, direct, and thermal view modes. Moreover, in each of the viewing modes, the reticle may be simultaneously presented. By supporting multiple view modes simultaneously, it is possible for a user to see augmented data that augments a direct-view. For example, thermal views and/or video views may augment the direct-view.

Figure 12A:
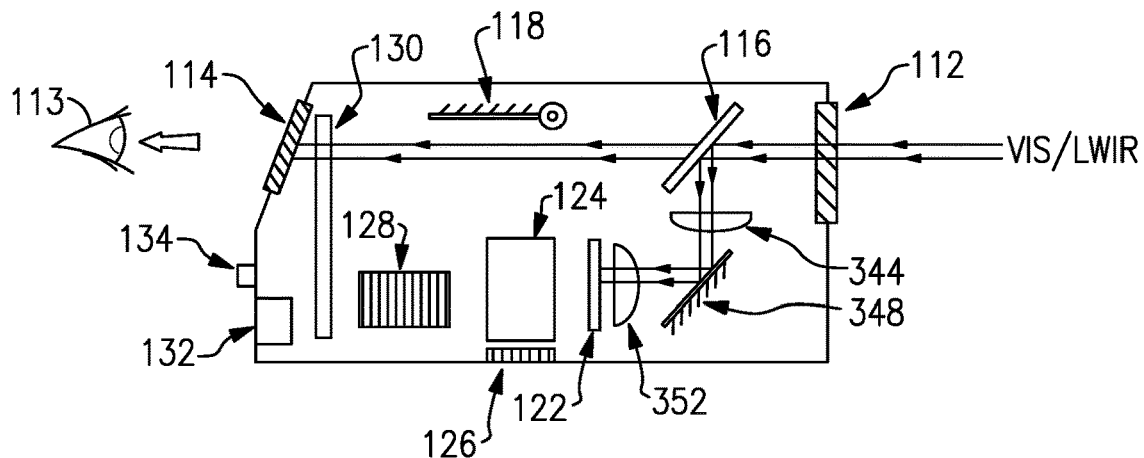
FIG. 12A illustrates the side view cross-section of an example sight system (shown in FIG. 3B) configured to operate in direct-view and/or IR/thermal video view modes.
Figure 12B:
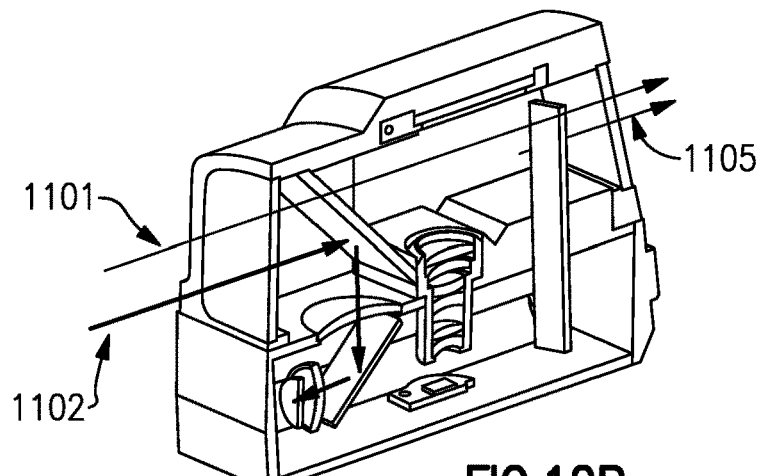
FIG. 12B illustrates the perspective view cross-section of an example sight system (shown in FIG. 6E) configured to operate in direct-view and/or IR/thermal video view modes.
Figure 12C:
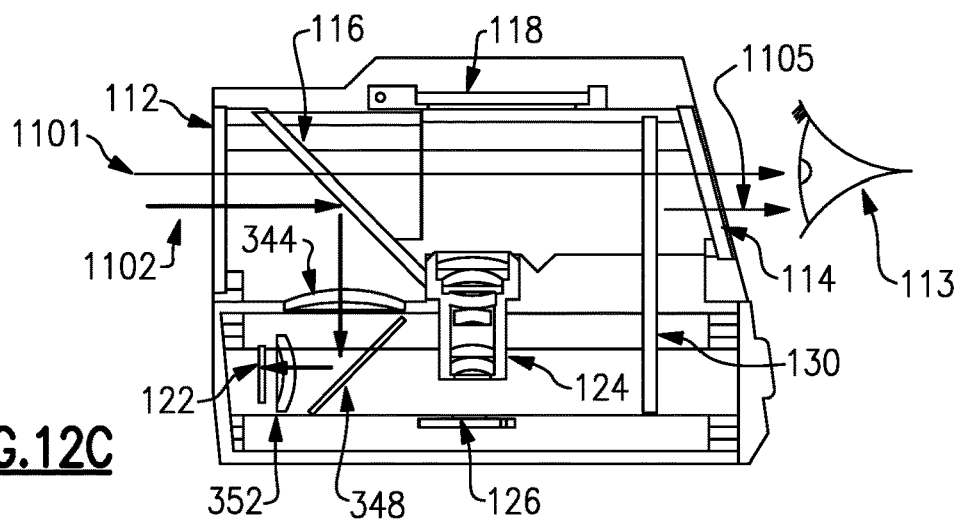
FIG. 12C illustrates the side-view cross-section of an example sight system (shown in FIG. 6E) configured to operate in direct-view and/or IR/thermal video view modes.

1) Simultaneous thermal video-view and direct-view: In this mode of operation, the pivotable mirror 118 may be in an "OFF" state to enable direct-view and the video projector 128 may receive a video signal from the thermal image sensor 122. The user can directly see the target scene along with the thermal video image, the reticle image, and auxiliary information, if any. To reduce power consumption, the display of certain auxiliary information may be omitted. For example, the EPCU may be configured to automatically disable a selected set of auxiliary information or the user interface may be configured to allow the user to disable selected set of auxiliary information. FIG. 12A shows a side cut-away view of a configuration of certain embodiments of the sight system shown in FIGS. 6A-6E where the flip mirror 118 is rotated up (or the switchable mirror is in the OFF state) allowing the direct-view image to be seen through the exit window 114. In addition to the direct view, the video signal received from the IR image sensor 122 can be simultaneously projected by the DV-display 130 providing a thermal image superimposed on the directly observed image in the exit window 114. Additionally, the image of the reticle can be superimposed on the displayed images. Each of the images can be bore-sighted. FIGS. 12B and 12C show the same mode of operation for the example shown in FIGS. 6A-6E. The visible light rays 1101 may directly reach the user 113 after passing through the entrance window 112, beam splitter 116, and the exit window 114. The IR light rays 1102 may be reflected by the beam splitter 116 and imaged on the IR image sensor 122 using the objective lens 344, IR mirror 348, and eyepiece 352. The IR image sensor 122 can generate a video signal and transmit the video signal to the video projector 128. The projector 128 can generate and project the image to the input image port of the DV-display 130, which may generate and/or direct visible light rays 1105 to the exit window 114 so that the user 113 can observe the corresponding image.

2) Direct-view only: in this mode the pivotable mirror 118 is in an "OFF" state (as shown in FIGS. 12A, 12B, and 12C) and the EPCU 110 subsystems associated with video projection (e.g., CMOS image processor, image projector) may be turned off. As such, the user can only observe the direct-view image of the target scene naturally formed in user's eye. In some implementations, the user may still be presented with a bore sighted image of a reticle. Further, in some cases, auxiliary symbolic information may be presented on the DV-display 130 with the direct-view. To reduce power consumption, the EPCU can be turned off to eliminate the use of the main power source. In some such cases, only the image of the reticle may be superimposed on the direct-view image. The reticle projector 132 may be powered by its own power source separate from the power source used by the EPCU 110 and/or other systems used to generate the video-view. Due to low power consumption of the reticle projector 132, the power source for the reticle projector 132 may last for months or years before needing replacement or recharging. Advantageously, in certain implementations, by having a separate power source for the reticle, a user may continue to use the reticle when power for other systems within the scope 200 is lost or drained. Moreover, in certain implementations, because the reticle projector 132 typically uses less power than a video-display system, the reticle projector 132 may remain powered for a longer time period than compared to a system that utilizes a single power source for the reticle and the video-mode. Advantageously, in use-cases where new batteries or recharging is not available, a user may continue to have access to the reticle when access (due, for example, to a drained battery) to a video-mode is lost.

Figure 11A:
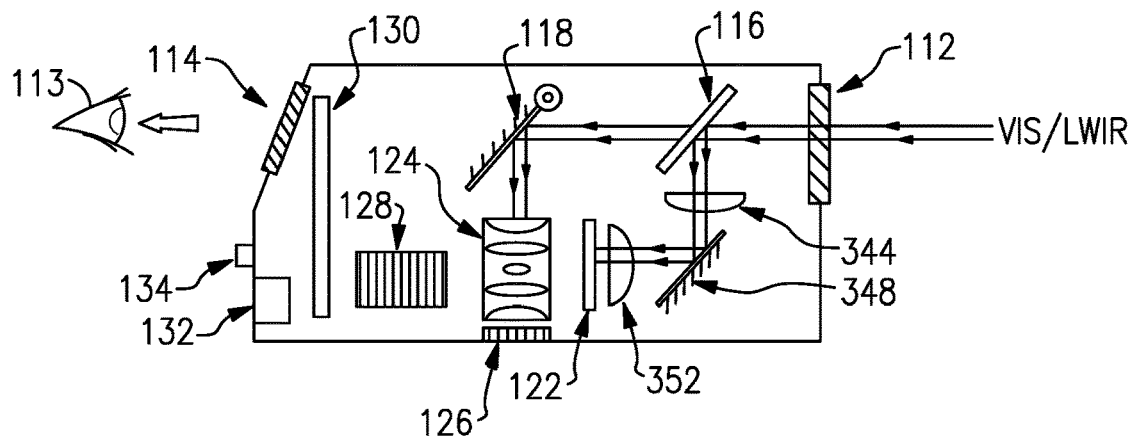
FIG. 11A illustrates the side view cross-section of an example sight system (shown in FIG. 3B) configured to operate in IR/thermal or daylight video view modes.
Figure 11B:
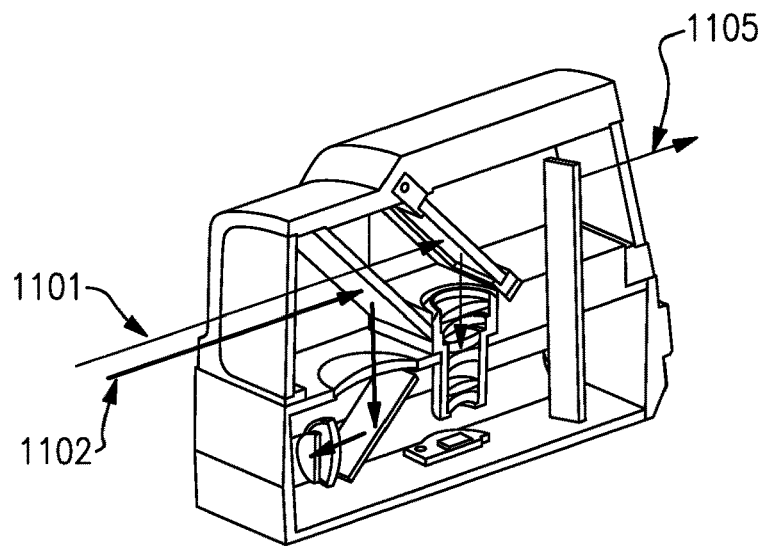
FIG. 11B illustrates the perspective view cross-section of an example sight system (shown in FIG. 6E) configured to operate in IR/thermal or daylight video view modes.
Figure 11C:
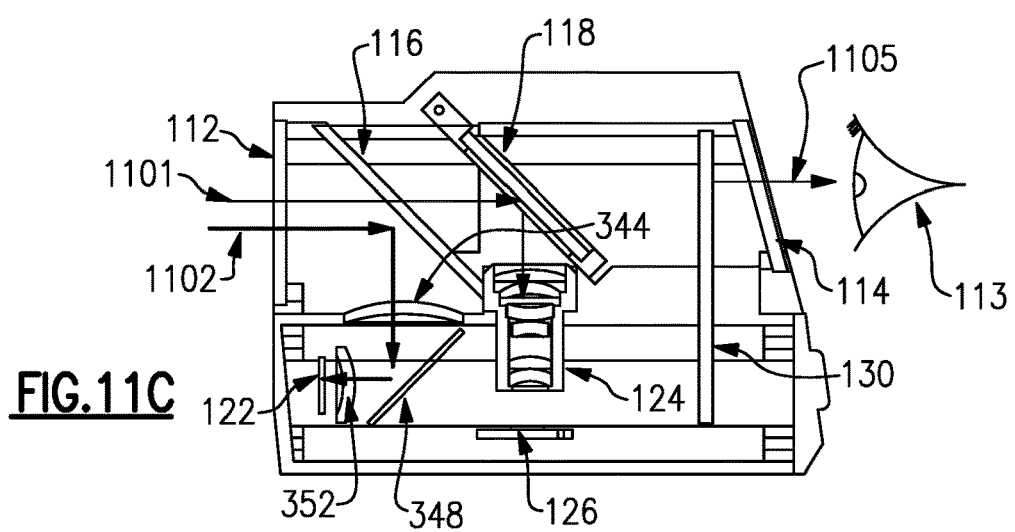
FIG. 11C illustrates the side view cross-section of an example sight system (shown in FIG. 6E) configured to operate in IR/thermal or daylight video view modes.

3) Video-view only: in this mode the pivotable mirror 118 is in an "ON" state (as shown in FIGS. 11A, 11B and 11C) and reflects the incoming visible light rays 1101 toward the aperture of the visible light imaging subsystem 124 resulting in the formation of the target scene image on the visible light image sensor 126. FIG. 11A shows a side cut-away view of a configuration of certain embodiments of the sight system shown in FIGS. 6A-6E where the flip mirror 118 is rotated down (or the switchable mirror is in the ON state) to enable video-view only mode. In this mode, the incoming IR light rays 1102 may be deflected toward the objective IR lens 344 by the beam splitter resulting in formation of the target scene image on the IR image sensor 122. The video projector 128 may receive the video signal from the visible image sensor 126 or the IR image sensor 122. The user 113 can simultaneously see the video image of the target scene, the reticle image, and the auxiliary information, if any. To save battery a selected set of the auxiliary information may be disabled automatically (e.g., by the ECPU) or manually (e.g., through the user interface). The user can change the electronic magnification of the video system and zoom on a target or selected region of a scene. FIGS. 11B and 11C show the same mode of operation for the example shown in FIGS. 6A-6E. In FIGS. 11B and 11C, the flip mirror 118 is rotated down (or the switchable mirror is in an ON state) to reflect the visible light rays 1011 passing through the dichroic splitter 116 toward the aperture of the visible light imaging subsystem 224. Simultaneously, the IR light rays 1102 may be deflected toward the objective IR lens 344 by the beam splitter resulting in formation of the target scene image on the IR image sensor 122. The signal fed to the video projector 128 can be either received from the visible imager 126 (e.g., in a visible light video view mode) or the IR/thermal image sensor 122 (e.g., in a thermal video view mode). A selection between thermal video-view, visible light video-view mode, or both thermal and visible light video-view mode can be performed through a user interface. The image projected by DV-display 130 through the exit window 114 is a visible image of the target scene. Further, regardless of the selected video-modes, the reticle can be superimposed on the video image. The video images and the reticle image can be bore-sighted. In some implementations, the scope 200 can be configured to automatically switch between a visible-light video view and a thermal video-view based on a detected amount of visible light in the environment. The amount of ambient or available visible light in the environment may be measured by a light sensor integrated with or added to the firearm scope 200.

Additional Embodiments

Figure 13A:
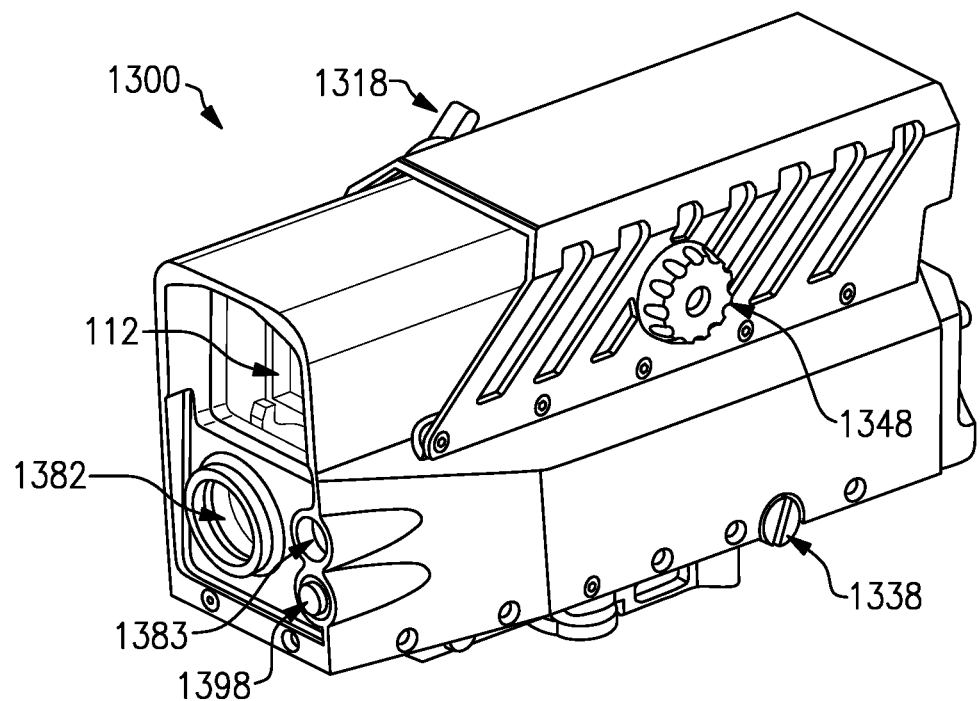
FIG. 13A illustrates the front perspective view of an example scope or sight system in accordance with certain aspects of the present disclosure.
Figure 13B:
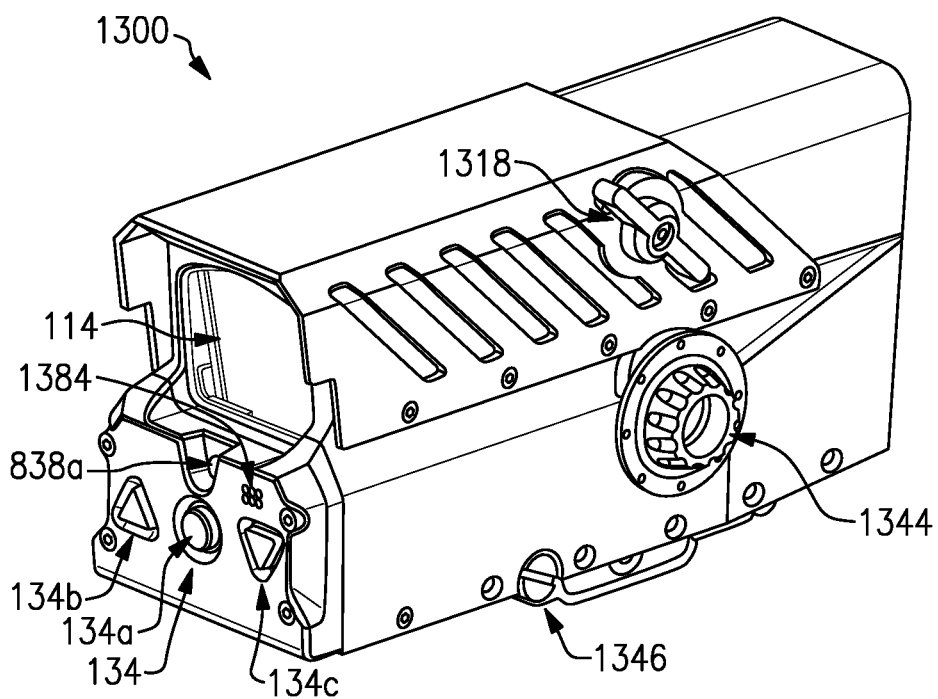
FIG. 13B illustrates the back perspective view of an example scope or sight system in accordance with certain aspects of the present disclosure.

FIGS. 13A and 13B illustrate the front and back perspective views of an example firearm scope or sight system 1300 in accordance with certain aspects of the present disclosure. Embodiments illustrated in FIGS. 13A and 13B can include one or more of the previously described embodiments with respect to the firearm scope or sight system 200. In some embodiments, various imaging sub-systems of the scope 1300 may be identical to the imaging sub-systems of the scope 200.

As illustrated in FIGS. 13A and 13B, similar to firearm scope 200, the firearm scope 1300 may have an entrance window 112 and an exit window 114 with a substantially rectangular shape. It should be understood that the entrance window 112 and exit window 114 may be shaped differently. Advantageously, in certain embodiments, because the scope 200 does not require optics in the direct-viewing path, the shape of the entrance window 112 and the exit window 114 do not have the same limitations as a scope that relies on optics within the viewing path.

The laser range finder of the firearm scope 1300 may have two separate apertures or a combined aperture positioned in the front surface of the scope 1300 for transmitting and receiving laser beams. In some examples, a laser beam is transmitted via a laser transmitter aperture 1383 (laser Tx aperture) and the corresponding reflected laser beam is received via a laser receiver aperture 1382 (laser Rx aperture).

Further, the scope 1300 may include controls for positioning the reticle. For example, the scope 1300 may include an elevation adjustment knob 1338 that allows the user to adjust the elevation of the reticle. Moreover, the scope 1300 may include an azimuth adjustment knob 1346 that allows the user to adjust the azimuth of the reticle. It should be understood that other reticle position adjustment controls may be used instead of or in addition to the elevation adjustment knob 1338 and/or the azimuth adjustment knob 1346. For example, the reticle may be adjusted in a horizontal plane. As another example, the shape, intensity, color, or brightness of the reticle may be adjusted.

The scope 1300 may further include a flip mirror control knob 1318 that can be used to change the state of a pivotable mirror (e.g., pivotable mirror 118) or a switchable mirror, between an OFF state for direct view through the entrance window 112 (e.g., direct-view mode), or an ON state for activating the video-view mode (e.g., visible video-view mode). In ON state, the pivotable mirror 118 may be turned, moved up, or otherwise removed from the optical or viewing path between the beam splitter 116 and exit window 114. In the OFF state, the pivotable mirror 118 may be turned, move down or otherwise positioned within the optical path between the beam splitter 116 and exit window 114 and may block the direct-view. In some cases, the pivotable mirror 118 permits some visible light to travel through to the exit window 114 while redirecting some visible light. In some such cases, a direct-view and video-view may be combined or viewed simultaneously. Similarly, a thermal or infrared view may be combined or viewed simultaneously with a direct and/or video view.

In some examples, the flip mirror control knob 1318 may also control the power supply to the electronic components and circuitry associated with video imaging (e.g., the CMOS image processor 991 and the visible image sensor 126). In some such examples, when the flip mirror control knob 1318 is in OFF state, where the mirror blocks the direct optical path between the entrance window 112 and exit window 114, the CMOS image processor and the visible image sensor may be turned off. In other implementations, separate controls may be used to activate/deactivate video or thermal view modes. Advantageously, the ability to control the activation and deactivation of video and thermal view modes can extend the battery life of the scope power supply by reducing power consumption during periods when only direct-view is used.

In some cases, the reticle may include a red dot sight. In some such cases, a user interface 134 of the firearm scope 1300 may be used to adjust the red dot sight. For example, the user interface may include three buttons, 134a, 134b and 134c, that may be used to control the state and position of the reticle image (e.g., a red dot) projected by the scope 1300 (or the scope 200). In some cases, an on/off button 134a may be used to turn the reticle image on or off, and buttons 134b and 134c may be used to control the position of the red dot sight or reticle image. The user interface 134 may also include an environmental sensor 1384 (e.g., for monitoring altitude, temperature, humidity and the like), and an eye tracker aperture 838a that allows the eye tracker 838 to track the user's eye movement of position. Tracking the user's eye position can be used to determine whether the user is looking in the scope. By determining whether the user is looking in the scope, certain features (e.g., video-view mode) can be activated or deactivated providing for power savings. For example, the video-view mode can be deactivated when a user ceases looking into the scope 1300 and reactivated when the user moves his/her eye back to a viewing aperture or window of the scope.

The scope 1300 may also include an external power connector 1398 that may be used to provide power to the scope 1300 from an external power supply (e.g., to power up the scope externally or to charge one or more batteries in the scope 1300). The external power connector 1398 may be instead of or in addition to a powered rail interface that may be used to provide power to the scope 1300 from a power source within the weapon.

Figure 14A:
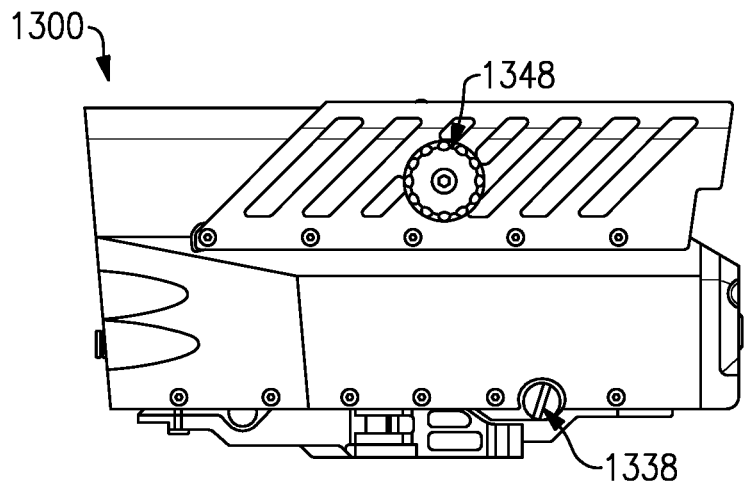
FIG. 14A illustrates the side view of the example scope or sight system of FIG. 13A in accordance with certain aspects of the present disclosure.
Figure 14B:
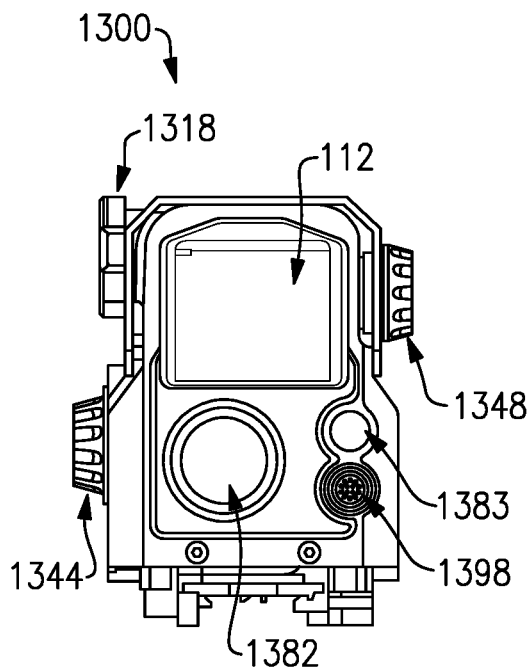
FIG. 14B illustrates the front view of the example scope or sight system of FIG. 13A in accordance with certain aspects of the present disclosure.
Figure 14C:
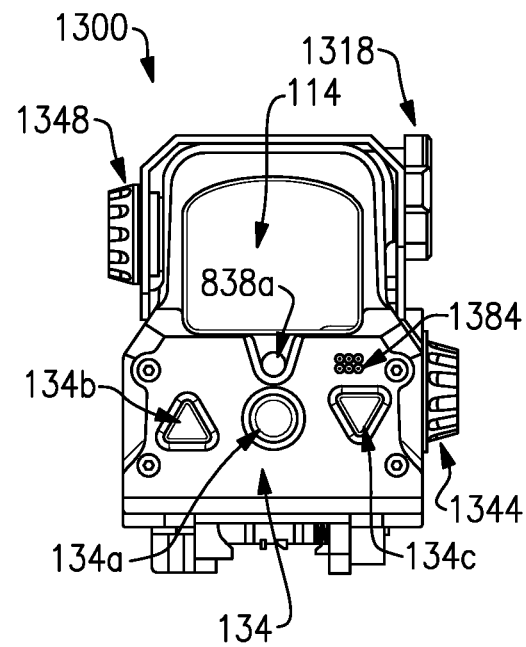
FIG. 14C illustrates the back view of the example scope or sight system of FIG. 13A in accordance with certain aspects of the present disclosure.
Figure 14D:
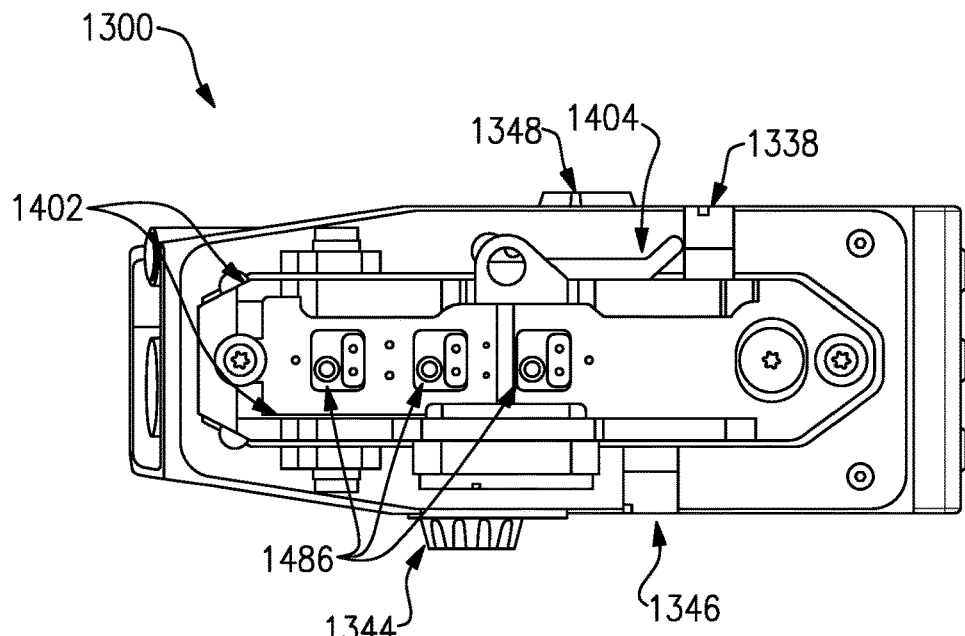
FIG. 14D illustrates the bottom view of the example scope or sight system of FIG. 13A in accordance with certain aspects of the present disclosure.
Figure 14E:
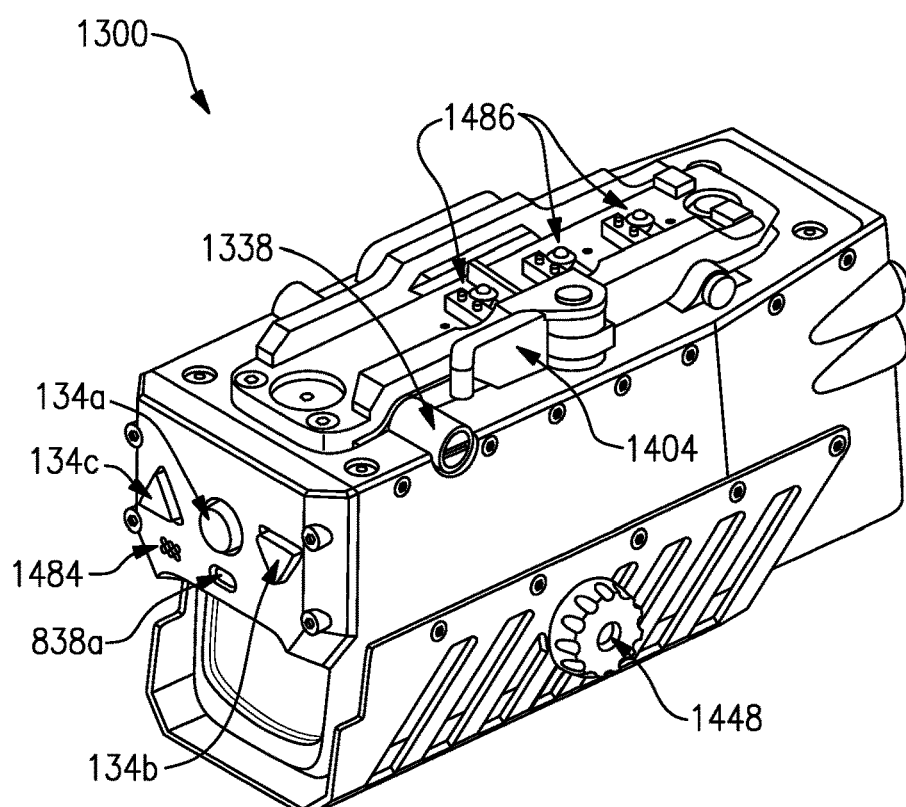
FIG. 14E illustrates the bottom perspective view of the example scope or sight system of FIG. 13A in accordance with certain aspects of the present disclosure.

FIG. 14A-14E illustrate the side view, front view, back view, bottom view and the perspective bottom view of the scope 1300. As shown in FIGS. 14A-14C, the scope 1300 may include a video-view control knob 1348. The video view control knob 1348 may be used to activate/deactivate the video view mode and/or to change one or more control settings for the video view mode. Further, the scope 1300 may include a thermal/IR image control knob 1344 that may allow the user to activate/deactivate the thermal or infrared view modes. In some embodiments, the control knob 1348 and the control knob 1344 may be used to focus the video and/or thermal images generated or projected by the projector 128 onto the DV-display 130. In some implementations, the control knob 1348 and the IR/thermal image control knob 1344 may directly or indirectly control digital processing of the image generated by the visible image sensor 126 or the IR image sensor 122.

It should be understood that although various user interface elements are described as knobs, buttons, or switches, the form of the user interface elements are not limited as such. Any type of user interface element may be used for any of the controls described herein. For example, user interface elements may include touch inputs, touch screens, physical buttons, rotatable knobs, flip switches, buttons, and the like.

As shown in the bottom view of the scope 130 (FIG. 14D), the scope 1300 may have a rail mount 1402 that allows the firearm scope 1300 to be removably mounted to a receiving or mounting rail of a firearm, weapon system, or other device that may exploit the functionalities provided by the firearm scope 1300. The firearm scope 1300 may be attached to a firearm or weapon using any type of attachment mechanism that enables the firearm scope 1300 to be securely affixed to the weapon. In the example shown, the firearm scope 1300 may have a rail grabber lever 1404 that can be used to manually tighten and loosen the rail mount 1402 to or from a receiving rail on a weapon. In other cases, the scope 1300 may snap into or onto a rail of the weapon. In some such cases, a release lever, button, or other element may be used to release the scope 1300 from the weapon. The rail mount 1402 may also include one or more electrical or optical connectors to enable electrical or optical communication between the scope and the firearm, weapon system, or other device. In the example shown, the rail mount 1402 includes three interface connectors 1486. These interface connectors 1486 may be powered rail interfaces configured to support electrical and/or optical connection to an underlying weapon. In some cases, the interface connectors 1486 provide electric power from a weapon to the scope 1300. Alternatively, the scope 1300 may be used to power elements of the weapon. Moreover, in some cases, the interface connectors 1486 may be used to connect to a charger to charge batteries of the scope 1300. It should be understood that the scope 1300 may use replaceable and/or rechargeable batteries.

Figure 15A:
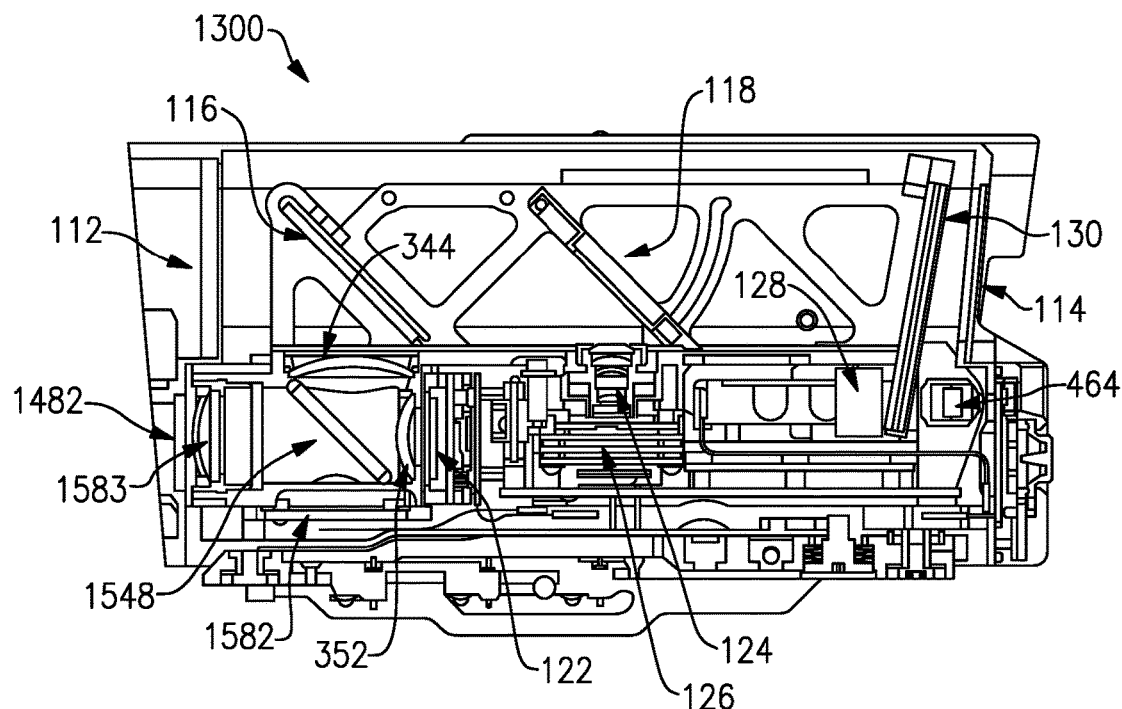
FIG. 15A illustrates the side view cross-section of the example scope or sight system of FIG. 13A in accordance with certain aspects of the present disclosure.

FIG. 15A illustrates the side view cross-section of the firearm scope or the sight system 1300 shown in FIGS. 13A and 14A. The scope 1300 can be configured to operate in direct-view, video view, and/or IR/thermal view modes. The arrangement and function of the components and sub-systems in the firearm scope 1300 can include one or more of the previously described embodiments with respect to the firearm scope 200. More specifically, the components and imaging sub-systems used to enable direct-view mode and support IR and/or visible video-view modes in the scope 1300 may be similar or identical to those described with respect to scope 200.

The scope 1300 includes DV-display 130 that enables multiple views via a single entrance window 112 and a single exit window 114. The DV-display 130 may be used to support, for example, direct-view, video-view, and/or infra-red/thermal view. Each of the different views may be viewed or activated independently, or in combination with one another. Further, a reticle image can be superimposed on one or more of the views.

The scope 1300 includes an IR video imaging sub-system and a visible imaging sub-system that in combination with a DV-display subsystem enable the above mentioned modalities. The IR imaging sub-system can comprise the beam splitter 116, the objective lens 344, a double-sided reflector 1548, an eyepiece 352, and an IR image sensor 122. The double-sided reflector 1542 may comprise two reflective surfaces configured to reflect light incident on both sides of the reflector. A first surface reflective surface of the double-sided mirror 1548 may be configured to reflect IR light reflected from the beam splitter 116 and direct it to the eyepiece 352. A second reflective surface of the double-sided reflector 1548 may be configured to reflect (or redirect) laser light (e.g., IR or visible) received from the range finder window 1482 and direct it to the range finder sensor 1582.

The visible imaging sub-system may comprise the pivotable mirror 118, the visible optical imaging subsystem 124 and the visible image sensor 126 (e.g., a CMOS imaging sensor).

The DV-display sub-system may comprise a DV-display 130 (e.g., the slab waveguide 454 configured to project an image received from one or more input image ports 456/462 via an image output port 458) and one or more projectors configured to project light to an input image port of the DV-display 130. In the example shown, the video projector 128 projector generates and projects images formed using the video signals received from the IR image sensor 122 and/or visible image sensor 126.

Figure 15B:
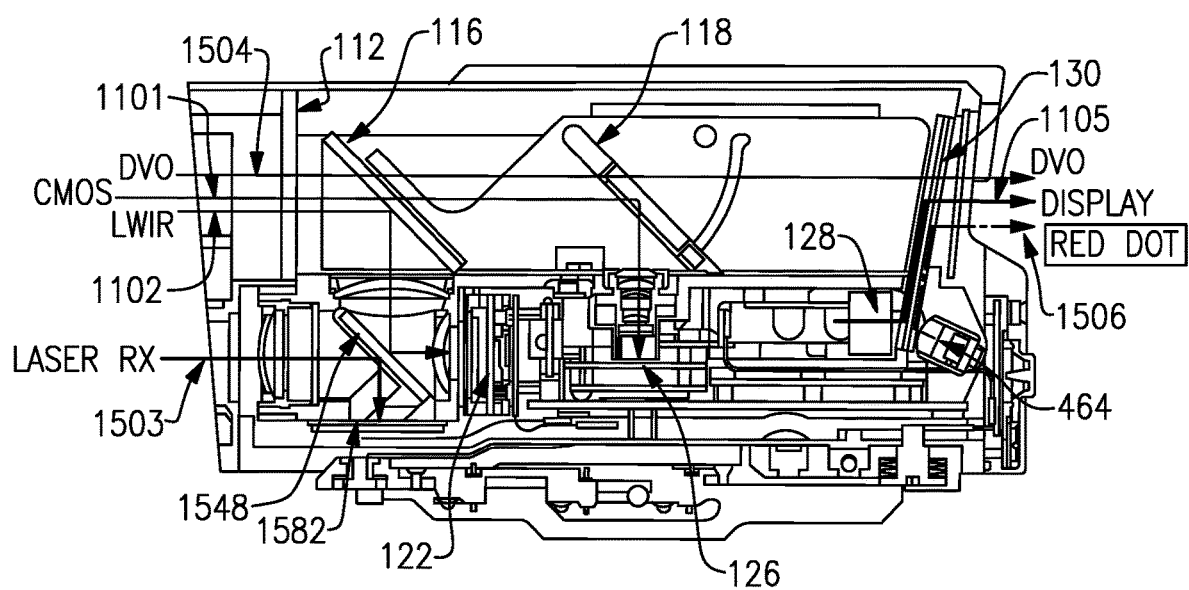
FIG. 15B illustrates the side view cross-section of the example scope or sight system of FIG. 13A in accordance with certain aspects of the present disclosure.

As a non-limiting example of the flow of light within the scope 1300, FIG. 15B illustrates several light rays depicting the optical paths associated with the direct view, video views, laser range finder, and reticle (or red dot) imaging. The light rays associated with the direct view and video views enter the scope 1300 through the entrance window 112. The visible light rays generate images via direct view or visible video view. For example, in the direct view mode (when the pivotable mirror 118 is in an OFF state (pivoted out of the light path) or if the pivotable mirror is partially transparent), the visible light ray 1504 light ray can pass through the beam splitter 116 and the DV-display 130. In the visible video-view mode (when the pivotable mirror 118 is in an ON state (positioned to redirect light towards the image sensor 126)), the visible light ray 1101 passes through the beam splitter 116 and is then redirected by the pivotable mirror 118 toward the visible image sensor 126. In the thermal video-view mode, the thermal (LWIR) light ray 1102 is redirected by the beam splitter 116 and the double-sided reflector 1548 toward the infrared image sensor 122. In video-view modes (visible or thermal), the image sensors generate video signals, the projector 128 converts the video signals to images and sends the images to the DV-display 130. In the example shown, ray 1105 is generated by the projector 128, coupled from the projector 128 to the DV-display 130 and redirected toward the exit window 114 by the DV-display 130. The DV-display 130 may also receive a reticle image (e.g., a red dot image) from a second projector 132 (reticle projector or red dot projector) and combine the reticle image with the image generated by the projector 128. In the examples shown, ray 1506 is generated by the second projector 132 and redirected toward the exit window 114 by the DV-display 130. In some cases, an additional projector may be used to project additional video or data to be superimposed on one or more other views displayed on the DV-display 130 or viewable through the DV-display 130. For example, an additional projector may be used to project cartridge data, battery data, geopositioning data, weapon state data, or any other type of data on one or more views (e.g., thermal, video, direct views, etc.)

As described above the second reflective surface of the double-sided reflector 1548 may be configured to reflect laser light (IR or visible) associated with the laser range finder 882 and received from laser range finder aperture 882a. In the example shown, the ray 1503, which may be a received laser, is redirected toward the range finder sensor 1582 by the second reflecting surface of the double-sided reflector 1548. In the example shown, the laser ray 1503 can be associated with the reflection or scattering of an incident laser light generated by the laser range finder 882 and emitted via the laser Tx aperture 1383.

As described above, in some implementations, the firearm scope or sight system 200 or 1300 may be configured to support direct-view and thermal video-view modes while omitting support for non-thermal video view modes. In these embodiments, the pivotable mirror 118, the visible light imaging subsystem 124, and the visible image sensor 126 (e.g., a CMOS image sensor) may be omitted from the scope 200 or 1300. Omitting the visible video imaging system, can reduce the size, weight and the power consumption of such scopes. For example, without the optics and hardware use to support video-view, the length of the scope 1600 can be shortened compared to scopes that support video view (e.g., the scopes 200 and 1300). Advantageously, a lightweight and compact scope that still supports, direct-view and thermal video-view modes, and supports a superimposed a reticle image in both modes, can be used with smaller firearms, and/or to reduce the weight of the scope and consequently, the weapon system that uses the scope. Moreover, reduced power consumption may result in extended battery life or reduced battery recharging time.

Figure 16A:
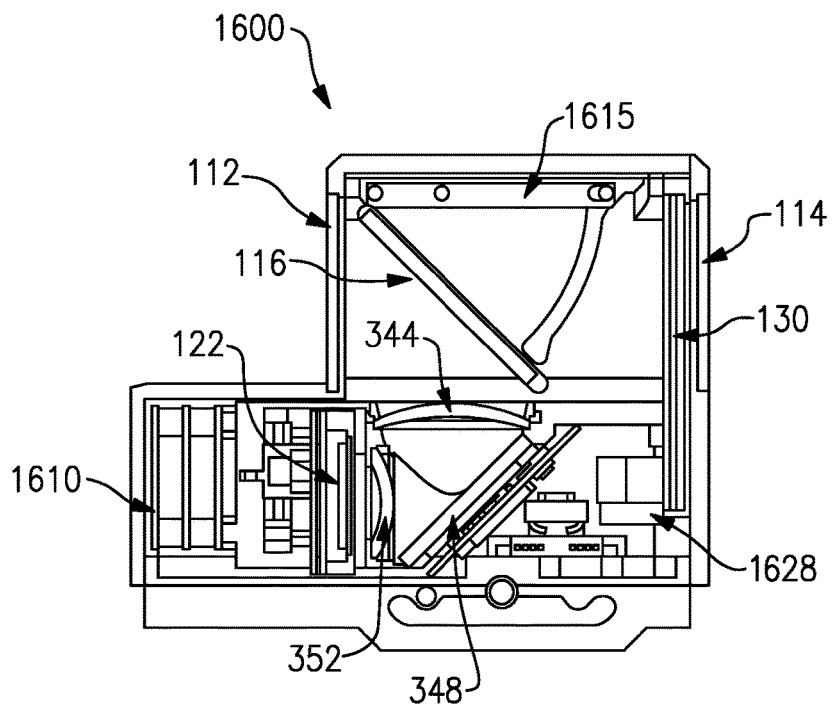
FIG. 16A illustrates the side view cross-section of an example scope or sight system configured to operate in direct-view and/or IR/thermal video-view modes.

FIG. 16A illustrates the side view cross-section of an example compact scope or compact sight system 1600 configured to operate in direct-view and/or IR/thermal video-view modes. In some embodiments, the scope 1600 can include one or more of the previously described features described with respect to the firearm scope 200 or 1300.

The components within the scope may be arranged and/or configured to enable direct view and/or thermal/IR video-view, while providing a bore-sighted reticle image as a single composite image. The scope 1600 may include a first window (an entrance window) 112 and a second window (an exit window 114). Light may enter the scope 1600 through the entrance window 112 and the direct view or the video images may be viewed by the user through the exit window 114. The scope 1600 may further include: a beam splitter 116 (e.g., dichroic mirror/beam splitter), an IR mirror 348, an objective lens 344, an eyepiece 352, an IR image sensor 122, a DV-display 130, and a projector 1628. The projector 1628 may be used to project a thermal image onto the DV-display 130. In some embodiments, the projector 1628 may be configured to project the thermal image along with a reticle image. In other words, in some cases, the projector 1628 may combine the functionality of the projectors 128 and 132. In some such embodiments, the projector 1628 may comprise two projectors and a beam combiner configured to generate a composite image and project the composite image to an input image port of the DV-display 130. For example, the projector 1628 may comprise the configuration described with respect to FIG. 4C where the beam combiner 466 combines the images received from eth projector 128 and projector 132 and outputs a composite image. Alternatively, or in addition, the scope 1600 may include a second projector (e.g., a red dot projector or a reticle projector) for projecting a reticle onto the DV-display 130, which may have two image input ports.

In addition, the scope 1600 may include a sunshield 1615. The sunshield 1615 may be flappable and may be used to block some light. It may be desirable to block at least some light when in an environment with a lot of direct light. By blocking at least some of the light, it may be easier to see a projected thermal image. In some cases, the sunshield 1615 blocks all visible light and only thermal view is available. In other cases, the sunshield 1615 only blocks some visible light and direct view may still be available. The scope 1600 may further include an electronic system 1610 configured to provide control and support the IR/thermal image sensor 122, the projectors, and the DV-display 130. As described above, the projector 1628 may project a first image (e.g., IR/thermal image of a target scene) and a second image (e.g., a reticle image), via one or more input image ports of the DV-display 130. As described above, the first and the second projector may be powered by different power sources. In some examples, the second projector may consume less power than the first projector. In some cases, such as when the second projector includes a reticle projector, the second projector may include a laser diode used as an optical source to generate the reticle image. In some embodiments, the second projector may be configured to project image of symbols including but not limited to a reticle image to the DV-display 130. In some examples, the symbols may include one or more of: a cartridge count indicative of a number of cartridges within a magazine, a status of a power source; an identifier of a target status within the target scene; a jam state of a firearm; a communication state between the firearm scope and the firearm, or any other type of data that may be projected onto the DV-display.

The beamsplitter 116 may be configured to allow transmission of light within a selected wavelength range (e.g., a visible light range, such as between 0.4 and 2 micrometers), while re-directing light within a different wavelength range (e.g., an infrared light range, such as between 5 to 15 micrometers) toward the objective lens 344. As such, in presence of sufficient visible light, the user can observe the surrounding environment through the DV-display 130 and the beamsplitter 116. If the IR/thermal-view mode is active (e.g., the IR image sensor 122 is powered and generates a video signal), the user may see an IR/thermal image of the surrounding environment superimposed on a scene that is directly observable via the entrance 112 and exit 114 windows.

The objective lens 344, the IR mirror 348 and the eyepiece 352, form an IR/thermal image on the IR image sensor 122 using IR/thermal radiation received from the entrance window 112. The IR image sensor 122 can be a thermal focal-plane array capable of processing light within the infrared spectrum. The IR image sensor 122 generates a video signal and transmits the video signal to the projector 1628. The projector 1628 generates an image and couples the image to the DV-display 130 (e.g., via the input image port 456). The DV-display forms a final IR/thermal image that may be seen by the user via the exit window 114 simultaneously with the directly observed scene. The DV-display can be a transparent display substrate comprising a waveguide that allows visible light incident on the waveguide to pass from the entrance window 112 to the exit window 114, while guiding the thermal image received from an input image port or input optical coupling region of the waveguide and outputting the thermal image via an out image port. The DV-display may have a luminous transmittance greater than or equal to about 80% using CIE Illuminant D65.

The flippable sunshield 1615 may be used to block the direct view optical path (from the entrance window 112 to the exit window 114), when the IR/thermal view mode is activated. Advantageously, blocking the direct view when viewing the IR/thermal images formed by the DV-display 130, eliminates the ambient light that may reduce the visibility of the IR/thermal image by the user.

Figure 16B:
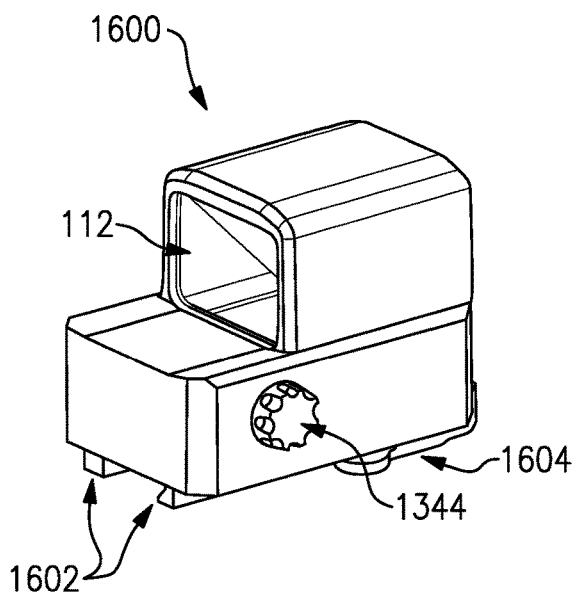
FIG. 16B illustrates the front perspective view of the example scope or sight system of FIG. 16A in accordance with certain aspects of the present disclosure.
Figure 16C:
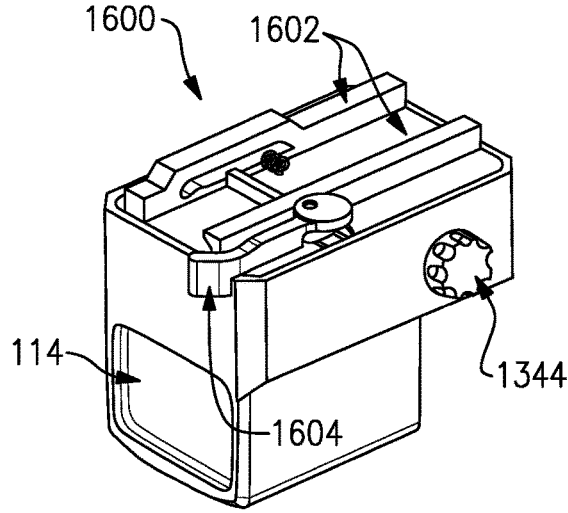
FIG. 16C illustrates the bottom perspective view of the example scope or sight system of FIG. 16A in accordance with certain aspects of the present disclosure.

FIGS. 16B and 16C illustrate the front and the bottom perspective views of the compact scope or compact sight system 1600 (shown in FIG. 16A). The compact scope 1600 may include an IR image control knob 1344 that allows the user to control the IR image seen through the exit window 114. For example, the IR image control knob may be used to activate/deactivate the thermal view and/or to focus the IR/thermal image formed by the DV-display 130. In some embodiments, the IR image control knob 1344 may be a digital focus knob that can be used to focus the IR image by changing the video signal generated by the IR image sensor 122 (e.g., using a signal processing unit in the electronic system 1610).

As shown in the bottom perspective view (FIG. 16C), the compact scope 1600 may have a rail mount 1602 that allows the compact scope 1600 to be removably mounted to a receiving or mounting rail of a firearm, weapon system, or other device that may exploit the functionalities provided by the compact scope 1600. The compact scope 1600 may be attached to a firearm or weapon using any type of attachment mechanism. In the example shown, the compact scope 1600 has a rail grabber lever 1604 lever that can be used to manually tighten and loosen the rail mount 1402 to or from a receiving rail on a weapon. In some embodiments, the rail mount 1602 may also include one or more electrical or optical connectors to enable electrical or optical communication between the compact scope and the firearm, weapon system, or other device.

In some embodiments, the firearm scope 1600 may include a user interface that allows a user to adjust the images generated and projected by the first and the second projectors. For example, the user may adjust a location of the reticle image within the transparent display substrate.

Example Weapon System with Multi-Function Single-View Scope

In some embodiments, a weapon system may comprise a firearm and a firearm scope, (e.g., firearm scope 200, 1300 or 1600) mounted or attached to the firearm. The firearm may have one or more mounts for attaching one or more accessories to the firearm. The firearm scope may be attached to the firearm via one of the mounts. For example, a rail mount (e.g., rail mount 202, 1402 or 1602) of the firearm scope may be connected to the mount. In some cases, the mount may accept mounting rails configured to be compatible with Picatinny rails, Weaver rails, or the like. In some examples, the firearm can be a rifle, a shotgun, a machine gun or the like.

In some embodiments, the firearm may include a transmitter for transmitting data to the firearm scope. The firearm scope may have a receiver configured to receive data from the firearm via a data connection established between the transmitter and the receiver. In some examples, the transmitter can be a wireless transmitter and the receiver can be a wireless receiver. In some other examples, the transmitter can be an optical transmitter and the receiver can be an optical receiver. In some embodiments, the transmitter can be part of a firearm transceiver (e.g., electronic or optical transceiver) and the receiver can be part of a scope transceiver (e.g., wireless transceiver 990, an electronic transceiver or an optical transceiver). In some embodiments, the firearm transceiver and the scope transceiver can be optical transceivers. In some implementations, an optical data link may be established between the firearm transceiver and the scope transceiver. The optical data link may be used to communicate optical data between the firearm and the firearm scope. The optical data may comprise an optical carrier modulated by digital data.

In some embodiments, the data connection or data link (e.g., optical data link) established between the firearm scope and the firearm may be used to transmit firearm data (e.g., data associated with the status of the firearm) from the firearm to the firearm scope. Firearm data may include: a cartridge count of cartridges within a magazine inserted into the firearm, a cartridge count of cartridges within one or more magazines registered to the firearm, a jam state of the firearm, a battery status of a battery within the firearm, a state of electronics included in the firearm, a magazine insertion status of the firearm, a firearm safety status, or any other data relating to operation of a firearm, and like. In some cases, the firearm arm data can be digitized and corresponding digital data may be converted to optical data that can be transmitted via the optical data link between the firearm and the firearm scope.

Upon receiving the firearm data, the firearm scope may present one or more images comprising the firearm data and/or one more symbols associated with the firearm data, via the DV-display 130. The images may be generated by a first image source (e.g., the first projector 128) or a second image source (e.g., the second projector 132) of the firearm scope. In some examples, the EPCU 110 may receive the firearm data from the transceiver (e.g., wireless transceiver 990), and determine one or more symbols using the firearm data, generate an image comprising the determined one or more symbols and present the image to the user (e.g., user 113) via the DV-display 130 (e.g., a waveguide display). In some examples, the EPCU 110 may determine a symbology (the one or more symbols) using a processor (e.g., an FPGA 983, an ASIC, or a general purpose processor) and based on the data (e.g., firearm data) received from the firearm and/or other electronic devices (e.g., the goggle 989) in communication with the scope. In some cases, the data received over the data connection may comprise control data usable for changing one or more settings of the firearm scope (e.g., settings associated with images displayed, operational mode of the scope, and the like). Upon receiving the control data, the EPCU 110 may determine one or more setting changes based on the control data and change one or more settings of the firearm accordingly. In some cases, the EPCU 110 may require a user confirmation via a user interface of the firearm scope (e.g., a user interface 134) before changing the one or more settings.

In some embodiments, an electrical connection may be established between the firearm and the firearm scope (e.g., via the mounting rail of the scope and the mount of the firearm). The electrical connection may be used for data communication and electric power transport. In some examples, the firearm may supply electric power to a portion or all of the electronic components and subsystems of the firearm scope (e.g., EPCU 110, wireless transceiver 990, visible image sensor 126, IR image sensor 122, reticle projector 132, etc.). In some examples, the user may select a sub-system of the firearm scope to receive power from the firearm.

Example Embodiments

The following is a list of multiple sets of example numbered embodiments. The features recited in the below list of example embodiments can be combined with additional features disclosed herein. Further, each set of example numbered embodiments in the following list can be combined with one or more additional sets of example numbered embodiments from the following list. Furthermore, additional inventive combinations of features are disclosed herein, which are not specifically recited in the below list of example embodiments and which do not include the same features as the embodiments listed below. For sake of brevity, the below list of example embodiments does not identify every inventive aspect of this disclosure. The below list of example embodiments are not intended to identify key features or essential features of any subject matter described herein.

1. A weapon system comprising:
    a firearm comprising a mount configured to support attachment of an accessory to the firearm; and
    a firearm scope mountable to the firearm via the mount of the firearm, the firearm scope comprising a sight system configured to admit light via a first window of the firearm scope and present a target scene or an image of the target scene, to a user via a second window of the firearm scope, wherein the image of the target scene is formed based at least in part on light admitted by the first window of the firearm scope, the sight system comprising:
- a first image source configured to generate a first image for presentation to the user, wherein the first image source generates the first image based at least in part on the admitted light;
- a second image source configured to generate a second image comprising a reticle for presentation to the user;
- a waveguide display configured to display the second image superimposed on the first image to the user; and
- an image projector configured to project at least the first image onto the waveguide display.

2. The weapon system of embodiment 1, wherein the firearm comprises a rifle.

3. The weapon system of embodiment 1, wherein the mount comprises a Picatinny rail or a Weaver rail.

4. The weapon system of embodiment 1, further comprising a data connection between the firearm and the firearm scope.

5. The weapon system of embodiment 4, wherein the firearm further comprises a transmitter and the firearm scope further comprises a receiver, and wherein the data connection is formed by the transmitter of the firearm and the receiver of the firearm scope.

6. The weapon system of embodiment 5, wherein the transmitter is part of a first transceiver and the receiver is part of a second transceiver.

7. The weapon system of embodiment 4, wherein the firearm further comprises a first optical transceiver and the firearm scope further comprises a second optical transceiver, and wherein the data connection is formed by the first optical transceiver and the second optical transceiver.

8. The weapon system of embodiment 4, wherein the firearm scope is configured to determine symbology corresponding to data received from the firearm over the data connection.

9. The weapon system of embodiment 8, wherein the first image source is further configured to generate the first image based at least in part on the symbology.

10. The weapon system of embodiment 8, wherein the second image further comprises the symbology and wherein the second image source is further configured to generate the second image based on the symbology.

11. The weapon system of embodiment 8, wherein the data comprises a cartridge count of cartridges within a magazine inserted into the firearm; a cartridge count of cartridges within one or more magazines registered to the firearm; a jam state of the firearm; a battery status of a battery within the firearm; a status of electronics included in the firearm; a magazine insertion status of the firearm; or a firearm safety status.

12. The weapon system of embodiment 8, wherein the firearm scope further comprises a processor configured to determine the symbology based at least in part on the data received via the data connection.

13. The weapon system of embodiment 4, wherein the firearm is further configured to provide control data over the data connection to the firearm scope, and wherein the firearm scope is further configured to modify one or more settings of the firearm scope based on the control data.

14. The weapon system of embodiment 1, wherein the second image source comprises a reticle image generator.

15. The weapon system of embodiment 14, wherein the reticle image generator comprises a laser diode.

16. The weapon system of embodiment 14, wherein the firearm scope further comprises a user interface configured to receive one or more inputs from the user, and wherein the firearm scope is further configured to modify a configuration of the reticle image generator based on the one or more inputs.

17. The weapon system of embodiment 1, further comprising a magazine that includes an ammunition counter configured to count an amount of cartridges within the magazine.

18. The weapon system of embodiment 17, wherein the image projector generates a display of a symbol corresponding to the amount of cartridges within the magazine.

19. The weapon system of embodiment 1, wherein the firearm scope further comprises coupling optics that couple the first image with the second image to obtain a superimposed image, and wherein the image projector is further configured to project the superimposed image onto the waveguide display.

20. The weapon system of embodiment 1, wherein the image projector is configured to project at least the first image onto gratings of the waveguide display.

21. The weapon system of embodiment 20, wherein the image projector is configured to project a first portion of the first image onto a grating of a first layer of the waveguide display, a second portion of the first image onto a grating of a second layer of the waveguide display, and a third portion of the first image onto a grating of a third layer of the waveguide display.

22. The weapon system of embodiment 21, wherein the first portion of the first image comprises light within red wavelength region and the first layer of the waveguide display is configured to reflect light within red wavelength region, the second portion of the first image comprises light within green wavelength region and the second layer of the waveguide display is configured to reflect light within green wavelength region, and the third portion of the first image comprises light within blue wavelength region and the third layer of the waveguide display is configured to reflect light within blue wavelength region.

23. The weapon system of embodiment 1, wherein the firearm scope further comprises a second projector configured to project at least the second image onto the waveguide display.

24. The weapon system of embodiment 23, wherein the image projector projects the first image onto the waveguide display via a first input port of the waveguide display, and the second projector projects the second image onto the waveguide display via a second input port of the waveguide display.

25. The weapon system of embodiment 23, wherein the second projector comprises the second image source.

26. The weapon system of embodiment 23, wherein the second projector is powered by a different power source than the image projector.

27. The weapon system of embodiment 1, wherein the firearm is further configured to supply power to at least a portion of the firearm scope.

28. The weapon system of embodiment 1, wherein the first image and the second image are viewable through the second window.

29. The weapon system of embodiment 1, wherein the first image corresponds to the target scene.

Additional embodiments of the present disclosure can be described in view of the following numbered embodiments:

1. A firearm scope capable of providing both a video-view mode and a direct-view mode through a single viewing window, the firearm scope comprising:
   a housing comprising a first window configured to admit light and a second window that enables a user to view a target scene; and
   a sight system at least partially housed within the housing, the sight system configured to process the admitted light and to present the target scene to the user via the second window, the sight system comprising:
      a direct view display viewable through the second window, the direct view display having a luminous transmittance greater than or equal to about 30% using CIE Illuminant D65 when viewed within at least 10 degrees of perpendicular to the direct view display, thereby permitting a direct view of the target scene through a transparent display substrate of the direct view display;
      a redirection element configured to redirect at least some of the admitted light received through the first window towards an image sensor when in a first state;
      the image sensor configured to generate an image based on the light received from the redirection element; and
      a projector configured to project the image onto the transparent display substrate of the direct view display.

2. The firearm scope of embodiment 1, wherein the direct view display comprises a waveguide.

3. The firearm scope of embodiment 1, wherein the direct view display comprises a see-through display or a transparent laser display configured to support augmented reality.

4. The firearm scope of embodiment 1, wherein the direct view display has a luminous transmittance greater than or equal to about 80% using CIE Illuminant D65.

5. The firearm scope of embodiment 1, further comprising an optical coupler configured to couple light corresponding to the image that is output by the projector to an input port of the direct view display.

6. The firearm scope of embodiment 1, wherein the redirection element comprises a pivotable mirror configured to pivot between at least a first position associated with the first state and a second position associated with a second state, wherein the redirection element redirects the at least some of the admitted light to the image sensor when in the first position, and wherein the redirection element does not redirect the at least some of the admitted light to the image sensor when in the second position associated with the second state.

7. The firearm scope of embodiment 1, wherein the redirection element comprises a beamsplitter.

8. The firearm scope of embodiment 6, wherein the beamsplitter has a 50% luminance transmittance.

9. The firearm scope of embodiment 1, wherein the redirection element comprises an electrochromic mirror.

10. The firearm scope of embodiment 1, wherein the image sensor comprises a complementary metal-oxide-semiconductor (CMOS) sensor.

11. The firearm scope of embodiment 1, wherein the image sensor comprises a focal-plane array.

12. The firearm scope of embodiment 1, further comprising a second image sensor configured to generate a second image at least from long-wavelength infrared light within a wavelength range of between 8 to 15 micrometers.

13. The firearm scope of embodiment 12, wherein the second image sensor comprises a focal-plane array.

14. The firearm scope of embodiment 12, further comprising a second redirection element configured to reflect at least the long-wavelength infrared light towards the second image sensor.

15. The firearm scope of embodiment 14, wherein the second redirection element is configured to at least transmit light within a visible wavelength range of between 380 to 740 nanometers.

16. The firearm scope of embodiment 12, further comprising a processor configured to combine the image and the second image to obtain a combined image, wherein the projector projects the image onto the transparent display substrate by projecting the combined image onto the transparent display substrate.

17. The firearm scope of embodiment 1, further comprising a second projector configured to project symbology onto the transparent display substrate of the direct view display.

18. The firearm scope of embodiment 17, wherein the symbology comprises a reticle image.

19. The firearm scope of embodiment 18, wherein a configuration of the second projector is adjustable enabling adjustment of the reticle image.

20. The firearm scope of embodiment 17, wherein the projector and the second projector are powered by separate power sources.

21. The firearm scope of embodiment 17, wherein the second projector comprises a laser diode.

22. The firearm scope of embodiment 17, wherein the symbology comprises weapon or magazine status information.

23. The firearm scope of embodiment 1, wherein the image projected onto the transparent display substrate corresponds to the target scene.

24. The firearm scope of embodiment 1, wherein the direct view and the image are simultaneously viewable through the second window.

25. The firearm scope of embodiment 1, wherein the image and a second image generated based at least in part on long-wavelength infrared light are selectively viewable through the second window.

Additional embodiments of the present disclosure can be described in view of the following numbered embodiments:

1. A firearm scope capable of displaying superimposed source imagery on a waveguide display, the firearm scope comprising:
   a housing comprising a first window configured to admit light and a second window that enables a user to view a target scene; and
   a sight system at least partially housed within the housing, the sight system configured to process the admitted light and to present the target scene to the user via the second window, the sight system comprising:
      a first image source configured to generate a first image for presentation to the user, wherein the first image source generates the first image based at least in part on the admitted light;
      a second image source configured to generate a second image for presentation to the user, wherein the second image comprises symbology;
      a waveguide display configured to display the second image superimposed on the first image to the user; and
      an image projector configured to project at least the first image onto the waveguide display.

2. The firearm scope of embodiment 1, wherein the image projector projects the first image onto the waveguide display via a first optical input location of the waveguide display.

3. The firearm scope of embodiment 1, wherein the symbology comprises a reticle image and the second image source comprises a reticle image generator.

4. The firearm scope of embodiment 3, wherein the reticle image generator comprises a laser diode.

5. The firearm scope of embodiment 3, further comprising a user interface configured to adjust a configuration of the reticle image generator in response to a user input.

6. The firearm scope of embodiment 1, wherein the second image source comprises a second projector configured to project the second image onto the waveguide display.

7. The firearm scope of embodiment 1, wherein the first image source and the second image source are powered by separate power sources.

8. The firearm scope of embodiment 1, further comprising a second image projector configured to project at least the second image onto the waveguide display.

9. The firearm scope of embodiment 8, wherein the image projector projects the first image onto the waveguide display via a first optical input location of the waveguide display and the second image projector projects the second image onto the waveguide display via a second optical input location of the waveguide display.

10. The firearm scope of embodiment 9, wherein the second optical input location is on a different face of the waveguide display than the first optical input location.

11. The firearm scope of embodiment 8, further comprising a coupling optics system that mixes an output of the image projector corresponding to the first image with an output of the second image projector corresponding to the second image to obtain a third image comprising the second image superimposed on the first image.

12. The firearm scope of embodiment 11, wherein the coupling optics system is further configured to provide the third image to an optical input location of the waveguide display enabling the waveguide display to display the second image superimposed on the first image to the user.

13. The firearm scope of embodiment 8, wherein the image projector projects the first image onto a first set of one or more gratings of the waveguide display the second image projector projects the second image onto a second set of one or more gratings of the waveguide display.

14. The firearm scope of embodiment 13, wherein the first set of one or more gratings and the second set of one or more gratings are accessible via a single optical input location of the waveguide display.

15. The firearm scope of embodiment 1, further comprising an optical receiver configured to receive digital data indicative of a number of cartridges available to the user.

16. The firearm scope of embodiment 15, wherein the symbology comprises an indication of the number of cartridges available to the user.

17. The firearm scope of embodiment 1, wherein the first image source comprises a complementary metal-oxide-semiconductor (CMOS) sensor.

18. The firearm scope of embodiment 1, wherein the waveguide display has a luminous transmittance greater than or equal to about 80% using CIE Illuminant D65.

19. The firearm scope of embodiment 1, wherein the waveguide display is further configured to display the second image to the user without presentation of the first image.

20. The firearm scope of embodiment 1, wherein the admitted light comprises long-wavelength infrared light.

21. The firearm scope of embodiment 20, wherein the first image comprises a thermal image.

22. The firearm scope of embodiment 20, wherein the first image comprises a thermal image combined with a visible light image created from light included in the admitted light that is within a visible wavelength range.

23. The firearm scope of embodiment 20, wherein the long-wavelength infrared light is within a wavelength range of between 8 to 15 micrometers.

24. The firearm scope of embodiment 1, wherein the waveguide display is formed from multiple layers comprising a red layer configured to receive light within the red wavelengths, a green layer configured to receive light within the green wavelengths, and a blue layer configured to receive light within the blue wavelengths.

25. The firearm scope of embodiment 24, wherein the image projector is configured to project the light within the red wavelengths to an input port of the red layer, project the light within the green wavelengths to an input port of the green layer, and project the light within the blue wavelengths to an input port of the blue layer.

26. The firearm scope of embodiment 1, wherein the first image and the second image are selectively viewable through the second window.

27. The firearm scope of embodiment 1, wherein the first image and the second image are simultaneously viewable through the second window.

28. The firearm scope of embodiment 1, wherein the symbology of the second image is user selectable.

Additional embodiments of the present disclosure can be described in view of the following numbered embodiments:

1. A firearm scope capable of providing both a thermal-view mode and a direct-view mode through a single viewing window, the firearm scope comprising:
   a housing comprising a first window configured to admit light and a second window that enables a user to view a target scene; and
   a sight system at least partially housed within the housing, the sight system configured to process the admitted light and to present the target scene to the user via the second window, the sight system comprising:
      a direct view display viewable through the second window, the direct view display transparent when viewed at a range of angles, thereby permitting a direct view through a transparent display substrate of the direct view display;
      a beamsplitter configured to permit the transmittance of light within a visible wavelength range while reflecting light within an infrared wavelength range towards an image sensor;
      the image sensor configured to generate a thermal image based on the light within the infrared wavelength range received from the beamsplitter, thereby permitting a thermal view; and
      a projector configured to project the thermal image onto the transparent display substrate of the direct view display.

2. The firearm scope of embodiment 1, wherein the image sensor comprises a thermal focal-plane array capable of processing light within the infrared spectrum.

3. The firearm scope of embodiment 1, wherein the beamsplitter comprises a dichroic mirror.

4. The firearm scope of embodiment 1, wherein the direct view display comprises a waveguide.

5. The firearm scope of embodiment 1, wherein the direct view display comprises a see-through display or a transparent laser display configured to support augmented reality.

6. The firearm scope of embodiment 1, wherein the direct view display has a luminous transmittance greater than or equal to about 80% using CIE Illuminant D65.

7. The firearm scope of embodiment 1, further comprising a second projector configured to project a reticle image onto the transparent display substrate of the direct view display.

8. The firearm scope of embodiment 7, further comprising a user interface configured to receive input indicative of an adjustment to the reticle image, wherein the second projector adjusts a location of a projection of the reticle image within the transparent display substrate based on the input.

9. The firearm scope of embodiment 7, wherein the projector and the second projector are powered by separate power sources.

10. The firearm scope of embodiment 7, wherein the second projector comprises a laser diode.

11. The firearm scope of embodiment 1, further comprising a second projector configured to project symbology onto the transparent display substrate of the direct view display.

12. The firearm scope of embodiment 11, wherein the symbology comprises one or more of: a cartridge count indicative of a number of cartridges within a magazine; a status of a power source; an identifier of a target status within the target scene; a jam state of a firearm; a communication state between the firearm scope and the firearm.

13. The firearm scope of embodiment 1, further comprising a redirection element configured to redirect the light within the visible wavelength range towards a second image sensor.

14. The firearm scope of embodiment 13, wherein the second image sensor comprises a complementary metal-oxide-semiconductor (CMOS) sensor.

15. The firearm scope of embodiment 13, wherein the second image sensor is configured to generate an image based on the light within the visible wavelength range received from the redirection element.

16. The firearm scope of embodiment 15, further comprising a processor configured to superimpose the image with the thermal image to obtain a combined image.

17. The firearm scope of embodiment 16, wherein the projector is further configured to project the thermal image by projecting the combined image onto the transparent display substrate of the direct view display.

18. The firearm scope of embodiment 15, wherein the projector is further configured to project the image onto the transparent display substrate of the direct view display.

19. The firearm scope of embodiment 18, wherein the image is simultaneously viewable through the second window with one or both of the direct view and the thermal view.

20. The firearm scope of embodiment 15, further comprising a second projector configured to project the image onto the transparent display substrate of the direct view display.

21. The firearm scope of embodiment 20, wherein the image is simultaneously viewable through the second window with one or both of the direct view and the thermal view.

22. The firearm scope of embodiment 13, wherein the redirection element is moveable between a first position that enables the redirection element to redirect the light within the visible wavelength range towards the second image sensor and a second position that permits the light within the visible wavelength range to reach the direct view display without being blocked by the redirection element.

23. The firearm scope of embodiment 1, further comprising an eye detector configured to detect whether an eye of the user is within a threshold distance of the second window.

24. The firearm scope of embodiment 23, further comprising a controller configured to deactivate the image sensor and the projector when the eye of the user is not detected within the threshold distance of the second window.

25. The firearm scope of embodiment 23, further comprising a controller configured to cause at least one of the image sensor or the projector to enter a low-power mode when the eye of the user is not detected within the threshold distance of the second window.

26. The firearm scope of embodiment 1, wherein the direct view and the thermal image are viewable through the second window.

27. The firearm scope of embodiment 1, wherein the direct view and the thermal image are simultaneously viewable through the second window.

28. The firearm scope of embodiment 1, further comprising a sunshield configured to reduce an ambient light admitted by the first window.

Additional embodiments of the present disclosure can be described in view of the following numbered embodiments:

1. A firearm scope configured to provide a view of a target scene to a user, the firearm scope comprising:
    a housing comprising a first aperture configured to admit light and a second aperture configured to present the target scene to the user; and
    a sight system at least partially housed within the housing, the sight system configured to process the admitted light and to present the target scene to the user via the second aperture, the sight system comprising:
    a dichroic mirror configured to reflect at least some light of the admitted light that is within infrared spectrum and transmit at least some light of the admitted light that is within visible spectrum;
    a moveable mirror configured to reflect at least some light within the visible spectrum towards an optical subsystem when the moveable mirror is within a first position associated with a first state;
    an image processor configured to generate an image based on light received from the optical subsystem;
    a projector configured to project the image into a first point of ingress of a holographic waveguide; and
    the holographic waveguide configured to present the image to the user when in the first state.

2. The firearm scope of embodiment 1, wherein the light admitted by the first aperture comprises visible light within the visible spectrum and infrared light within the infrared spectrum.

3. The firearm scope of embodiment 1, wherein the dichroic mirror is at least partially transparent to the user.

4. The firearm scope of embodiment 1, wherein the dichroic mirror is positioned at an angle configured to reflect the light within the infrared spectrum towards an infrared subsystem.

5. The firearm scope of embodiment 4, wherein the infrared subsystem is configured to generate an infrared image, and the projector is further configured to project the infrared image using the holographic waveguide.

6. The firearm scope of embodiment 1, wherein the moveable mirror is configured to be moveable to a second position associated with a second state that permits the at least some light within the visible spectrum to be passed through to the holographic waveguide without being reflected by the moveable mirror.

7. The firearm scope of embodiment 1, wherein the projector and holographic waveguide are calibrated such that light of an RGB output of the projector is matched to gratings at an input of the holographic waveguide such that reflections of the RGB output within the holographic waveguide form the image on a portion of the holographic waveguide aligned with the second aperture.

8. The firearm scope of embodiment 1, further comprising a second projector configured to project a reticle image using the holographic waveguide.

9. The firearm scope of embodiment 8, wherein the reticle image is bore-sighted.

10. The firearm scope of embodiment 8, wherein the second projector projects the reticle image into the first point of ingress of the holographic waveguide.

11. The firearm scope of embodiment 8, wherein the second projector projects the reticle image into a second point of ingress of the holographic waveguide that differs from the first point of ingress.

12. The firearm scope of embodiment 11, wherein the second point of ingress is on a different surface of the holographic waveguide than the first point of ingress.

13. The firearm scope of embodiment 8, wherein the projector and the second projector are powered by separate power sources.

14. The firearm scope of embodiment 8, wherein the second projector comprises a laser diode.

15. The firearm scope of embodiment 8, wherein a configuration of the second projector is adjustable enabling adjustment of the reticle image.

16. The firearm scope of embodiment 1, wherein the image generated by the image processor comprises a zoomed in image.

17. The firearm scope of embodiment 1, wherein the image processor comprises a complementary metal-oxide-semiconductor (CMOS) sensor.

18. The firearm scope of embodiment 1, wherein the holographic waveguide is at least partially transparent to the user.

19. The firearm scope of embodiment 1, further comprising a receiver configured to receive digital data indicative of a number of cartridges available to a user.

20. The firearm scope of embodiment 19, wherein the receiver comprises an optical receiver.

21. The firearm scope of embodiment 19, wherein the receiver communicates with a transmitter of a firearm that incorporates or is attached to the firearm scope.

22. The firearm scope of embodiment 19, wherein the number of cartridges comprises a number of cartridges within a magazine inserted into a firearm that incorporates or is attached to the firearm scope.

23. The firearm scope of embodiment 19, wherein the number of cartridges comprises a number of cartridges within one or more magazines registered with a firearm that incorporates or is attached to the firearm scope.

24. The firearm scope of embodiment 19, wherein one of the projector or a second projector configured to project a reticle image is further configured to project an image associated with the digital data onto the holographic waveguide.

Terminology

The embodiments described herein are exemplary. Modifications, rearrangements, substitute processes, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A firearm scope capable of providing both a thermal-view mode and a direct-view mode through a single viewing window, the firearm scope comprising:
   a housing comprising a first window configured to admit light and a second window that enables a user to view a target scene; and
   a sight system at least partially housed within the housing, the sight system configured to process the admitted light and to present the target scene to the user via the second window while omitting a lens in a viewing path between and including the first window and the second window, the sight system comprising:
      a direct view display viewable through the second window, the direct view display transparent when viewed at a range of angles, thereby permitting a direct view through a transparent display substrate of the target score;
      a beamsplitter configured to permit the transmission of light within a visible wavelength range while reflecting light within an infrared wavelength range towards an image sensor;
      the image sensor configured to generate a thermal image based on the light within the infrared wavelength range received from the beamsplitter, thereby permitting a thermal view; and
      a projector configured to project the thermal image onto the transparent display substrate of the direct view display.

2. The firearm scope of claim 1, wherein the image sensor comprises a thermal focal-plane array capable of processing the light within the infrared wavelength range.

3. The firearm scope of claim 1, wherein the beamsplitter comprises a dichroic mirror.

4. The firearm scope of claim 1, wherein the direct view display comprises a waveguide.

5. The firearm scope of claim 1, wherein the direct view display comprises a see-through display or a transparent laser display configured to support augmented reality.

6. The firearm scope of claim 1, wherein the direct view display has a luminous transmittance greater than or equal to about 80% using CIE Illuminant D65.

7. The firearm scope of claim 1, further comprising a second projector configured to project a reticle image onto the transparent display substrate of the direct view display.

8. The firearm scope of claim 7, further comprising a user interface configured to receive input indicative of an adjustment to the reticle image, wherein the second projector adjusts a location of a projection of the reticle image within the transparent display substrate based on the input.

9. The firearm scope of claim 7, wherein the projector and the second projector are powered by separate power sources.

10. The firearm scope of claim 7, wherein the second projector comprises a laser diode.

11. The firearm scope of claim 1, further comprising a second projector configured to project symbology onto the transparent display substrate of the direct view display.

12. The firearm scope of claim 11, wherein the symbology comprises one or more of: a cartridge count indicative of a number of cartridges within a magazine; a status of a power source; an identifier of a target status within the target scene; a jam state of a firearm; a communication state between the firearm scope and the firearm.

13. The firearm scope of claim 1, further comprising a redirection element configured to redirect the light within the visible wavelength range towards a second image sensor.

14. The firearm scope of claim 13, wherein the second image sensor comprises a complementary metal-oxide-semiconductor (CMOS) sensor.

15. The firearm scope of claim 13, wherein the second image sensor is configured to generate an image based on the light within the visible wavelength range received from the redirection element.

16. The firearm scope of claim 15, further comprising a processor configured to superimpose the image with the thermal image to obtain a combined image.

17. The firearm scope of claim 16, wherein the projector is further configured to project the thermal image by projecting the combined image onto the transparent display substrate of the direct view display.

18. The firearm scope of claim 15, wherein the projector is further configured to project the image onto the transparent display substrate of the direct view display.

19. The firearm scope of claim 18, wherein the image is simultaneously viewable through the second window with one or both of the direct view and the thermal view.

20. The firearm scope of claim 15, further comprising a second projector configured to project the image onto the transparent display substrate of the direct view display.

21. The firearm scope of claim 20, wherein the image is simultaneously viewable through the second window with one or both of the direct view and the thermal view.

22. The firearm scope of claim 13, wherein the redirection element is moveable between a first position that enables the redirection element to redirect the light within the visible wavelength range towards the second image sensor and a second position that permits the light within the visible wavelength range to reach the direct view display without being blocked by the redirection element.

23. The firearm scope of claim 1, further comprising an eye detector configured to detect whether an eye of the user is within a threshold distance of the second window.

24. The firearm scope of claim 23, further comprising a controller configured to deactivate the image sensor and the projector when the eye of the user is not detected within the threshold distance of the second window.

25. The firearm scope of claim 23, further comprising a controller configured to cause at least one of the image sensor or the projector to enter a low-power mode when the eye of the user is not detected within the threshold distance of the second window.

26. The firearm scope of claim 1, wherein the direct view and the thermal image are viewable through the second window.

27. The firearm scope of claim 1, wherein the direct view and the thermal image are simultaneously viewable through the second window.

28. The firearm scope of claim 1, further comprising a sunshield configured to reduce an ambient light admitted by the first window.

\* \* \* \* \*

UNITED STATES PATENT AND TRADEMARK OFFICE
CERTIFICATE OF CORRECTION

PATENT NO. : 11,473,874 B2
APPLICATION NO. : 17/178990
DATED : October 18, 2022
INVENTOR(S) : David Michael Masarik It is certified that error appears in the above-identified patent and that said Letters Patent is hereby corrected as shown below:

In the Specification

In Column 4, Line 20, delete "FIG." and insert --FIGS.--.

In Column 4, Line 23, delete "of the of the" and insert --of the--.

In Column 17, Line 22, delete "imaging," and insert --imaging--.

In Column 17, Line 31, delete "nay" and insert --may--.

In Column 17, Line 31, delete "degrees)" and insert --degrees).--.

In Column 18, Line 35, delete "degrees)" and insert --degrees).--.

In Column 22, Line 43, delete "transreflective" and insert --transflective--.

In Column 24, Line 29, delete "eletromechanical" and insert --electromechanical--.

In Column 26, Line 54, delete "ECPU" and insert --EPCU--.

In Column 27, Line 3, delete "seep" and insert --sleep--.

In Column 28, Line 12, delete "scope" and insert --scope.--.

In Column 32, Line 33, delete "ECPU)" and insert --EPCU)--.

In Column 34, Line 35, delete "FIG." and insert --FIGS.--.

Signed and Sealed this
Seventh Day of February, 2023

Katherine Kelly Vidal
*Director of the United States Patent and Trademark Office*

In the Claims

In Column 51, Claim 1, Line 63, delete "score;" and insert --scene;--.

In Column 51, Claim 1, Line 64, delete "the transmission" and insert --transmission--.